US012708955B2

(12) United States Patent
Candadai Vasu et al.

(10) Patent No.: US 12,708,955 B2
(45) Date of Patent: Aug. 18, 2026

(54) SCAN PLANNING AND SCAN OPERATIONS FOR WELDING AN OBJECT

(71) Applicant: Path Robotics, Inc., Columbus, OH (US)

(72) Inventors: Madhavun Candadai Vasu, Westerville, OH (US); Nima Ajam Gard, Columbus, OH (US); Sabhari Natarajan, Columbus, OH (US); Amrish Baskaran, Columbus, OH (US); Gautham Narayan Narasimhan, Columbus, OH (US)

(73) Assignee: Path Robotics, Inc., Columbus, OH (US)

( * ) Notice: Subject to any disclaimer, the term of this patent is extended or adjusted under 35 U.S.C. 154(b) by 48 days.

(21) Appl. No.: 18/419,458

(22) Filed: Jan. 22, 2024

(65) Prior Publication Data

US 2024/0246179 A1 Jul. 25, 2024

Related U.S. Application Data

(60) Provisional application No. 63/440,347, filed on Jan. 20, 2023.

(51) Int. Cl.
*B23K 9/095* (2006.01)
*B23K 26/03* (2006.01)
(Continued)

(52) U.S. Cl.
CPC .......... *B23K 9/0956* (2013.01); *B23K 9/0953* (2013.01); *B23K 26/032* (2013.01);
(Continued)

(58) Field of Classification Search
CPC .. B23K 9/0956; B23K 9/0953; B23K 26/032; B23K 37/0258; B25J 9/1666;
(Continued)

(56) References Cited

U.S. PATENT DOCUMENTS 1,724,301 A 8/1929 Peck
3,532,807 A 10/1970 Wall, Jr. et al.
(Continued)

FOREIGN PATENT DOCUMENTS

CN 110064818 A 7/2019
CN 110270997 A 9/2019
(Continued)

OTHER PUBLICATIONS

Ryosuke Kusumoto, Tomohito Ta1rubo and Tetsuo Tsujioka, Welding seam detection between cylinder and plane using point cloud data, 2022, pp. 1-5 (Year: 2022).*
(Continued)

*Primary Examiner* — Bao Long T Nguyen
(74) *Attorney, Agent, or Firm* — IPkey PLLC

(57) ABSTRACT

Disclosed are systems, methods, and apparatuses, including computer programs encoded on computer storage media, for operation of an assembly robotic system. In one aspect, the assembly robotic system performs at least one of a first or second scan operation. In the first scan operation, one or more scan poses is selected from among a plurality of generated candidate poses. For each scan pose of the one or more scan poses, the controller initiates a scan operation associated with a region identified to include a seam associated with a feature of the object. As part of the second scan operation, for each candidate scan pose, a scan operation is simulated. Based on the generated simulated scan data, multiple scan poses are selected and a scan trajectory is generated for a scan operation. Other aspects and features are also claimed and described.

21 Claims, 20 Drawing Sheets

(51) Int. Cl.

| | |
|---|---|
| ***B23K 37/02*** | (2006.01) |
| ***B25J 9/16*** | (2006.01) |
| ***B25J 11/00*** | (2006.01) |
| ***G05B 19/4155*** | (2006.01) |
| ***G06T 7/00*** | (2017.01) |
| ***G06T 7/73*** | (2017.01) |

(52) U.S. Cl.

CPC ......... *B23K 37/0258* (2013.01); *B25J 9/1666* (2013.01); *B25J 9/1671* (2013.01); *B25J 11/005* (2013.01); *G05B 19/4155* (2013.01); *G06T 7/0004* (2013.01); *G06T 7/75* (2017.01); *G05B 2219/45104* (2013.01); *G06T 2207/30152* (2013.01)

(58) Field of Classification Search

CPC ...... B25J 9/1671; B25J 11/005; B25J 9/1679; B25J 9/1697; B25J 9/1684; G05B 19/4155; G05B 2219/45104; G05B 2219/40252; G05B 2219/40314; G05B 2219/45135; G05B 2219/45138; G06T 7/0004; G06T 7/75; G06T 2207/30152; G06T 7/70; G06T 7/73

See application file for complete search history.

(56) References Cited

U.S. PATENT DOCUMENTS

| | | | |
|---|---|---|---|
| 4,011,437 | A | 3/1977 | Hohn |
| 4,021,840 | A | 5/1977 | Ellsworth et al. |
| 4,148,061 | A | 4/1979 | Lemelson et al. |
| 4,234,777 | A | 11/1980 | Balfanz |
| 4,255,643 | A | 3/1981 | Balfanz |
| 4,380,696 | A | 4/1983 | Masaki |
| 4,412,121 | A | 10/1983 | Kremers et al. |
| 4,482,968 | A | 11/1984 | Inaba et al. |
| 4,492,847 | A | 1/1985 | Masaki et al. |
| 4,495,588 | A | 1/1985 | Nio et al. |
| 4,497,019 | A | 1/1985 | Waber |
| 4,497,996 | A | 2/1985 | Libby et al. |
| 4,515,521 | A | 5/1985 | Takeo et al. |
| 4,553,077 | A | 11/1985 | Brantmark et al. |
| 4,555,613 | A | 11/1985 | Shulman |
| 4,561,050 | A | 12/1985 | Iguchi et al. |
| 4,567,348 | A | 1/1986 | Smith et al. |
| 4,568,816 | A | 2/1986 | Casler, Jr. et al. |
| 4,575,304 | A | 3/1986 | Nakagawa et al. |
| 4,578,554 | A | 3/1986 | Coulter |
| 4,580,229 | A | 4/1986 | Koyama et al. |
| 4,587,396 | A | 5/1986 | Rubin |
| 4,590,577 | A | 5/1986 | Nio et al. |
| 4,593,173 | A | 6/1986 | Bromley et al. |
| 4,594,497 | A | 6/1986 | Takahasi et al. |
| 4,595,989 | A | 6/1986 | Yasukawa et al. |
| 4,613,942 | A | 9/1986 | Chen |
| 4,616,121 | A | 10/1986 | Clocksin et al. |
| 4,617,504 | A | 10/1986 | Detriche |
| 4,642,752 | A | 2/1987 | Debarbieri et al. |
| 4,652,803 | A | 3/1987 | Kamejima et al. |
| 4,675,502 | A | 6/1987 | Haefner et al. |
| 4,677,568 | A | 6/1987 | Arbter |
| 4,685,862 | A | 8/1987 | Nagai et al. |
| 4,724,301 | A | 2/1988 | Shibata et al. |
| 4,725,965 | A | 2/1988 | Keenan |
| 4,744,039 | A | 5/1988 | Suzuki et al. |
| 4,745,856 | A | 5/1988 | Putnam et al. |
| 4,757,180 | A | 7/1988 | Kainz et al. |
| 4,804,860 | A | 2/1989 | Ross et al. |
| 4,812,614 | A | 3/1989 | Wang et al. |
| 4,833,383 | A | 5/1989 | Skarr et al. |
| 4,833,624 | A | 5/1989 | Kuwahara et al. |
| 4,837,487 | A | 6/1989 | Kurakake et al. |
| 4,845,992 | A | 7/1989 | Dean |
| 4,899,095 | A | 2/1990 | Kishi et al. |
| 4,906,907 | A | 3/1990 | Tsuchihashi et al. |
| 4,907,169 | A | 3/1990 | Lovoi |
| 4,924,063 | A | 5/1990 | Buchel et al. |
| 4,945,493 | A | 7/1990 | Huang et al. |
| 4,969,108 | A | 11/1990 | Webb et al. |
| 4,973,216 | A | 11/1990 | Domm |
| 5,001,324 | A | 3/1991 | Aiello et al. |
| 5,006,999 | A | 4/1991 | Kuno et al. |
| 5,053,976 | A | 10/1991 | Nose et al. |
| 5,083,073 | A | 1/1992 | Kato |
| 5,096,353 | A | 3/1992 | Tesh et al. |
| 5,154,717 | A | 10/1992 | Matsen, III et al. |
| 5,159,745 | A | 11/1992 | Kato |
| 5,219,264 | A | 6/1993 | McClure et al. |
| 5,245,409 | A | 9/1993 | Tobar |
| 5,288,991 | A | 2/1994 | King et al. |
| 5,300,869 | A | 4/1994 | Skaar et al. |
| 5,326,469 | A | 7/1994 | Watanabe |
| 5,379,721 | A | 1/1995 | Dessing et al. |
| 5,457,773 | A | 10/1995 | Jeon |
| 5,465,037 | A | 11/1995 | Huissoon et al. |
| 5,479,078 | A | 12/1995 | Karakama et al. |
| 5,511,007 | A | 4/1996 | Nihei et al. |
| 5,532,924 | A | 7/1996 | Hara et al. |
| 5,570,458 | A | 10/1996 | Umeno et al. |
| 5,572,102 | A | 11/1996 | Goodfellow et al. |
| 5,598,345 | A | 1/1997 | Tokura et al. |
| 5,600,760 | A | 2/1997 | Pryor |
| 5,602,967 | A | 2/1997 | Pryor |
| 5,608,847 | A | 3/1997 | Pryor |
| 5,612,785 | A | 3/1997 | Boillot et al. |
| 5,624,588 | A | 4/1997 | Terawaki et al. |
| 5,828,566 | A | 10/1998 | Pryor |
| 5,906,761 | A | 5/1999 | Gilliland et al. |
| 5,925,268 | A | 7/1999 | Britnell |
| 5,956,417 | A | 9/1999 | Pryor |
| 5,959,425 | A | 9/1999 | Bieman et al. |
| 5,961,858 | A | 10/1999 | Britnell |
| 6,035,695 | A | 3/2000 | Kim |
| 6,044,308 | A | 3/2000 | Huissoon |
| 6,049,059 | A | 4/2000 | Kim |
| 6,084,203 | A | 7/2000 | Bonigen |
| 6,163,946 | A | 12/2000 | Pryor |
| 6,167,607 | B1 | 1/2001 | Pryor |
| 6,304,050 | B1 | 10/2001 | Skaar et al. |
| 6,429,404 | B1 | 8/2002 | Tokura et al. |
| 6,430,474 | B1 | 8/2002 | DiStasio et al. |
| 6,804,580 | B1 | 10/2004 | Stoddard et al. |
| 6,909,066 | B2 | 6/2005 | Zheng et al. |
| 7,130,718 | B2 | 10/2006 | Gunnarsson et al. |
| 7,151,848 | B1 | 12/2006 | Watanabe et al. |
| 7,734,358 | B2 | 6/2010 | Watanabe et al. |
| 7,805,219 | B2 | 9/2010 | Ishikawa et al. |
| 7,813,830 | B2 | 10/2010 | Summers et al. |
| 7,818,091 | B2 | 10/2010 | Kazi et al. |
| 7,946,439 | B1 | 5/2011 | Toscano et al. |
| 8,494,678 | B2 | 7/2013 | Quandt et al. |
| 8,525,070 | B2 | 9/2013 | Tanaka et al. |
| 8,538,125 | B2 | 9/2013 | Linnenkohl et al. |
| 8,644,984 | B2 | 2/2014 | Nagatsuka et al. |
| 9,067,321 | B2 | 6/2015 | Landsnes |
| 9,221,117 | B2 | 12/2015 | Conrardy et al. |
| 9,221,137 | B2 | 12/2015 | Otts |
| 9,666,160 | B2 | 5/2017 | Patel et al. |
| 9,685,099 | B2 | 6/2017 | Boulware et al. |
| 9,724,787 | B2 | 8/2017 | Becker et al. |
| 9,773,429 | B2 | 9/2017 | Boulware et al. |
| 9,779,635 | B2 | 10/2017 | Zboray et al. |
| 9,799,635 | B2 | 10/2017 | Kuriki et al. |
| 9,802,277 | B2 | 10/2017 | Beatty et al. |
| 9,821,415 | B2 | 11/2017 | Rajagopalan et al. |
| 9,836,987 | B2 | 12/2017 | Postlethwaite et al. |
| 9,937,577 | B2 | 4/2018 | Daniel et al. |
| 9,975,196 | B2 | 5/2018 | Zhang et al. |
| 9,977,242 | B2 | 5/2018 | Patel et al. |
| 9,993,891 | B2 | 6/2018 | Wiryadinata |
| 10,040,141 | B2 | 8/2018 | Rajagopalan et al. |
| 10,083,627 | B2 | 9/2018 | Daniel et al. |
| 10,191,470 | B2 | 1/2019 | Inoue |

(56) References Cited

U.S. PATENT DOCUMENTS

| | | | |
|---|---|---|---|
| 10,197,987 | B2 | 2/2019 | Battles et al. |
| 10,198,962 | B2 | 2/2019 | Postlethwaite et al. |
| 10,201,868 | B2 | 2/2019 | Dunahoo et al. |
| 10,551,179 | B2 | 2/2020 | Lonsberry et al. |
| 11,034,024 | B2 | 6/2021 | Saez et al. |
| 11,067,965 | B2 | 7/2021 | Spieker et al. |
| 11,179,793 | B2 | 11/2021 | Atherton et al. |
| 11,407,110 | B2 | 8/2022 | Lonsberry et al. |
| 11,759,952 | B2 | 9/2023 | Lonsberry et al. |
| 2001/0004718 | A1 | 6/2001 | Gilliland et al. |
| 2004/0105519 | A1 | 6/2004 | Yamada et al. |
| 2005/0023261 | A1 | 2/2005 | Zheng et al. |
| 2006/0047363 | A1 | 3/2006 | Farrelly et al. |
| 2006/0049153 | A1 | 3/2006 | Cahoon et al. |
| 2008/0125893 | A1 | 5/2008 | Tilove et al. |
| 2009/0075274 | A1 | 3/2009 | Slepnev et al. |
| 2009/0139968 | A1 | 6/2009 | Hesse et al. |
| 2010/0114338 | A1 | 5/2010 | Bandyopadhyay et al. |
| 2010/0152870 | A1 | 6/2010 | Wanner et al. |
| 2010/0206938 | A1 | 8/2010 | Quandt et al. |
| 2010/0274390 | A1 | 10/2010 | Bernd |
| 2011/0141251 | A1 | 6/2011 | Marks et al. |
| 2011/0297666 | A1 | 12/2011 | Ihle et al. |
| 2012/0096702 | A1 | 4/2012 | Kinglsey et al. |
| 2012/0267349 | A1 | 10/2012 | Bemdl et al. |
| 2013/0119040 | A1 | 5/2013 | Suraba et al. |
| 2013/0123801 | A1 | 5/2013 | Umasathan et al. |
| 2013/0259376 | A1 | 10/2013 | Louban |
| 2014/0088577 | A1 | 3/2014 | Anastassiou et al. |
| 2014/0100694 | A1 | 4/2014 | Rueckl et al. |
| 2014/0365009 | A1 | 12/2014 | Wettels |
| 2015/0122781 | A1 | 5/2015 | Albrecht |
| 2015/0127162 | A1 | 5/2015 | Takefumi |
| 2016/0016312 | A1 | 1/2016 | Lawrence, III et al. |
| 2016/0096269 | A1 | 4/2016 | Atohira et al. |
| 2016/0125592 | A1 | 5/2016 | Becker et al. |
| 2016/0125593 | A1 | 5/2016 | Becker et al. |
| 2016/0224012 | A1 | 8/2016 | Hunt |
| 2016/0257000 | A1 | 9/2016 | Guerin et al. |
| 2016/0257070 | A1 | 9/2016 | Boydston et al. |
| 2016/0267636 | A1 | 9/2016 | Duplaix et al. |
| 2016/0267806 | A1 | 9/2016 | Hsu et al. |
| 2017/0072507 | A1 | 3/2017 | Legault |
| 2017/0132807 | A1 | 5/2017 | Shivaram et al. |
| 2017/0232615 | A1 | 8/2017 | Hammock |
| 2017/0266758 | A1 | 9/2017 | Fukui et al. |
| 2017/0364076 | A1 | 12/2017 | Keshmiri et al. |
| 2017/0368649 | A1 | 12/2017 | Marrocco et al. |
| 2018/0043471 | A1 | 2/2018 | Aoki et al. |
| 2018/0065204 | A1* | 3/2018 | Burrows ................ B25J 11/007 |
| 2018/0117701 | A1 | 5/2018 | Ge et al. |
| 2018/0147662 | A1 | 5/2018 | Furuya |
| 2018/0266961 | A1 | 9/2018 | Narayanan et al. |
| 2018/0266967 | A1 | 9/2018 | Ohno et al. |
| 2018/0304550 | A1 | 10/2018 | Atherton et al. |
| 2018/0322623 | A1 | 11/2018 | Memo et al. |
| 2018/0341730 | A1 | 11/2018 | Atherton et al. |
| 2019/0076949 | A1 | 3/2019 | Atherton et al. |
| 2019/0108639 | A1 | 4/2019 | Tchapmi et al. |
| 2019/0193180 | A1 | 6/2019 | Troyer et al. |
| 2019/0240759 | A1 | 8/2019 | Ennsbrunner et al. |
| 2019/0331480 | A1 | 10/2019 | Lonsberry et al. |
| 2019/0375101 | A1 | 12/2019 | Miyata et al. |
| 2020/0021780 | A1 | 1/2020 | Jeong et al. |
| 2020/0030984 | A1 | 1/2020 | Suzuki et al. |
| 2020/0114449 | A1 | 4/2020 | Chang et al. |
| 2020/0130089 | A1 | 4/2020 | Ivkovich et al. |
| 2020/0164521 | A1 | 5/2020 | Li |
| 2020/0180062 | A1 | 6/2020 | Suzuki et al. |
| 2020/0223064 | A1 | 7/2020 | Alexander |
| 2020/0262079 | A1 | 8/2020 | Saez et al. |
| 2020/0269340 | A1 | 8/2020 | Tang et al. |
| 2020/0316779 | A1 | 10/2020 | Truebenbach et al. |
| 2020/0409376 | A1 | 12/2020 | Afrouzi et al. |
| 2021/0012678 | A1 | 1/2021 | Torrecilla et al. |
| 2021/0069813 | A1* | 3/2021 | Eskandari ............ B23K 9/1274 |
| 2021/0158724 | A1 | 5/2021 | Becker et al. |
| 2021/0318673 | A1 | 10/2021 | Kitchen et al. |
| 2022/0016776 | A1 | 1/2022 | Lonsberry et al. |
| 2022/0226922 | A1 | 7/2022 | Albrecht et al. |
| 2022/0250183 | A1 | 8/2022 | Knoener |
| 2022/0258267 | A1 | 8/2022 | Becker |
| 2022/0266453 | A1* | 8/2022 | Lonsberry .............. B25J 9/1664 |
| 2022/0305593 | A1 | 9/2022 | Lonsberry et al. |
| 2022/0324110 | A1 | 10/2022 | Lonsberry et al. |
| 2022/0402147 | A1 | 12/2022 | Martin et al. |
| 2022/0410402 | A1 | 12/2022 | Lonsberry et al. |
| 2023/0093558 | A1 | 3/2023 | Takeya et al. |
| 2023/0123712 | A1 | 4/2023 | Lonsberry et al. |
| 2023/0173676 | A1 | 6/2023 | Lonsberry et al. |
| 2023/0260138 | A1 | 8/2023 | Becker et al. |
| 2023/0278224 | A1 | 9/2023 | Bunker et al. |
| 2023/0330764 | A1 | 10/2023 | Ott et al. |
| 2024/0025041 | A1 | 1/2024 | Lonsberry et al. |
| 2024/0408763 | A1 | 12/2024 | Sood et al. |

FOREIGN PATENT DOCUMENTS

| | | | |
|---|---|---|---|
| CN | 110524581 | A | 12/2019 |
| CN | 111189393 | A | 5/2020 |
| CN | 114670199 | A | 6/2022 |
| EP | 3812105 | | 4/2021 |
| JP | 2010269336 | A | 12/2010 |
| JP | 2015223664 | | 12/2015 |
| JP | 2017196653 | A | 11/2017 |
| WO | 1994003303 | | 2/1994 |
| WO | 2004096481 | | 11/2004 |
| WO | 2016013171 | A1 | 1/2016 |
| WO | 2017115015 | | 7/2017 |
| WO | 2018173655 | | 9/2018 |
| WO | 2019153090 | | 8/2019 |
| WO | 2022270580 | A1 | 12/2022 |
| WO | 2024156002 | A1 | 7/2024 |
| WO | 2024156004 | A1 | 7/2024 |

OTHER PUBLICATIONS

Cui, J. et al., "A Multi-Sensor Next-Best-View Framework for Geometric Model-Based Robotics Application," 2019 International Conference on Robotics and Automation (ICRA); pp. 8769-8775.

International Search Report mailed on Jun. 6, 2024, issued in the corresponding International Application No. PCT/US2024/012460, filed on Jan. 22, 2024; 5 pages.

International Search Report mailed on May 24, 2024, issued in the corresponding International Application No. PCT/US2024/012465, filed on Jan. 22, 2024, 5 pages.

Kriegel, S. et al., "Efficient next-best-scan planning for autonomous 3D surface reconstruction of unknown objects," J Real-Time Image Proc (2015) 10:611-631.

Kusumoto, R. et al., "Welding seam detection between cylinder and plane using point cloud data," 2022 International Symposium on Micro-Nanomehatronics and Human Sciences (MHS), IEEE Nov. 27, 2022, pp. 1-5.

Liu, Y. et al. "Robot path planning with two-axis positioner for non-ideal sphere-pipe joint welding based on laser scanning," The International Journal of Advanced Manufacturing Technology (2019) 105:1295-1310.

Monica, J. and J. Aleotti, "A 3D Robot Self Filter for Next Best View Planning," 2019 Third IEEE International Conference on Robotic Computing (IRC); pp. 117-124.

Written Opinion of the International Searching Authority mailed on Jun. 6, 2024 issued in the corresponding International Application No. PCT/US2024/012460, filed on Jan. 22, 2024; 15 pages.

Written Opinion of the International Searching Authority mailed on May 24, 2024, issued in the corresponding International Application No. PCT/US2024/012465, filed Jan. 22, 2024, 15 pages.

Ahmed, S. M. et al., "Object Detection and Motion Planning for Automated Welding of Tubular Joints," 2016 IEEE/RSJ International Conference on Intelligent Robots and Systems, Daejeon, Korea, Oct. 9-14; pp. 2610-2615.

(56) References Cited

OTHER PUBLICATIONS

Bingul et al., "A real-time prediction model of electrode extension for GMAW", IEEE/ASME Transaction on Mechatronics, vol. 11, No. 1,pp. 47-4, 2006.
Boulware, "A methodology for the robust procedure development of fillet welds", The Ohio State University Knowledge Bank, 2006.
Chandrasekaran, "Predication of bead geometry in gas metal arc welding by statistical regression analysis", University of Waterloo, 2019.
Devaraj et al., "Grey-based Taguchi multiobjective optimization and artificial intelligence-based prediction of dissimilar gas metal arc welding process performance", Metals, vol. 11, 1858, 2021.
Ding et al., A multi-bead overlapping model for robotic wire and arc additive manufacturing (WAAM), Robotics and Computer-Integrated Manufacturing, vol. 31, pp. 101-110, 20115.
Ding, et al., "Bead modelling and implementation of adaptive MAT path in wire and arc additive manufacturing", Robotics and Computer-Integrated Manufacturing, vol. 39, pp. 32-42, 2016.
Hao et al., "Effects of tilt angle between laser nozzle and substrate on bead morphology in multi-axis laser cladding", Journal of manufacturing processes, vol. 43, pp. 311-322, 2019.
Harwig, "A wise method for assessing arc welding performance and quality", Welding Journal, pp. 35-39, 2000.
Harwig, "Arc behaviour and metal transfer of the vp-gmaw process", School of Industrial and Manufacturing Science, 2003.
He et al., "Dynamic modeling of weld bead geometry features in thick plate GMAW based on machine vision and learning", Sensors, vol. 20, 7104, 2020.
Horvath et al., "Bead geometry modeling on uneven base metal surface by fuzzy systems for multi-pass welding" Expert Systems With Applications 186 (2021) 115356, 24 Pgs., (Year: 2021).
Hu et al., "Molten pool behaviors and forming appearance of robotic GMAW on complex surface with various welding positions", Journal of Manufacturing Processes, vol. 64, pp. 1359-1376, 2021.
Hu et al., "Multi-bead overlapping model with varying cross-section profile for robotic GMAW-based additive manufacturing", Journal of Intelligent Manufacturing, 2019.
Jing et al., "Rgb-d sensor-based auto path generation method for arc welding robot", 2016 Chinese Control and Decision Conference (CCDC), IEEE, 2016.
Kesse et al., "Development of an artificial intelligence powered TIG welding algorithm for the prediction of bead geometry for TIG welding processes using hybrid deep learning", Metals, vol. 10, 451, 2020.
Kiran et al., "Arc interaction and molten pool behavior in the three wire submerged arc welding process", International Journal of Heat and Mass Transfer, vol. 87, pp. 327-340, 2015.
Kolahan et al., A new approach for predicting and optimizing weld bead geometry in GMAW, World Academy of Science, Engineering and Technology, vol. 59, pp. 138-141, 2009.
Larkin et al., "Automatic program generation for welding robots from CAD" 2016 IEEE International Conference on Advanced Intelligent Mechatronics (AIM) (pp. 560-565). USA: IEEE (Jul. 2016) (Year: 2016).
Li et al., "Enhanced beads overlapping model for wire and arc additive manufacturing of multi-layer multi-bead metallic parts", Journal of Materials Processing Technology, 2017.
Li et al., "GMAW-based additive manufacturing of inclined multi-layer multi-bead parts with flat-position deposition", Journal of Materials Processing Tech, vol. 262, pp. 359-371, 2018.
Liu et al., "Motion navigation for arc welding robots based on feature mapping in a simulation environment", Robotics and Computer-Integrated Manufacturing, 26(2); pp. 137-144, 2010.
Lv et al., "Levenberg-marquardt backpropagation training of multilayer neural networks for state estimation of a safety critical cyber-physical system".
Lynch, K.M. et al., "Robot Control", Modern Robotics: Mechanics, Planning, and Control, Cambridge University Press, 2017, 403-460. https://books.google.com/books?id=5NzFDgAAQBAJ&lpg=PR11&ots=qsPfT003Ph&dq=Lynch%2C%20K.M.%20et%20al.%2C%20%22Robot%20Control%22%2C%20Modern%20Robotics%3A%20Mechanics%2C%20Planning%2C%20and%20Control%2C%20Cambridge%20University%20Press%2C%202017%2C%20403-460.&lr&pg=PR5#v=onepage&q&f=false.
Martinez et al., "Two gas metal arc welding process dataset of arc parameters and input parameters", Data in Brief, vol. 35, 106790, 2021.
Mollayi et al., "Application of multiple kernel support vector regression for weld bead geometry prediction in robotic GMAW Process", International Journal of Electrical and Computer Engineering, vol. 8, No. pp. 2310-2318, 2018.
Moos et al., "Resistance Spot Welding Process Simulation for Variational Analysis on Compliant Assemblies", Journal of Manufacturing Systems, Dec. 16, 2014, pp. 44-71.
Munro, "An empirical model for overlapping bead geometry during laser consolidation", Defence Research and Development Canada, 2019. (resubmission).
Murray, "Selecting parameters for GMAW using dimensional analysis", Welding Research, pp. 152s-131s, 2002.
Natarajan, S. et al., "Aiding Grasp Synthesis for Novel Objects Using Heuristic-Based and Data-Driven Active Vision Methods", Frontiers in Robotics and AI, 8:696587, 2021.
Nguyen et al., "Multi-bead overlapping models for tool path generation in wire-arc additive manufacturing processes", Procedia Manufacturing, vol. 47, pp. 1123-1128, 2020.
Rao et al., "Effect of process parameters and mathematical model for the prediction of bead geometry in pulsed GMA welding", The International Journal of Advanced Manufacturing Technology, vol. 45, pp. 496-05, 2009.
Ravichandran et al., "Parameter optimization of gas metal arc welding process on AISI: 430Stainless steel using meta heuristic optimization techniques", Department of Mechatronics Engineering.
Sheng et al., "A new adaptive trust region algorithm for optimization problems", Acta Mathematica Scientia, vol. 38b, No. 2., pp. 479-496, 2018.
Suryakumar et al., "Weld bead modeling and process optimization in hybrid layered manufacturing", Computer-Aided Design, vol. 43, pp. 331-344, 211.
Thao, et al., "Interaction model for predicting bead geometry for lab joint in GMA welding process", Computational Materials Science and Surface Engineering, vol. 1, issue. 4., pp. 237-244, 2009.
Xiao, R. et al., "An adaptive feature extraction algorithm for multiple typical seamtracking based on vision sensor in robotic arc welding," Elsevier: Sensors and Actuators A 297 (2019) 111533; 15 pages.
Xiong et al., "Modeling of bead section profile and overlapping beads with experimental validation for robotic GMAW-based rapid manufacturing", Robotics and Computer-Integrated Manufacturing, vol. 29, pp. 417-423, 2013.

* cited by examiner

Fig. 5, Rotation between the vector z and approach direction a

SCAN PLANNING AND SCAN OPERATIONS FOR WELDING AN OBJECT

CROSS-REFERENCE TO RELATED APPLICATIONS

This application claims the benefit of U.S. Provisional Patent Application No. 63/440,347, entitled, "SCAN PLANNING," filed on Jan. 20, 2023, which is expressly incorporated by reference herein in its entirety.

TECHNICAL FIELD

Aspects of the present disclosure relate generally to robotic systems, and more particularly, to an apparatus or system for a scan operation, such as a system for scan planning or scan operations for welding an object.

Introduction

Conventional fabrication and manufacturing may include a variety of tasks or processes, such as material handling, machining, and assembly, as illustrative, non-limiting examples. As compared to other tasks or processes, such as machining or material handling, an assembly task or process is generally considered to be more complex. The assembly task or process typically includes an act or process of bringing two or more objects (e.g., parts, pieces, components, etc.) together to be in a coupled relationship. To illustrate, the assembly task or process may include coupling or connecting two objects together to form a new component or a finished product. As illustrative, non-limiting examples, coupling or connecting welding the two objects together may include or correspond to welding or riveting the two objects together.

Additionally, the assembly task may include a pre-processing task or a process executed prior to performing the assembly task or process. For example, the pre-processing task or the process may include a scanning task or a process in which one or more objects on which an assembly task is to be performed are scanned. Scanning the one or more objects may identify a location, on the one or more objects, at which the assembly task is to be performed. The scanning operation may include or correspond to an imaging operation in which an imaging device is used to generate data (e.g., image data or point cloud data) of a surface of the object. Typically, imaging operations may use electromagnetic signals (e.g., visible light, radar, light detection and ranging (LiDAR)), acoustic signals, or both to generate an image.

A conventional assembly task or process may include a robot performing one or more assembly tasks. For example, the robot may be configured to repetitively perform a task, such as a welding task in which the robot may weld a first object to a second object. The welding task may include a tack welding task, a finish welding task, or a combination thereof. In general, the welding task may refer to any type of welding task. To achieve this welding task, a location at which the first object is to be welded to the second object is typically provided to a controller of the robot so that the robot may perform the welding task at the location. Accordingly, in a conventional pre-processing task or process, the robot may include or be associated with a scan device that incorporates a sensor. The sensor device may be configured to scan the one or more objects to be assembled to locate a seam at which a first object of the one or more objects meets a second object of the one or more components and at which the weld task is to be performed. In a conventional robotic assembly system, a brute force approach may be applied to locate the seam. This brute force approach may involve scanning the one or more objects repetitively several times so that an entirety or approximately an entirety of a surface of the one or more objects can be scanned. For example, the one or more objects may be repetitively scanned by the sensor device from a same pose or perspective while a cradle or positioner, holding the one or more objects, rotates or otherwise moves the one or more objects.

Several disadvantages are inherent in this conventional approach. One disadvantage includes that the approach generates massive quantities of potentially useless or non-actionable scan data. For instance, the pose from which the scan is performed may not capture features of the object that are useful to facilitate an assembly operation, such as a weld operation. Nevertheless, computational resources, such as memory and processing resources, are allocated to store and process this potentially voluminous scan data. Another disadvantage includes that the conventional approach is slow. For instance, many scans might be performed before a seam of an object is identified. Additionally, due to the large volume of generated scan data, processing the scan data to identify a seam of the object at which an assembly operation is to occur could take a significant amount of time. An additional disadvantage includes that the conventional approach is infeasible to scan large objects, such as those exceeding a cubic meter in volume. Accordingly, the conventional brute force pre-processing approach wastes resources, is slow, and cannot feasibly be used for objects that exceed a cubic meter in volume.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure is related to apparatuses, systems, and methods that provide for robotic fabrication, assembly, or manufacturing. For example, the apparatuses, systems, and methods may provide for scanning an object to be welded. To illustrate, a controller associated with a robotic system, such as an assembly robotic system, is configured to cause the robotic system to couple multiple objects or components together to form an assembled component, subcomponent, or product. As illustrative, non-limiting examples, the multiple objects may be coupled via welding, brazing, soldering, or by implementing other manufacturing tasks on the multiple objects, such as riveting. To facilitate coupling the multiple objects together, the controller is configured to cause the robotic system to perform one or more scan operations. For example, the one or more scan operations may be performed to locate a region of at least one object of the multiple objects associated with a seam of the at least one object and at which an assembly operation, such as a welding operation, may be performed. The seam may be associated with one or more features of the at least one object. For instance, the seam may include or correspond to locations at which a first object is positioned with respect to a second object and at which an assembly operation, such as a welding operation, is to occur to weld the first and second objects together. By accurately, precisely, and rapidly locating the region of at least one object of the multiple objects associated with the seam of the at least one object, the robotic system is configured to acquire information about a location at which an assembly operation is to be performed.

The one or more scan operations may include or correspond to a process in which a scan device (including one or more sensors), associated with the robotic system, is configured to generate or acquire data corresponding to the one or more portions of the at least one object. The data, referred to as scan data, may include images or point cloud data of the one or more portions of the at least one object. For example, the images may include or correspond to visual images (e.g., two dimensional (2D) digital images), electromagnetic images (e.g., radar, LiDAR images), acoustic images, or combinations thereof. The controller may cause the scan device to perform the one or more scan operations from a pose. The pose may include or correspond to an actual or simulated vantage point of the scan device or a simulated scan device relative to the at least one object such that the scan device is capable of generating scan data of the at least one object from the actual or simulated vantage point. Accordingly, a pose includes both position information (e.g., x, y, z coordinates) of the scan device and orientation information (e.g., relative angle between the scan device and the object) of the scan device. For example, the scan device may be positioned on the robotic system, and the robotic system may be configured to move relative to a cradle or a positioner that holds the at least one object. As the robotic system moves, the vantage point or perspective of the scan device may change. For example, the scan device may be configured to generate first scan data of a portion of a surface of the at least one object and to generate second scan data of the same or a different portion of the surface of the at least one object. The first scan data may be generated from a first pose and the second scan data may be generated from a second pose distinct from the first pose.

In some implementations, the controller may be configured to generate one or more candidate poses associated with the region of the at least one object. For example, the controller may be configured to generate a plurality of actual or simulated vantage points of the scan device relative to the at least one object. Each actual or simulated vantage point of the scan device may include or correspond to a candidate pose. Additionally, the controller may be configured to select, from among one or more candidate poses, one or more scan poses. For instance, the controller may select, based on actual or simulated scan data for a plurality of candidate poses, multiple scan poses from the plurality of candidate poses. The controller may select one or more scan poses from among a plurality of candidate poses by evaluating one or more candidate poses of the plurality of candidate poses. In particular, the actual or simulated scan data that the scan device may be configured to capture from the one or more candidate poses may differ according to several characteristics. These characteristics may include a quantity of a surface area of the region of surface of the object actually or likely to be imaged by a scan operation actually performed at or simulated from the candidate pose. Additionally, these characteristics may include an informational content of actual or simulated scan data that the scan device may capture from the candidate pose. In some implementations, these characteristics may include an ease with which an assembly operation (e.g., a welding operation) may be performed from the candidate pose.

The controller may be configured to evaluate the one or more candidate poses. For example, the controller may be configured to score the one or more candidate poses based on one or more of the characteristics described above by applying a scoring algorithm predicated on the characteristics. The controller may be configured to select, from among the one or more candidate poses, one or more scan poses having the highest scores.

The controller may be configured to initiate a scan operation from one or more of the scan poses, such as from one or more of the scan poses selected from among the plurality of candidate scan poses. In some implementations, the controller may be configured to initiate a first scan type operation (e.g., a discrete scan operation), while in other implementations, the controller may be configured to initiate a second scan type operation (e.g., a continuous scan operation). For the discrete scan operation, for each scan pose of the one or more scan poses, the controller may initiate a scan operation associated with the identified region and that is performed by the scan device having the scan pose. Accordingly, for the discrete scan operation, a scan operation may be performed from each of the one or more scan poses, but not necessarily between two consecutive scan poses.

In contrast, in a continuous scan operation, the controller may initiate, based on a scan trajectory indicated by multiple scan poses selected from among the candidate poses, a first scan operation of the region through each scan pose of the multiple scan poses. For example, a scan operation may be performed at each scan pose and at an additional scan pose between two consecutive scan poses of the multiple scan poses. As another example, the scan operation may be performed continuously from a first pose of the multiple poses to a second pose of the multiple poses. In this manner, continuous scanning may be performed at multiple poses and at an additional pose, whereas in a discrete scan operation, a scan operation may be performed only at each scan pose and not between scan poses.

Based on scan data captured through performance of one or more scan operations, such as one or more discrete scan operations, one or more continuous scan operations, or both, the controller may be configured to initiate performance of an assembly operation, such as a welding operation. For example, the controller may generate a weld trajectory comprised of one or more waypoints selected based on the scan data collected from the one or more scan operations, and the controller may be configured to cause a weld head associated with the robotic system to perform a welding operation at each waypoint.

In some aspects, the present disclosure provides techniques to facilitate an enhanced scan operation, such as a discrete scan operation, a continuous scan operation, or both. The discrete scan operation, the continuous scan operation, or both provide a more accurate and precise location of a seam of an object more rapidly than is possible with conventional techniques. By rapidly providing an accurate and precise location of a seam, an assembly operation, such as a welding operation, may be performed at the seam.

Further, prior to performing one or more scan operations, one or more scan poses may be selected from which to perform scan operations that are more likely than non-selected scan poses to generate actionable scan data that can be used to perform an assembly operation. By selecting scan poses that are most likely to produce actionable or useful scan data, time and computational resources are conserved, thereby improving an overall efficiency of an assembly operation.

In one aspect of the disclosure, an assembly robotic system for scanning an object to be welded is disclose. The assembly robotic system includes a controller that includes one or more processors and one or more memories coupled to the one or more processors. The controller is configured to identify, based on an object pose of the object, a region associated with a seam of the object. The seam is associated with a feature of one or more features of the object. The controller is further configured to generate, based on the identified region, one or more candidate poses associated with a scan device. The scan device is configured to perform a scan operation in association with the identified region. The controller is also configured to select, based on the one or more candidate poses, one or more scan poses. The controller is configured to, for each scan pose of the one or more scan poses, initiate a scan operation associated with the identified region and performed by the scan device with the scan pose.

In an additional aspect of the disclosure, a method, performed by a controller, for scanning an object to be welded is disclosed. The method includes identifying, based on an object pose of the object, a region associated with a seam of the object. The seam is associated with a feature of one or more features of the object. The method also includes generating, based on the identified region, one or more candidate poses associated with a scan device. The scan device is configured to perform a scan operation in association with the identified region. The method further includes selecting, based on the one or more candidate poses, one or more scan poses. The method includes, for each scan pose of the one or more scan poses, initiating a scan operation associated with the identified region and performed by the scan device with the scan pose.

In an additional aspect of the disclosure, a non-transitory computer-readable medium storing instructions that, when executed by one or more processors of a controller, cause the controller to perform one or more operations. The instructions, when executed, cause the controller to identify, based on an object pose of the object, a region associated with a seam of the object. The seam is associated with a feature of one or more features of the object. The instructions, when executed, further cause the controller to generate, based on the identified region, one or more candidate poses associated with a scan device. The scan device is configured to perform a scan operation in association with the identified region. The instructions, when executed, also cause the controller to select, based on the one or more candidate poses, one or more scan poses. The instructions, when executed, cause the controller to, for each scan pose of the one or more scan poses, initiate a scan operation associated with the identified region and performed by the scan device with the scan pose.

In an additional aspect of the disclosure, an assembly robotic system for scanning an object to be welded is disclose. The assembly robotic system includes a controller that includes one or more processors and one or more memories coupled to the one or more processors. The controller is configured to generate, based on one or more characteristics of a sensor of a scan device, a plurality of candidate poses. The plurality of candidate poses is associated with a region corresponding to a seam of the object, and the seam is associated with a feature of one or more features of the object. The controller is further configured to, for each candidate pose of the plurality of candidate poses, simulate, based on the one or more characteristics of the sensor and based on one or more physical parameters associated with the object, a scan operation from the candidate pose to generate simulated scan data indicating a simulated image of the region for the candidate pose. The controller is also configured to select, from the plurality of candidate poses and based on the simulated scan data for the plurality of candidate poses, multiple scan poses that are associated with a scan trajectory of the scan device. The controller is configured to initiate, based on the scan trajectory, the scan device to perform a first scan operation of the region through each scan pose of the multiple scan poses.

In an additional aspect of the disclosure, a method, performed by a controller, for scanning an object to be welded is disclosed. The method includes generating, based on one or more characteristics of a sensor of a scan device, a plurality of candidate poses. The plurality of candidate poses is associated with a region corresponding to a seam of the object, and the seam is associated with a feature of one or more features of the object. The method also includes, for each candidate pose of the plurality of candidate poses, simulating, based on the one or more characteristics of the sensor and based on one or more physical parameters associated with the object, a scan operation from the candidate pose to generate simulated scan data indicating a simulated image of the region for the candidate pose. The method further includes selecting, from the plurality of candidate poses and based on the simulated scan data for the plurality of candidate poses, multiple scan poses that are associated with a scan trajectory of the scan device. The method includes initiating, based on the scan trajectory, the scan device to perform a first scan operation of the region through each scan pose of the multiple scan poses.

In an additional aspect of the disclosure, a non-transitory computer-readable medium storing instructions that, when executed by one or more processors of a controller, cause the controller to perform one or more operations. The instructions, when executed, cause the controller to generate, based on one or more characteristics of a sensor of a scan device, a plurality of candidate poses. The plurality of candidate poses is associated with a region corresponding to a seam of an object to be welded, and the seam is associated with a feature of one or more features of the object. The instructions, when executed, further cause the controller to, for each candidate pose of the plurality of candidate poses, simulate, based on the one or more characteristics of the sensor and based on one or more physical parameters associated with the object, a scan operation from the candidate pose to generate simulated scan data indicating a simulated image of the region for the candidate pose. The instructions, when executed, also cause the controller to select, from the plurality of candidate poses and based on the simulated scan data for the plurality of candidate poses, multiple scan poses that are associated with a scan trajectory of the scan device. The instructions, when executed, cause the controller to initiate, based on the scan trajectory, the scan device to perform a first scan operation of the region through each scan pose of the multiple scan poses.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 14A-14F depict an example technique to identify, based on representation data, one or more potential locations at which a scan operation may be initiated according to one or more aspects.

Like reference numbers and designations in the various drawings indicate like elements.

DETAILED DESCRIPTION

Figure 1:
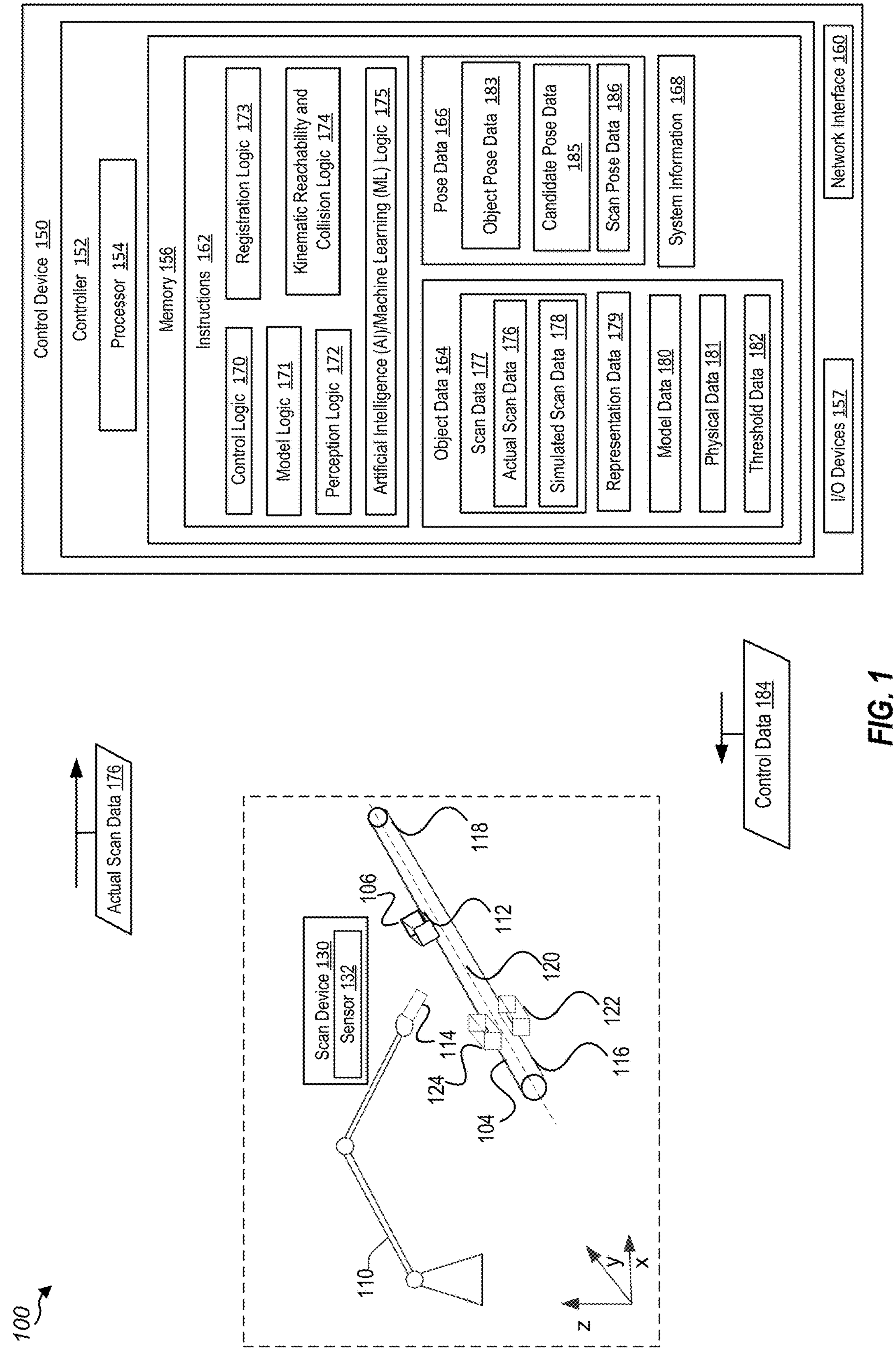
FIG. 1 is a block diagram illustrating an example of a robotic system that supports one or more scan operations according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure is related to apparatuses, systems, and methods that provide for robotic fabrication, assembly, or manufacturing. For example, the apparatuses, systems, and methods may provide for scanning an object to be welded. A controller of a robotic system may receive representation data associated with at least one object, such as an object on which an assembly operation is to be performed. The representation data may include or correspond to a digital representation of the at least one object, such as a computer aided design (CAD) file corresponding to the at least one object, a mesh representation corresponding to the at least one object, or a combination thereof. Additionally, the controller may receive user input associated with the at least one object (e.g., an object). For example, the user input may include or correspond to an indication of an orientation of the object relative to a cradle or positioner in which the object is placed. To illustrate, the user input may indicate an anterior portion of the at least one object, a posterior portion of the at least one object, or both. In other implementations, the controller may be configured to detect an orientation of the object independent of user input.

The controller may be configured to perform one or more scan operations, such as one or more discrete scan operations, one or more continuous scan operations, or a combination thereof. For example, in some implementations, the controller may perform a discrete scan operation to identify or locate a feature of the objection, and then may perform a continuous scan on the feature of the object. Based on scan data obtained from performing the one or more scan operations, the controller may perform an error correction operation. The error correction operation may include or correspond to comparing representation data and scan data and generating a computational model of the object that is more accurate, more precise, or both than the representation data alone.

Based on the computational model of the object, based on the scan data generated from the one or more scan operations, or both, the controller may instruct the robotic system to perform an assembly operation, such as a welding operation. For example, the controller may instruct the robotic system to weld at one or more waypoints that are based on or are selected as a result of scan data collected from one or more scan poses generated through performance of one or more scan operations.

In a discrete scan operation, the controller may identify a region associated with a seam of the object. The seam may be associated with a feature of one or more features of the object. For example, the object may include or correspond to a utility pole, and the feature may include or correspond to a second object, such as a bracket, that is conjoined to the utility pole and that is to be welded to the utility pole. In some implementations, the controller may identify the region based on an object pose of the object. The object pose of the object may include or correspond to a position of the object relative to the robotic system, relative to a scan device, relative to a workspace in which the robotic system is positioned, or a combination thereof. Additionally, the object pose of the object may include or correspond to an orientation of the object relative to the robotic system, relative to the scan device, relative to the workspace in which the robotic system is positioned, relative to the cradle or positioner, or a combination thereof. In some implementations, the controller may determine the pose of the object based on the representation of the object. For instance, the controller may identify asymmetries associated with the object based on analysis, by the controller, of data, such as point cloud data, mesh data, or the like corresponding to the representation of the object.

Additionally, for the discrete scan operation, the controller may generate, based on the identified region, one or more candidate poses associated with a scan device. The one or more candidate poses may include or correspond to actual or simulated vantage points of the scan device relative to the object such that the scan device is capable of generating scan data of at least a portion of a surface of the object from the actual or simulated vantage points. For example, the scan device may include or correspond to an imaging device that includes one or more sensors, such as a camera, a radar, a LIDAR, an ultrasonic device, or the like, and that is configured to scan the object from a plurality of different vantage points or perspectives. Accordingly, the scan device is configured to perform a scan operation in association with the identified region of the object.

Further, the controller may select, based on the one or more candidates poses, one or more scan poses. For instance, the controller may evaluate the one or more candidate poses according to an evaluation algorithm and may select the one or more scan poses that satisfy one or more criteria according to the evaluation algorithm. In some implementations, for each scan pose of the one or more scan poses, the controller may initiate a scan operation associated with the identified region and performed by the scan device with the scan pose. For example, the controller may instruct the scan device to perform a scan operation with each scan pose but not between scan poses.

In a continuous scan operation, the controller may generate, based on one or more characteristics of a sensor of a scan device, a plurality of candidate poses. The plurality of candidate poses may be associated with a region corresponding to a seam of an object. The seam may be associated with a feature of one or more features of the object. Additionally, to perform a continuous scan operation, for each candidate pose of the plurality of candidate poses, the controller may simulate, based on one or more characteristics of the sensor and based on one or more physical parameters associated with the object, a scan operation from the candidate pose to generate simulated scan data indicating a simulated image of the region for the candidate pose. The one or more characteristics of the sensor may include whether the sensor corresponds to a camera, a radar, a laser, a LiDAR sensor, an ultrasonic sensor, or a combination thereof. The one or more physical parameters associated with the object may include or correspond to physical properties associated with a material from which the object may be composed, such as the way in which a surface of the object may reflect different wavelength of light, absorb different wavelengths of light, or the like.

To simulate the scan operation, the controller may simulate, for each candidate pose of the plurality of candidate poses, transmission of a simulated signal to a surface of the component corresponding to the region. For example, the controller may simulate transmission of laser light having a certain wavelength to a surface of the region of the object. Additionally, the controller may simulate receipt of a simulated reflected signal from the surface of the object. For example, the controller may simulate laser light reflected from the surface of the region in response to simulated transmission of the laser light to the surface of the region. Accordingly, the simulated scan data may include or correspond to one or more simulated images generated based on the simulation of the scan operation.

In some implementations, the controller may select, from among the plurality of candidate poses and based on the simulated scan data for the plurality of candidate poses, multiple scan poses that are associated with a scan trajectory of the scan device. For example, the controller may apply a selection algorithm to select the multiple scan poses. Additionally, the controller may initiate, based on the scan trajectory, the scan device to perform a first scan operation of the region through each scan pose of the multiple scan poses. For example, the controller may cause the scan device to scan at and between each pose of the multiple scan poses associated with the scan trajectory. As another example, the controller may cause the scan device to continuously scan along a trajectory from a first pose of the multiple scan poses to a last pose of the multiple scan poses and that includes each pose of the multiple scan poses.

Particular implementations of the subject matter described in this disclosure may be implemented to realize one or more potential advantages or benefits. In some aspects, the present disclosure provides techniques to facilitate an enhanced scan operation, such as a discrete scan operation, a continuous scan operation, or both. The discrete scan operation, the continuous scan operation, or both provide a more accurate and precise location of a seam of an object more rapidly than is possible with conventional techniques. By rapidly providing an accurate and precise location of a seam, an assembly operation, such as a welding operation, may be performed at the seam.

Further, prior to performing one or more scan operations, one or more scan poses may be selected from which to perform scan operations that are more likely than non-selected scan poses to generate actionable scan data that can be used to perform an assembly operation. By selecting scan poses that are most likely to produce actionable or useful scan data, time and computational resources are conserved, thereby improving an overall efficiency of an assembly operation. To illustrate, conventional robotic assembly systems typically apply a brute force scanning technique in which an object is scanned repetitively several times from a same pose or perspective while a cradle or positioner rotates the object or otherwise moves the object relative to the scan device. Several disadvantages inhere in this conventional approach. One disadvantage includes that the approach generates massive quantities of potentially useless or non-actionable scan data. For instance, the pose from which the scan is performed may not capture features of the object that are useful to facilitate an assembly operation, such as a weld operation. Nevertheless, computational resources, such as memory and processing resources, are allocated to store and process this potentially voluminous scan data. Another disadvantage includes that the conventional approach is slow. For instance, many scans might be performed before a seam of an object is identified. Additionally, due to the large volume of generated scan data, processing the scan data to identify a seam of the object at which an assembly operation is to occur could take a significant amount of time. An additional disadvantage includes that the conventional approach is infeasible to scan large objects, such as those exceeding a cubic meter in volume. Accordingly, the conventional brute force pre-processing approach wastes resources, is slow, and cannot feasibly be used for objects that exceed a cubic meter in volume.

In contrast to the conventional approach, in which an entirety or approximately an entirety of a surface of an object might be scanned, the controller may identify, based on an object pose of the object, a region associated with a seam of the object. Accordingly, a scan operation can be performed proximate to the region rather than over a large surface of the object, an entirety of the surface of the object, or both. In this manner, performance of targeted scan operations at regions of a surface of an object may be facilitated to produce scan data that is actionable for performance of an assembly operation.

Additionally, the controller may select, from among a plurality of candidate scan poses, one or more scan poses from which to perform a scan operation. By selecting scan poses, based on criteria such as an informational content of a scan pose, a scan operation performed from the selected scan poses is more likely to generate scan data that is actionable in performing an automated assembly operation. In this manner, while less scan data may be generated than in a conventional approach, the generated scan data may be more useful in performing an assembly operation. Consequently, an enhanced scan operation may be provided that improves the efficiency with which a scan operation is performed, that enhances an accuracy and a precision of a location at which a scan operation is performed, and that reduces computational resources deployed to perform a scan operation.

Referring to FIG. 1, a block diagram illustrates an example of a robotic system that supports one or more scan operations according to one or more aspects. In some implementations, robotic system 100 may include or correspond to an assembly robotic system. Robotic system 100 may be configured to couple first object 104 and a second object 106. For example, first object 104 and second object 106 may be designed to form seam 112 between first object 104 and second object 106. Each of first object 104 and second object 106 may be any part, component, subcomponent, combination of parts or components, or the like and without limitation.

In some implementations, robotic system 100 may include or may be associated with workspace 102, such as a two-dimensional area or a three-dimensional space.

Workspace 102 may also be referred to as a manufacturing workspace. In some implementations, workspace 102 might be any suitable welding area or space designed with appropriate safety measures for welding. For example, workspace 102 may be a welding area or space located in a workshop, job shop, manufacturing plant, fabrication shop, outdoor construction area, or the like. In some implementations, at least a portion of robotic system 100 is positioned in workspace 102. For example, workspace 102 may be an area or space within which one or more robot devices (e.g., a robot arm(s)) is configured to operate on one or more objects (or parts). The one or more objects may be positioned on, coupled to, stored at, or otherwise supported by one or more cradles, platforms, containers, bins, racks, holders, or positioners. The one or more robot devices may be configured to operate on the one or more objects based on information received from one or more sensors as described further herein.

The robotic system 100 includes robot device 110, scan device 130, and control device 150. Control device 150 is coupled to robot device 110, scan device 130, or a combination thereof. For example, control device 150 may be communicatively coupled, via a wired connection, a wireless connection, or a combination thereof, to the robot device 110, scan device 130, or a combination thereof.

Robotic device 110 includes a mechanical device, such as a robotic arm. In some implementations, the robotic device 110 may be configured to have six degrees of freedom (DOF) or fewer than six DOF. Robotic device 110 may include one or more components, such as a motor, a servo, hydraulics, or a combination thereof, as illustrative, non-limiting examples. In some implementations, the robotic device 110 includes a robotic arm, such as a robotic arm manufactured by YASKAWA®, ABBR IRB, KUKA®, or Universal Robots®.

In some implementations, robotic device 110 may be coupled to or include one or more tools. For example, robotic tool may be coupled to manufacturing tool 114, which is configured to perform one or more manufacturing tasks or operations. The one or more manufacturing tasks or operations may include welding, brazing, soldering, riveting, cutting, drilling, or the like, as illustrative, non-limiting examples. In some implementations, manufacturing tool 114 is a welding tool configured to couple two or more objects together. For example, the welding tool may be configured to weld two or more objects together, such as welding first object 104 to second object 106. To illustrate, the welding tool may be configured to lay a weld metal along seam 112 formed between first object 104 and second object 106. Additionally, or alternatively, the welding tool may be configured to fuse first object 104 to second object 106, such as fusing seam 112 formed between first object 104 and second object 106 to couple first object 104 to second object 106. In some implementations, manufacturing tool 114 may be configured to perform the one or more manufacturing tasks or operations responsive to a manufacturing instruction, such as a weld instruction.

Scan device 130 may be include or correspond to any imaging device and may include one or more sensors 132 (hereinafter "sensor 132"). Scan device 130 may be configured to generate scan data, such as scan data 176, through operation of sensor 132. Sensor 132 may include or correspond to a visual sensor, a laser, a LiDAR sensor, an audio sensor, a, electromagnetic sensor, an ultrasonic sensor, or a combination thereof, as illustrative, non-limiting examples. For example, sensor 132 may include a camera (e.g., a camera with a built in laser) or a scanner (e.g., a laser scanner) that is configured to capture visual information (e.g., two-dimensional (2D) images or three-dimensional (3D) scanning). In some implementations, scan device 130 may be 3D scanner, such as a scanner sold by Photoneo®. As another example, sensor 132 may be an audio sensor, such as a Sound Navigation and Ranging (SONAR) device, configured to emit or capture sound. Additionally, or alternatively, sensor 132 may be an electromagnetic sensor, such as a Radio Detection and Ranging (RADAR) device, configured to emit and/or capture electromagnetic (EM) waves. Through visual, audio, electromagnetic, and/or other sensing technologies, scan device 130, via sensor 132, may collect information about physical structures and objects associated with or in the workspace 102. Accordingly, scan data 176 may include visual image data, electromagnetic data, sonar data, ultrasound data, or the like, as illustrative, non-limiting examples.

Scan device 130 may be positioned on or coupled to a robot device (e.g., a robotic arm), a structure or frame, or the like, as illustrative, non-limiting examples. Additionally, or alternatively, scan device 130 may be dynamic (e.g., movable). In some implementations, scan device 130 may be coupled to a movable device or may be configured to rotate, move along a rail or cable, or a combination thereof, as illustrative, non-limiting examples. As another example, scan device 130 may be appended to, coupled to, attached to, or otherwise associated with robotic device 110, which itself may be configured to rotate, move along a rail or cable, or a combination thereof.

Accordingly, scan device 130 may be configurable to scan first object 104, second object 106, or both from a plurality of poses. By scanning first object 104, second object 106, or both from different poses, actual scan data 176 having different informational content may be generated from each pose. For example, when scanning first object 104 from a first pose, scan device 130 may be configured to generate first actual scan data 176 having different informational content from second actual scan data 176 generated when scanning first object 104 from a second pose. To illustrate, when scanning first object 104 from a first pose, scan device 130 may be configured to image a larger surface area of first object 104 than when scanning first object 104 from a second pose that is distinct from the first pose.

Sensor 132 may be configured to collect static information associated with a stationary structure or object, dynamic information associated with a moving structure or object, or a combination thereof. Sensor 132 may generate actual scan data 176 (e.g., 2D image data, 3D image data, audio data, electromagnetic data, or other data) that is provided to another device, such as to controller device 150, to generate a 3D representation of physical structures or objects.

In some implementations, sensor 132 may be a 3D sensor configured to use structured light projection to reconstruct the geometry of a 3D surface of an inspected object (e.g., the first object 104 or the second object 106). For example, one or more structured patterns may be projected onto a scene or object during a scan, which may allow calculation of depth from one or more images of the scene. Information regarding the surface geometry of the scanned object or scene may be included in actual scan data 176 as a depth map or in the form of a point cloud, as illustrative, non-limiting examples.

Control device 150 includes a controller 152, one or more I/O devices 157, and network interface 160. Controller 152 may be any suitable machine that is specifically and specially configured (e.g., programmed) to perform one or more operations as described herein. In some implementations, controller 152 is not a general-purpose computer and is specially programmed or hardware-configured to perform the one or more operations as described herein. Additionally, or alternatively, controller 152 is or includes an application-specific integrated circuit (ASIC), a central processing unit (CPU), a graphical processing unit (GPU), a field programmable gate array (FPGA), or a combination thereof.

In some implementations, controller 152 includes one or more processors 154 and one or more memories 156. For example, controller 152 may include or correspond to a processing system that includes one or more processors 154 (hereinafter referred to as "processor 154") and one or more memories 156 (hereinafter referred to as memory 156"). Processor 154 may comprise various forms of processor-based systems in accordance with aspects described herein. For example, processor 154 may include a general purpose computer system (e.g., a personal computer (PC), a server, a tablet device, etc.) and/or a special purpose processor platform (e.g., application specific integrated circuit (ASIC), system on a chip (SoC), etc.).

Processor 154 may be configured to process actual scan data 176, perform object detection and/or recognition, perform coordination or control functions, or a combination thereof, as illustrative, non-limiting examples. Additionally, or alternatively, processor 154 may be configured to generate control information, such as control data 184 for another device, such as for robotic device 110, manufacturing tool 114, scan device 130, or a combination thereof. For example, processor 154 may be configured to perform one or more operations as described herein.

Memory 156 may include ROM devices, RAM devices, one or more HDDs, flash memory devices, SSDs, other devices configured to store data in a persistent or non-persistent state, or a combination of different memory devices. Memory 156 includes or is configured to store instructions 162, object data 164, pose data 166, and system information 168. In one or more aspects, memory 156 may store instructions 162, such as executable code, that, when executed by processor 154, cause processor 154 to perform operations according to one or more aspects of the present disclosure, as described herein. In some implementations, instructions 162 (e.g., the executable code) is a single, self-contained, program. In other implementations, instructions 162 (e.g., the executable code) is a program having one or more function calls to other executable code which may be stored in storage or elsewhere. The one or more functions attributed to execution of the executable code may be implemented by hardware. For example, multiple processors may be used to perform one or more discrete tasks of the executable code.

Object data 164 may include or correspond to data associated with one or more objects, such as first object 104, second object 106, or both. Object data 164 may include scan data 177, representation data 179, model data 180, physical data 181, and threshold data 182. Scan data 177 may include actual scan data 176 and simulated scan data 178. Actual scan data 176 may include or correspond to data obtained through performance, by scan device 130, of one or more scan operations. For instance, scan data 176 may include one or more images (e.g., visual images, radar images, LiDAR images, etc.) of an object, such as first object 104, generated through performance of a scan operation. Simulated scan data 178 may include or correspond to scan data generated through a simulation of one or more scan operations, such as by simulating an operation of scan device 130.

Representation data 179 may include or correspond to a digital representation of one or more objects, such as a digital representation of first object 104, second object 106, or both. For example, representation data 179 may include a CAD file corresponding to first object 104. Model data 180 may include or correspond to representation data 179 that has been combined with scan data 177 through a hybridization process described in more detail below. Additionally, or alternatively, model data 180 may include or correspond to representation data 179, scan data 177, or both such that representation data 179 and scan data 177 have not been combined to generate an updated or revised model of first object 104. Physical data 181 may include or correspond to physical parameters associated with an object, such as physical parameters associated with first object 104, second object 106, or both. For example, physical data 181 may include or correspond to information associated with a texture of a surface of object 104 or a region thereof, information associated with a color of the surface of object 104 or a region thereof, information associated with a reflectivity of the surface of object 104 or a region thereof, or a combination thereof.

Threshold data 182 may include or correspond to one or more threshold values. For example, threshold data 182 may include or correspond to value representing a distance from a randomly selected point on a digital representation of a region of first object 104 to seam 112. As other examples, threshold data 182 may include or correspond to a distance from a simulated welding head of robotic device 110 (e.g., manufacturing tool 114) to the region, a distance from a simulated scan device to the region, a volume corresponding to a bounding box imposed on the one or more instances of representation data 179, or a combination thereof.

Pose data 166 may include or correspond to data associated with a pose of an object, such as first object 104, a pose of scan device 130, a pose of a simulation of scan device 130, or a combination thereof. Pose data 166 may include object pose data 183, candidate pose data, scan pose data 186, or a combination thereof. Object pose data 183 may include or correspond to a pose of an object, such as a pose of first object 104. For instance, object pose data 183 may include an orientation of first object 104 relative to robotic device 110, relative to workspace 102, relative to scan device 130, or a combination thereof. Additionally, object pose data 183 may include a position in 3D space of first object 104. Candidate pose data 185 may include or correspond to one or more candidate poses associated with scan device 130, a simulation of scan device 130, or a combination thereof. For example, scan device 130 or a simulation thereof may be configured to be dynamically located in a plurality of different orientations, positions, or both relative to first object 104, second object 106, or a combination thereof, each orientation, position, or both corresponding to a candidate pose. From each candidate pose, scan device 130 or a simulation thereof may be configured to generate scan data 177 that may differ from a first candidate pose to a second candidate pose.

Scan pose data 186 may include or correspond to one or more candidate poses of a plurality of candidate poses corresponding to candidate pose data 185 that controller 152 may select based on evaluation criteria. Controller 152 may be configured to initiate a scan operation to be performed, by scan device 130, from scan poses corresponding to scan pose data 186. System information 168 may include or correspond to information associated with one or more characteristics of sensor 132, such as whether sensor 132 includes or corresponds to a camera, a radar, a laser, a LIDAR sensor, a ultrasonic sensor, or the like.

Instructions 162 include control logic 170, model logic 171, perception logic 172, registration logic 173, kinematic reachability and collision logic 174, and artificial intelligence (AI)/machine learning (ML) logic 175. Control logic 170 is configured to control operation or send commands or requests to one or more devices or components, such as the robotic device 110, manufacturing tool 114, scan device 130, or any combination thereof. In some implementations, control logic 170 may include scan control logic, weld control logic, or both. The scan control logic may be configured to control a scan process performed by scan device 130. For example, the scan control logic may be configured to control an angle, an inclination, a rotation, or any of the foregoing of scan device 130 so as to dynamically position and orient scan device 130 with respect to first object 104, second object 106, or both, thereby generating one or more candidate poses corresponding to candidate pose data 185. The weld control logic may be configured to control a welding process performed via a welding tool such as performed by manufacturing tool 114. Although described as being included in controller 152, in other implementations, the scan control logic, the weld control logic, or both may be included in a different device that is configured to communicate with controller 152.

Model logic 171 may be configured to perform one or more operations associated with representation data 164, model data 180, or both. For example, model logic 171 may be configured to parse or process a CAD file or other digital representation of the target object included in representation data 179 to identify one or more objects, a surface geometry of the one or more objects, one or more subcomponents, a final assembly, annotation information, a point cloud model of an object or final assembly, welding instructions, a welding plan, or a combination thereof. Additionally, model logic 171 may be configured to combine representation data 179 and scan data 177.

In some implementations, some of the information parsed by model logic 171 may be appended to representation data 179 (e.g., a CAD file) after receiving a user input via one or more I/O devices 157. For example, the information may be appended or added or provided to representation data 179 after an input is received from a user via a user interface corresponding to I/O devices 157. The user input may include object pose data 183 of one or more objects, such as first object 104. Object pose data 183 may be provided by the user by interacting, via the user interface, with a computer generated animation or model of the object, such as first object 104. In such implementations, the user may change the pose of the model of the object, such as first object 104, to match the actual pose of first object 104 as situated in workspace 102.

Perception logic 172 may be configured to perform one or more operations associated with processing object data 164, generating a 3D representation (e.g., a 2D representation and/or a 3D representation) based on object data 164, locating and identifying an object, generating pose data 166, performing object joining processing, or a combination thereof, as illustrative, non-limiting examples. In some implementations, perception logic 172 may be configured to perform one or more operations based on or in conjunction with the registration logic 173, kinematic reachability and collision logic 174, AI/ML logic 175, or a combination thereof. Although one or more operations of perception logic 172 are described herein with reference to a 3D representations, similar operations may be performed by perception logic 172 with respect to 2D data and/or a 2D representation.

In some implementations, perception logic 172 may use object data 164 to generate a 3D representation associated with the workspace 102 or one or more objects associated with an assembly task. For example, object data 164, such as scan data 176, simulated scan data 178, or both may include one or more images (e.g., 2D image data captured by scan device 130 at a particular orientation relative to the first object 104 or the second object 106). Perception logic 172 may overlap or stitch together multiple images to generate 3D image data associated with a 3D representation. In some implementations, if the 3D representation includes multiple objects, perception logic 172 perform a clustering algorithm (e.g., K-means, affinity propagation, DBSCAN, mean shift, etc.) to segment or partition the 3D representation in different classes or clusters. Additionally, or alternatively, the clustering algorithm may locate and identify a target object, such as an object to be assembled, within the 3D representation. In some implementations, the clustering algorithm may identify a region of an object, such as seam 112 at which first object 104 and second object 106 are conjoined or are to be conjoined.

In some implementations, to identify the target object (e.g., first object 104), a region of the target object, or any combination thereof, perception logic 172 may utilize information (e.g., annotations or user input from a user, shape of the objects forming the final object, identity information of the objects forming the final assembled object present in representation data 179, or a combination thereof) present in representation data 179 to identify and locate the target objects, regions thereof, or both within the 3D representation. For example, perception logic 172 may perform a shape-identifying algorithm to determine the shape of one or more objects within representation data 179. To illustrate, perception logic 172 (or model logic 171) may determine the shapes of the objects or regions thereof in the final assembled object present in representation data 179 (e.g., either shape information in the file or by implementing a feature or shape recognition algorithms) and use the determined shape to identify the target objects or regions thereof in the 3D representation. In some implementations, the annotations from the user may include seam annotations (e.g., indicating a location of seam 112), annotations corresponding to the locations at which tack welds are to be performed, and the like.

In some implementations, perception logic 172 may not perform the clustering algorithm in situations where the target objects, regions thereof, of both have identity information (e.g., unique ID information) associated therewith. This identity information may be present in representation data 179. Additionally, or alternatively, the identity information may be loaded (or provided) to the controller 152 from scan device 130. For instance, scan device 130 may be configured to perform a preliminary scan of first object 104, and a unique ID associated with first object 104, a region thereof, of both may be present in associated scan data 178. In such implementations, after generating the 3D representation and receiving the unique IDs associated with the objects forming the final assembled object, perception logic 172 may identify the target objects within the 3D representation using the unique IDs or other information provided to controller 152. After the target object is identified, perception logic 172 may locate the target object, such as locating the target object within or in relation to the workspace 102 or a device of the robotic system 100. For example, after identification of the target objects or regions thereof, perception logic 172 may determine a location within representation data 179, which may be translated to a real-life location of the target object or region thereof.

In some implementations, perception logic 172 may determine a pose of a target object, such as first object 104, thereby generating object pose data 183 corresponding to the pose of the target object (e.g., first object 104). For example, perception logic 172 may parse representation data 179 to identify any asymmetries associated with the target object, such as first object 104. For instance, based on parsing representation data 179, perception logic 172 may identify second object 106 appended to first object 104 as an asymmetrical feature of first object 104, since no reciprocal third object is appended to first object 104 (e.g., in a direction opposite to second object 106). Based on identifying one or more asymmetrical features of first object 104, perception logic 172 may instruct control logic 170 to initiate a first scan of first object 104 in a region of second object 106 proximate to second object 106. Accordingly, control logic 170 may instruct scan device 130 to perform the first scan of first object 104 in a region of first object 104 that is proximate to second object 106. Based on actual scan data 176 generated from the first scan, representation data 179, or a combination thereof, perception logic 172 may be configured to identify a pose of first object 104 including or corresponding to an orientation of first object 104 within workspace 102, a position of first object 104 within workspace 102, or a combination thereof.

Additionally, perception logic 172 may be configured to generate simulated scan data 178. To illustrate, perception logic 172 may be configured to simulate, based on system information 168, physical data 181, or both, a scan operation. To simulate the scan operation, perception logic 172 may be configured to simulate, for each candidate pose of a plurality of candidates poses of simulated scan device 130, transmission of a simulated signal to a region of a surface of an object, such as first object 104. For instance, perception logic 172 may be configured to simulate transmission of the simulated signal to the region of first object 104 at which seam 112 is present. Additionally, or alternatively, perception logic 172 may be configured to simulate, for each candidate pose of a plurality of candidates poses of simulated scan device 130, receipt of a simulated reflected signal from the region of the surface of the object. The simulated transmitted signal may include or correspond to a signal capable of being transmitted by sensor 132. For instance, if, based on system information 168, sensor 132 is a camera, simulated transmitted signal may include or correspond to a simulated visible light signal. Similarly, the simulated reflected signal may include or correspond to a signal reflected by the surface in response to receipt, by the surface, of the simulated transmitted signal. For example, if the simulated transmitted signal corresponds to a visible light signal, the simulated reflected signal likewise corresponds to a simulated visible light signal.

Registration logic 173 is configured to perform a registration process. The registration process is configured to transform or align data from different sources, such as representation data 179 and scan data 177 with the same coordinate frame or system. To illustrate, registration logic 173 may perform the registration process based on the point cloud of a CAD model of first object 104 included in registration data 179 and a 3D representation of first object 104 generated by sampling the CAD model point cloud and the 3D representation. The sampling may be performed such that the points in the CAD model point cloud and the 3D representation have a uniform or approximately uniform dispersion or equal or approximately equal point density. Based on the sampling, the coordinate systems of the model and the 3D representation may be coarsely (e.g., with resolution of 1 cm) and finely (e.g., with a resolution of 1 mm) aligned.

Kinematic reachability and collision logic 174 is configured to perform a kinematic reachability analysis and a collision analysis. For example, kinematic reachability and collision logic 174 may be configured to evaluate a scan trajectory comprised of multiple scan poses by modelling potential collisions among scan device 130 that travels according to the scan trajectory and objects present in workspace, such as another robotic device. In evaluating kinematic reachability and collision, kinematic reachability and collision logic 174 may perform multiple different computations. In some examples, these computations may be mutually exclusive from one another. Kinematic reachability and collision logic 174 may use a flexible collision library (FCL) in performing the collision computation. The FCL includes various techniques for efficient collision detection and proximity computations, as a tool in the collision avoidance analysis or computation. The FCL is useful to perform multiple proximity queries on different model representations, and it may be used to perform probabilistic collision identification between 3D representations. Additional or alternative resources may be used in conjunction with or in lieu of the FCL.

AI/ML logic 175 is configured to apply one or more AI/ML techniques to facilitate one or more scan operations as disclosed herein. For example, AI/ML logic 175 may include or correspond to an artificial neural network (ANN). The ANN may be configured to receive training data that may include or correspond to object data 164, pose data 166, or both. Based on the training data, ANN may be configured to identify patterns in object data 164 received after the ANN is trained. Accordingly, based on these patterns, the ANN may be configured to more quickly identify an object pose of an object, such as first object 104, may be configured to more quickly identify a seam, such as seam 112, or a combination thereof.

One or more I/O devices 157 may include a mouse, a keyboard, a display device, the camera, other I/O devices, or a combination thereof, as illustrative, non-limiting examples. Network interface 160 may be configured to communicatively couple control device 150 to one or more other devices, such as the robotic device 110, manufacturing tool 114, scan device 130, or a combination thereof. For example, control device 150 may be configured to receive scan data 176 from scan device 130, output control data 184 to one or more other devices, or a combination thereof. To illustrate, control device 150 may be configured to communicate via an Ethernet connection or a wireless communication protocols such as Wi-Fi.

In some implementations, control device 150 may be a single device configured to perform the operations described herein. Those of skill in the art would recognize that although FIG. 1 illustrates control device 150 as a single block, the implementation of control device 150 is not limited to a single component, and instead may be distributed over several components. For example, operations of control device 150 may be distributed over multiple devices configured to perform all or a portion of the operations of control device 150 in accordance with the present disclosure. Implementing control device 150 functionality over multiple devices may increase efficiency, processing time, and reliability of the robotic system 100.

Figure 2:
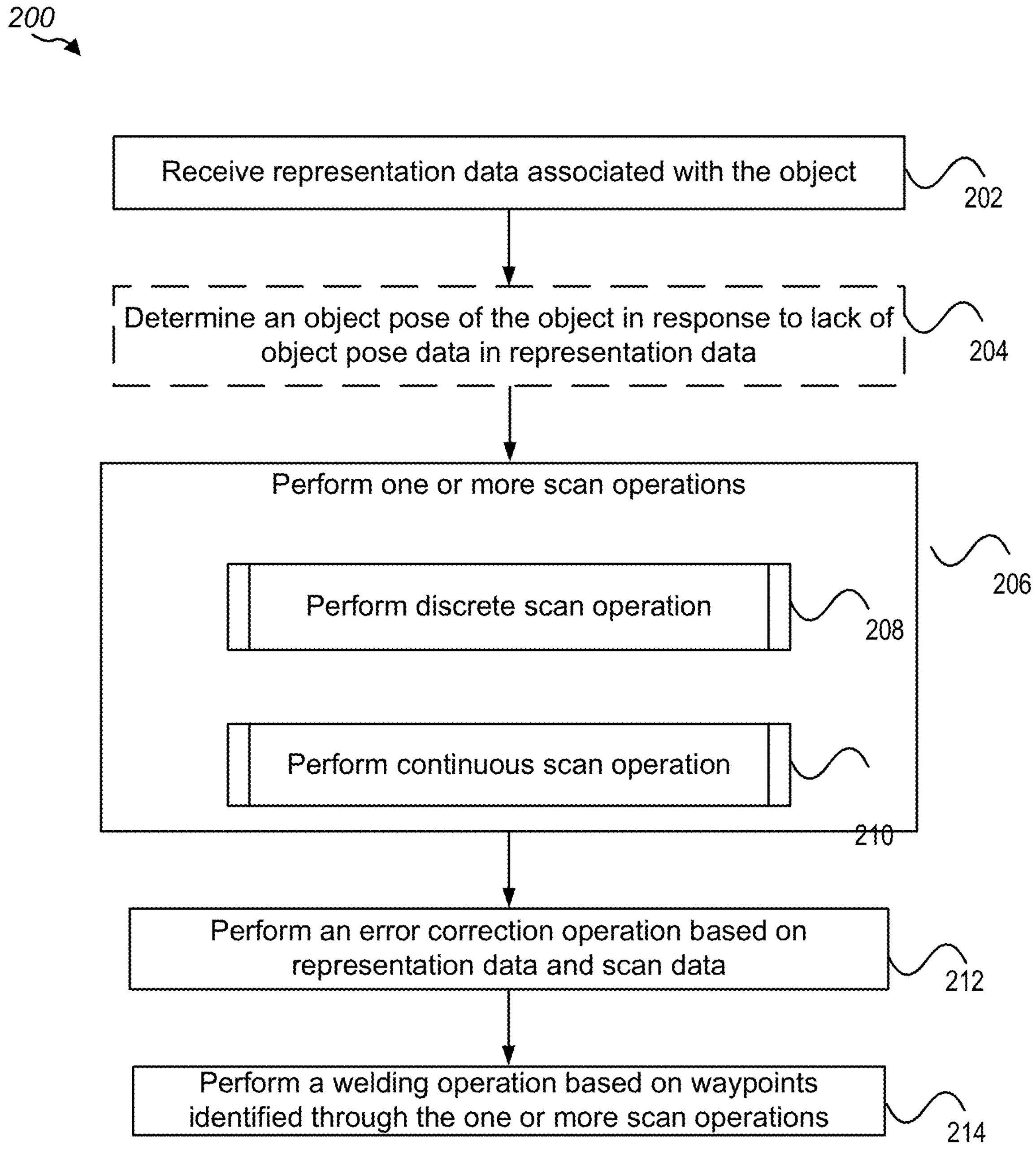
FIG. 2 is a flow diagram illustrating an example process for supporting one or more scan operations according to one or more aspects.
Figure 3:
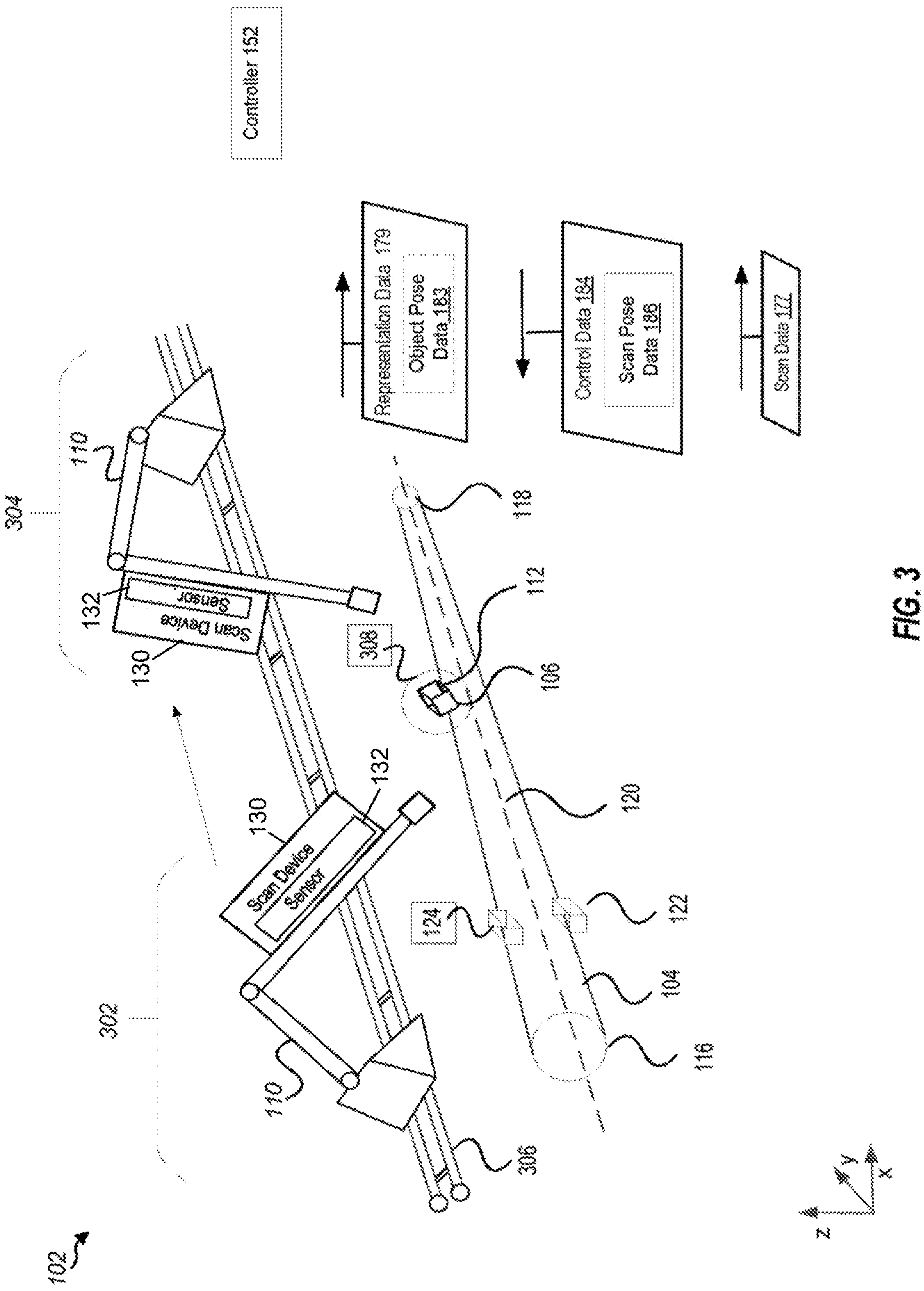
FIG. 3 is a block diagram illustrating an example of a robotic system that supports one or more scan operations according to one or more aspects.

An illustrative example of a cycle of operation of robotic system 100 is described with reference to FIGS. 2 and 3. FIG. 2 is a flow diagram illustrating an example process for supporting one or more scan operations according to one or more aspects. Operations of process 200 may be performed by a controller of a robotic system, such as controller 152 described with reference to FIGS. 1 and 3. FIG. 3 is a block diagram illustrating an example of a robotic system 102 that supports one or more scan operations according to one or more aspects. In particular, FIG. 3 illustrates candidate poses 302, 304 capable of being assumed by scan device 130 mounted on robotic device 110.

At block 202, a controller of a robotic system receives representation data associated with an object. For example, controller 152 of robotic device 110 may receive representation data 179 associated with first object 104. Representation data 179 may include a digital representation of first object 104, such as a CAD file corresponding to first object 104.

In some implementations, representation data 179 may include object pose data 183 corresponding to a pose of first object 104. Based on representation data 178, object pose data 183, or a combination thereof, controller 152 may be configured to identify an approximate position, orientation, or both of one or more features associated with first object 104 and seams thereof.

For example, a feature of first object 104 may include second object 106 conjoined to first object 104. Based on representation data 179 that includes object pose data 183, controller 152, processing representation data 179, may be configured to identify an approximate location of region 308 of a surface of object 104 that includes seam 112. To illustrate, first object 104 may be a utility pole and second object 106 may be a bracket on the utility pole. Second object 106 may be tack welded (e.g., via a temporary weld) to first object 104, but may not be affixed to first object 104 through a permanent weld. Controller 152, executing model logic 171, perception logic 172, or both, may be configured to identify region 308 on the surface of the utility pole (e.g., first object 104) that includes a seam (e.g., seam 112) at which the bracket (e.g., second object 106) is to be permanently welded to first object 104 through an autonomous welding operation performed by robotic device 110. Accordingly, controller 152, executing control logic 170, may send control data 184 to scan device 130 to cause scan device 130 to scan a region of first object 104 proximate to second object 106 and seam 112.

At block 204, the controller of the robotic system determines an object pose of the object in response to object pose data not being included in the representation data. In particular, in some implementations, representation data 179 lacks object pose data 183. For example, in addition to including a digital representation of first object 104, representation data 179 may only include general orientation information associated with first object 104, such as a location of posterior end 116 of first object 104 or a location of anterior end 118 of first object 104 relative to a cradle (not illustrated) or positioner in which first object 104 may be placed. To generate object pose data 183 and thereby determine a pose of first object 104, controller 152, executing model logic 171, perception logic 172, or both, may be configured to process representation data 179, parsing representation data 179 to identify asymmetries in representation data 179. For example, controller 152 may be configured to identify an axis of symmetry (e.g., a principal axis of symmetry) associated with first object 104, such as a principal axis of symmetry 120. Having identified an axis of symmetry, controller 152 may identify features that are asymmetrical with respect to the axis of symmetry. For example, based on processing representation data 179, controller 152 may identify second object 106 as being asymmetrical with respect to principal axis of symmetry 120, since no third object is diametrically adjacent to second object 106 relative to principal axis of symmetry 120. In contrast, by processing representation data 179, controller 152 may identify that third object 122 and fourth object 124 are diametrically adjacent to one another with respect to principal axis of symmetry 120.

However, in other cases, an axis of symmetry (e.g., a principal axis of symmetry) may not be present in an object. For example, an object may have an irregular or generally asymmetrical shape. Accordingly, in such cases, controller 152 may process representation data 179 to identify features associated with the object that lack a mirror-image or reciprocal feature or that are otherwise unique. For instance, second object 106 lacks a reciprocal or mirror-image feature.

Additionally, based on identified asymmetrical features, features that lack reciprocal copies, features that are otherwise unique, or the like, controller 152, executing control logic 170, may generate control data 184 to cause scan device 130 to perform a first scan of a region proximate to the identified asymmetrical or unique feature of the object. For instance, controller 152 may cause scan device 130 to perform a first scan operation of region 308 of first object 104 proximate to second object 106 and seam 112. Based on scan data 176 generated from the first scan combined with representation data 179, controller 152, executing model logic 171, perception logic 172, or both, may be configured to rapidly identify an accurate and a precise position and orientation of region 308 of first object 104 at which second object 106 and seam 112 are positioned. Further implementational details regarding determination of object pose data 183 are explained herein with reference to FIGS. 8 and 10A-10F.

At block 206, the controller of the robotic system performs one or more scan operations. For example, at block 208, controller 152, executing control logic 170, may initiate a scan operation by generating control data 184 sent to scan device 130, to cause scan device 130 to perform a discrete scan operation in the proximity of region 308 of first object 104 at which second object 106 and seam 112 are positioned. Additional details regarding the discrete scan operation are described herein with reference to FIGS. 4-9.

Additionally, or alternatively, at block 210, controller 152, executing control logic 170, may initiate a scan operation by generating control data 184 sent to scan device 130, to cause scan device 130 to perform a continuous scan operation in the proximity of region 308 of first object 104 at which second object 106 and seam 112 are positioned. Additional details regarding the continuous scan operation are described herein with reference to FIGS. 10-13.

At block 212, the controller of the robotic system performs an error correction operation based on representation data and scan data. For example, controller 152, comparing representation data 179 and actual scan data 176 generated from the one or more scan operations, may be configured to correct deviations between representation data 179 and features of the object to which representation data 179 corresponds. For instance, by comparing representation data 179 and actual scan data 176 associated with a region proximate to second object 106 and seam 112, controller 152 may be configured to update representation data 179 based on actual scan data 176.

At block 214, the controller of a robotic system initiates performance of a welding operation based on waypoints identified through the one or more scan operations. For example, controller 152, executing control logic 170, may generate and send control data 184 to robotic device 110 to cause robotic device 110 to perform a weld operation at waypoints along seam 112 of first object 104. Controller 152 may identify or determine the waypoints based on actual scan data 176 generated through performance of the one or more scan operations.

Figure 4:
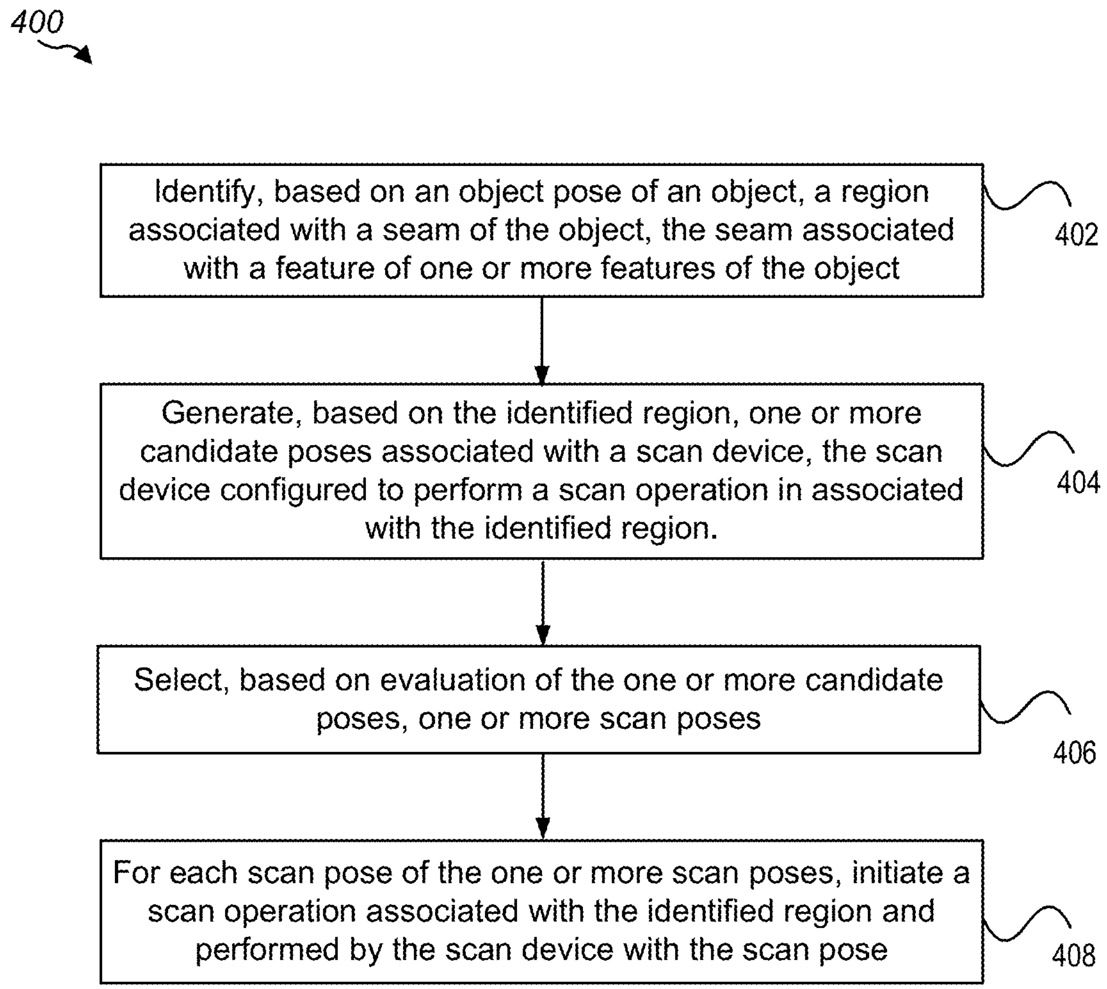
FIG. 4 is flow diagram illustrating an example process for supporting one or more discrete scan operations according to one or more aspects.

FIG. 4 is a flow diagram illustrating example process for supporting one or more discrete scan operations according to one or more aspects. Operations of process 400 may be performed by a controller of a robotic system, such as controller 152 described with reference to FIGS. 1 and 3.

At block 402, a controller of a robotic system identifies, based on an object pose of an object, a region associated with a seam of the object, the seam associated with a feature of one or more features of the object. For example, controller 152, executing model logic 171, perception logic 172, or a combination thereof, may identify, based on object pose data 183 of an object, such as first object 104, region 308 associated with seam 112. Seam 112 is associated with second object 106, constituting a feature of first object 104.

Figure 5:
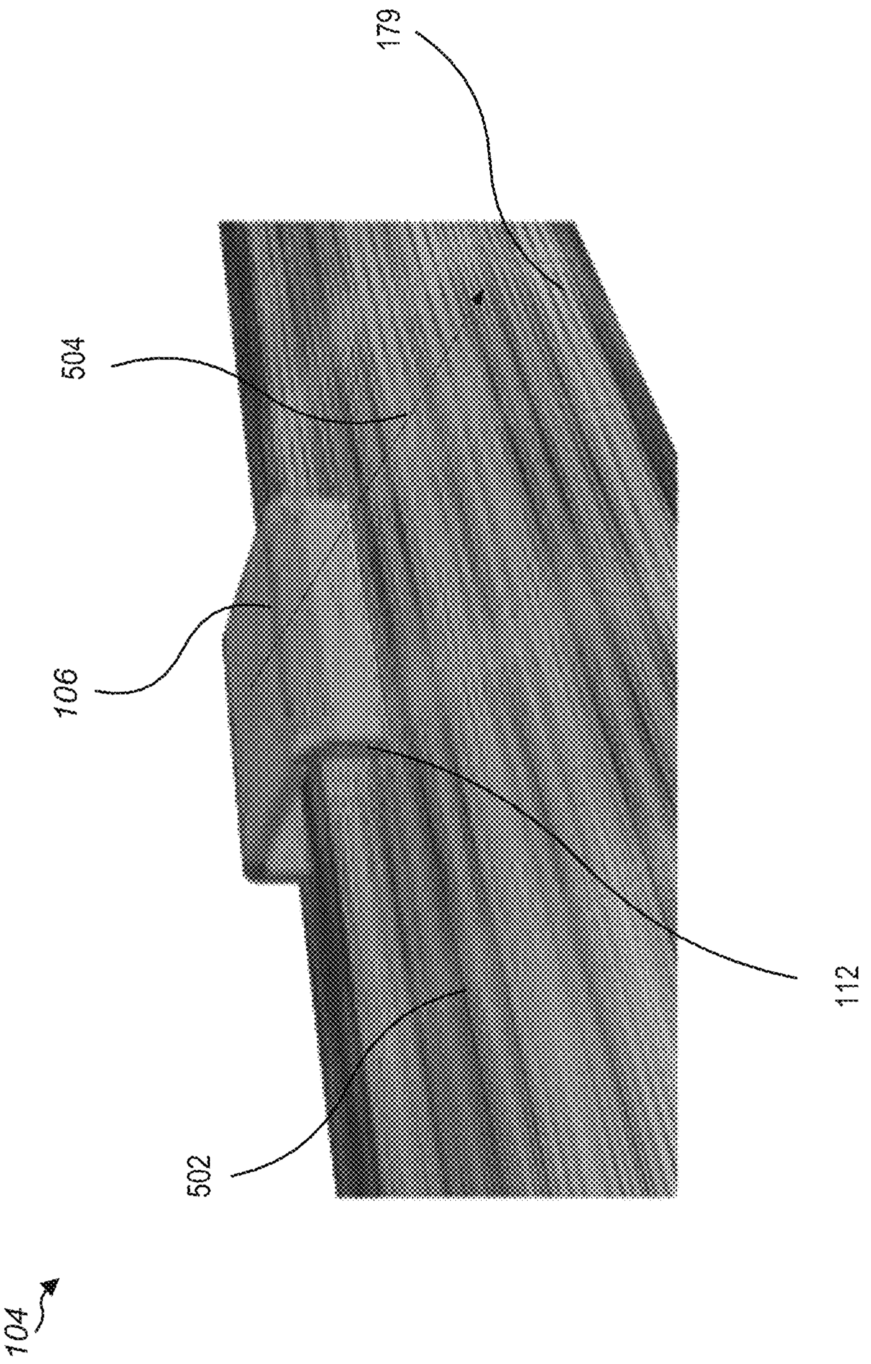
FIG. 5 is a diagram illustrating an example of identification of a region associated with a seam of an object according to one or more aspects.

Referring to FIG. 5, FIG. 5 is a diagram illustrating an example of identification of a region associated with a seam of an object according to one or more aspects. In particular, FIG. 5 depicts second object 106, seam 112, seam region representation data 502, threshold radius 504, and representation data 179 associated with first object 104 and that falls outside of threshold radius 504. In some implementations, controller 152 may access threshold data 182, which may include a value corresponding to threshold radius 504. Controller 152 may compare each instance of representation data 179 against the value of threshold radius 504 and may expunge instances of representation data 179 that fall outside the value of threshold radius 504, thereby leaving instances of threshold data that fall within the value of threshold radius 504 as seam region representation data 502. Accordingly, when performing process 400, controller 152 may ignore instances of representation data 179 that fall outside the value of threshold radius 504, thereby processing instances of seam region representation data 502.

A technical advantage associated with removing instances of representation data 179 that fall outside the value of threshold radius 504 includes improving an efficiency with which a discrete scan operation may be performed. To illustrate, by removing instances of representation data 179 that fall outside the value of threshold radius 504, controller 152 is able to process data, such as seam region representation data 502, that is more likely to be pertinent to identify the region, such as region 308, associated with seam 112 of first object 104. Accordingly, by conserving computational resources (e.g., processing resources, memory, etc.), controller 152 may be configured to more rapidly identify region 308 than if controller 152 were to process the totality of representation data 179 associated with first object 104.

Referring back to FIG. 4, at block 404, the controller of the robotic system generates, based on the identified region, one or more candidate poses, associated with a scan device, the scan device configured to perform a scan operation in associated with the identified region. For example, controller 152, executing model logic 171, perception logic 172, or a combination thereof, may generate one or more candidate poses 302, 304, associated with scan device 130, which is configured to perform a scan operation in association with identified region 308. To illustrate, controller 152 may access system information 168 to determine candidate poses which scan device 130 is physically capable of assuming. For instance, scan device 130 may be configured to scan first object 104 from a plurality of vantage points or perspectives that correspond to candidate poses 302, 304. In particular, robotic device 110 may be mounted on rail 306, cable, or other mobile configuration and may be configured to move relative to first object 104. Accordingly, through movement of robotic device 110, scan device 130 may be configured to scan first object 104 from a plurality of unique candidate poses by moving on rail 306, cable, or other path relative to first object 104. Additionally, or alternatively, a robotic arm on which scan device 130 may be mounted may itself move relative to first object 104, thereby facilitating a scan operation of first object 104 from multiple perspectives, each corresponding to a candidate pose. Based on system information 168 that indicates the poses of which scan device 130 is capable of assuming (e.g., the different perspectives from which scan device 130 may scan one or more objects), controller 152 may be configured to generate or instantiate a plurality of candidate poses, storing data corresponding to these candidate poses in a memory, such as memory 156, as candidate pose data 185. Accordingly, candidate pose data 185 may include or correspond to instructions to cause robotic device 110, scan device 130, or a combination thereof to assume a configuration in accordance with each candidate pose of the candidate pose data 185.

In some implementations, controller 152 may be configured to initiate a first scan from one or more candidate poses of the plurality of candidates poses. For example, controller 152 may be configured to initiate a scan of a segment of an object, such as first object 104, from a candidate pose of the plurality of candidate poses. Accordingly, by generating a sample scan from one or more candidates poses of the plurality of candidates poses, controller 152 may generate actual scan data 176 associated with each candidate pose of the plurality of candidate poses.

Additionally, or alternatively, controller 152 may be configured to simulate a scan operation from one or more candidate poses of the plurality of candidate poses to generate simulated scan data 178. For example, based on one or more characteristics of sensor 132, based on one or more physical parameters associated with the object to be scanned (e.g., first object 104), or a combination thereof, controller 152 may be configured to simulate one or more scan operations from one or more scan poses of the plurality of candidate poses. In particular, controller 152 may access system information 168, which may include data corresponding to the one or more characteristics of sensor 132, such as imaging capabilities of sensor 132 (e.g., whether sensor 132 is capable of generating visual images, acoustic images, radar images, LiDAR images, etc.). Additionally, controller 152 may access physical data 181, which may indicate material characteristics associated with a material from which a surface of an object to be scanned, such as first object 104, may be composed.

To simulate the scan operation, controller 152 may be configured to perform a ray tracing operation. In performing the ray tracing operation, controller 152 may be configured to trace a simulated light ray from a first location corresponding to a candidate pose to one or more second locations of the region, such as region 308. The region may be simulated based on representation data 179 corresponding to the object. In some implementations, controller 152 may be configured to determine at least one characteristic of a simulated reflection of the simulated light ray. The simulated reflection may be modeled from the one or more second locations. In some implementations, the at least one characteristic includes a color of the simulated reflection, an intensity of the simulated reflection, or a combination thereof. Additionally, or alternatively, controller 152 may be configured to determine the at least one characteristic based on one or more physical parameters associated with the component, such as may correspond to physical data 181.

While the example ray tracing operation is described with respect to a simulated light ray (e.g., using any wavelength of light), the ray tracing operation may not be limited to a simulated light ray. For example, more generally, to simulate the scan operation, controller 152 may be configured to simulate, for each candidate pose of a plurality of candidate poses (e.g., corresponding to candidate pose data 186), transmission of a simulated signal to a surface of the object corresponding to the region. Additionally, controller 152 may be configured to simulate receipt of a simulated reflected signal from the surface of the region of the object. To illustrate, the simulated transmitted signal may correspond to a first signal capable of being transmitted by a sensor, such as sensor 132. For instance, if sensor 132 includes or corresponds to an ultrasonic sensor, the simulated transmitted signal may include or correspond to a sound wave capable of being transmitted by sensor 132. The simulated reflected signal may include or correspond to a second signal reflected by the surface of the region of the object in response to receipt, by the surface, of the first signal. For example, the simulated reflected signal may include or correspond to a simulated reflected sound wave reflected by the surface in response to receipt, by the surface, of the simulated transmitted sound wave.

Regardless of the mechanics associated with generation of scan data 177, controller 152 may be configured to store, in memory 156, each instance of scan data 177 associated with a candidate pose of the plurality of candidate poses. By storing each instance of scan data scan data 177 that is associated with a candidate pose, controller 152 may rapidly access scan data 177 associated with the candidate pose to assess or analyze each candidate pose based on one or more characteristics of scan data 177 associated with the candidate pose.

Figure 6:
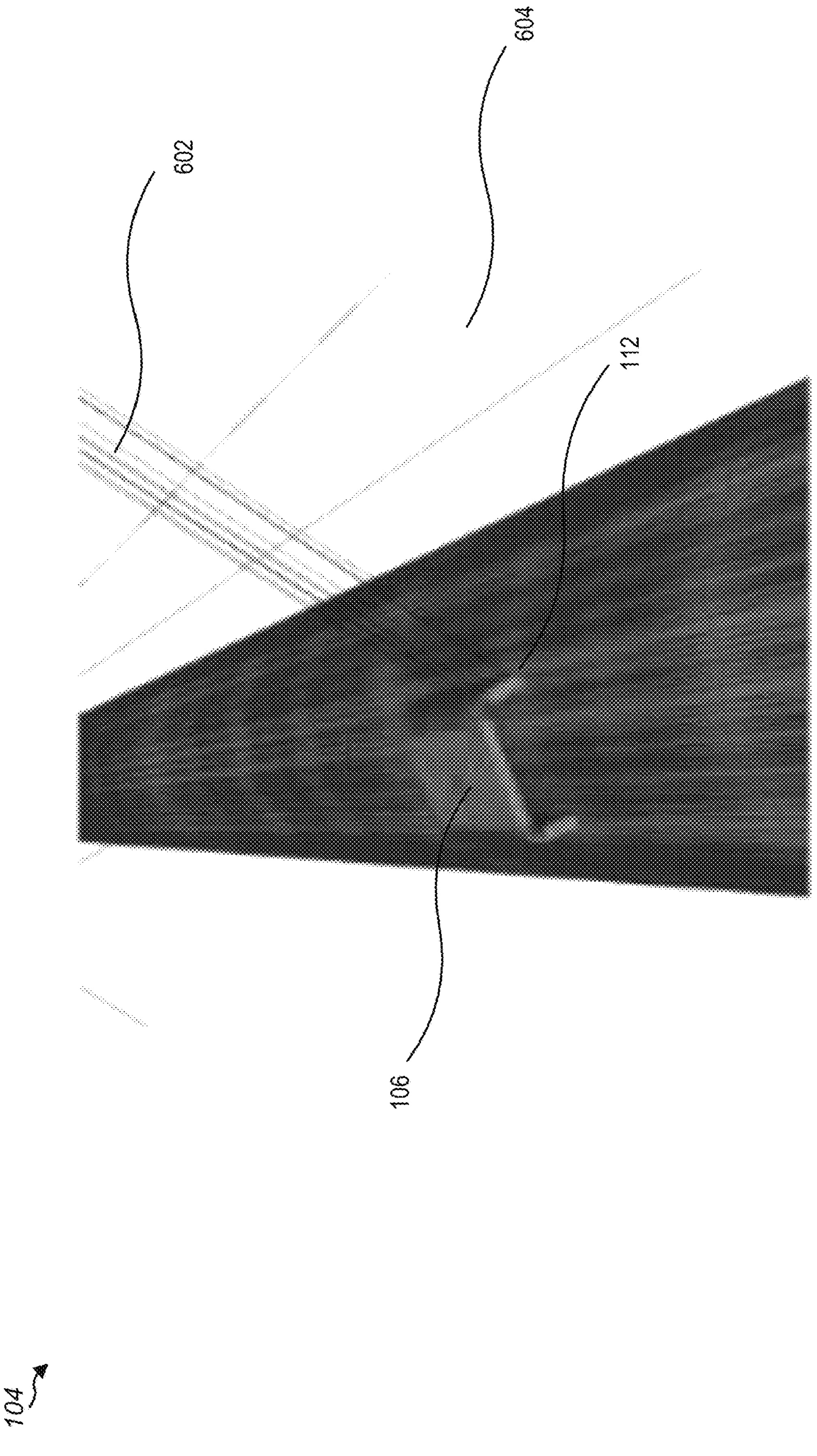
FIG. 6 is a diagram illustrating generation of one or more candidate poses according to one or more aspects.

Referring to FIG. 6, FIG. 6 is a diagram illustrating generation of one or more candidate poses according to one or more aspects. In particular, FIG. 6 depicts first object 104, second object 106, seam 112, one or more normals 602 from a surface of seam 112 to a position of a simulated or actual scan device 130 (not depicted), and collision zone 604. In some implementations, controller 152 may be configured, based on processing representation data 178, to identify one or more instances of representation data 178 (e.g., one or more points of 3D point cloud data) that correspond to points along seam 112. In some implementations, controller 152 may further be configured to perform a ray tracing operation from the one or more instances of representation data 179 that correspond to points along seam 112 to a position of a simulated scan device 130, an actual scan device 130, or both to generate normals 602. Additionally, controller 152 may be configured to situate the actual or simulated scan device 130 at a distance from first object 104 that is outside collision zone 604. Collision zone 604 may indicate or represent a region such that, if scan device 130 were placed within collision zone 604, a collision may occur between scan device 130 and first object 104, second object 106, or both. Accordingly, controller 152 may be configured to generate one or more candidate poses, corresponding to instances of candidate pose data 185, that are outside collision zone 604 and such that one or more normals 602 could be drawn from a surface of a region proximate to seam 112 to the actual or simulated scan device 130. Further implementational details regarding generation of instances of candidate pose data 185 corresponding to one or more candidate poses are described herein with reference to FIGS. 11-18.

Referring back to FIG. 4, at block 406, the controller of the robotic system selects, based on evaluation of the one or more candidate poses, one or more scan poses. For example, controller 152 may evaluate candidate scan pose data 185, corresponding to each candidate scan pose, based on scan data 177 generated by or associated with each candidate scan pose corresponding to each instance of candidate scan pose data 185. To illustrate, controller 152 may select a first instance of candidate scan pose data 186 corresponding to a first candidate scan pose as scan pose data 186. Controller 152 may be configured to store selected instances of candidate pose data 185 as scan pose data 186.

To perform the selection, controller 152 may compare first scan data 177 associated with the first candidate pose and second scan data 177 associated with the second candidate pose based on evaluation criteria. The evaluation criteria may include a quantity of a surface area of a region of the object, such as first object 104, imaged by different instances of scan data 177. For example, controller 152 may determine that first scan data 177 associated with the first candidate pose images a larger surface area of region 308 of first object 104 than is imaged by second scan data 177 associated with the second candidate pose. Additionally, or alternatively, the evaluation criteria may include the informational content of scan data 177 associated with each instance of candidate pose data 185. The informational content may include or correspond to a utility of scan data 177 in identifying a seam of an object upon which an assembly operation is to be performed, to perform an assembly operation, or both. To illustrate, scan data 177 that includes more information corresponding to seam 112 of region 308, that includes more information to facilitate an assembly operation, such as a welding first object 104 to second object 106, or both has greater overall utility than scan data 177 that includes less information about each of the foregoing. For example, while first scan data 177 associated with first candidate pose 302 may image a larger surface area of region 308 of first object 104 than second scan data 177 associated with second candidate pose 304, controller 152 may determine that second scan data 177 associated with the second candidate pose 304 has a higher informational content than first scan data 177. In particular, second scan data 177 associated with second candidate pose 304 may include more information corresponding to seam 112 of region 308 than is included in first scan data 177 associated with first candidate pose 302. Since an assembly operation (e.g., a weld operation) is to be carried out on seam 112, controller 152 may be configured to an instance of candidate pose data 185 associated with the second pose rather than the instance of candidate pose data 185 associated with the first candidate pose. As another example, the evaluation criteria may include a feasibility of the candidate pose. For example, a candidate pose may not physically be configurable to generate actionable scan data, because the region of the seam may be obscured by one or more other physical features from the candidate pose. For example, images generated from first candidate pose 302, second candidate pose 304, or both may be obscured or blocked by other features (not depicted in FIG. 3) that may physically obscure an image generated from the relevant candidate pose. Additionally, or alternatively, from the candidate pose, scan device 130 may collide with one or more obstructions such that scan device 130 cannot generate scan data 177 from the candidate pose without colliding with the one or more obstructions.

Figure 7:
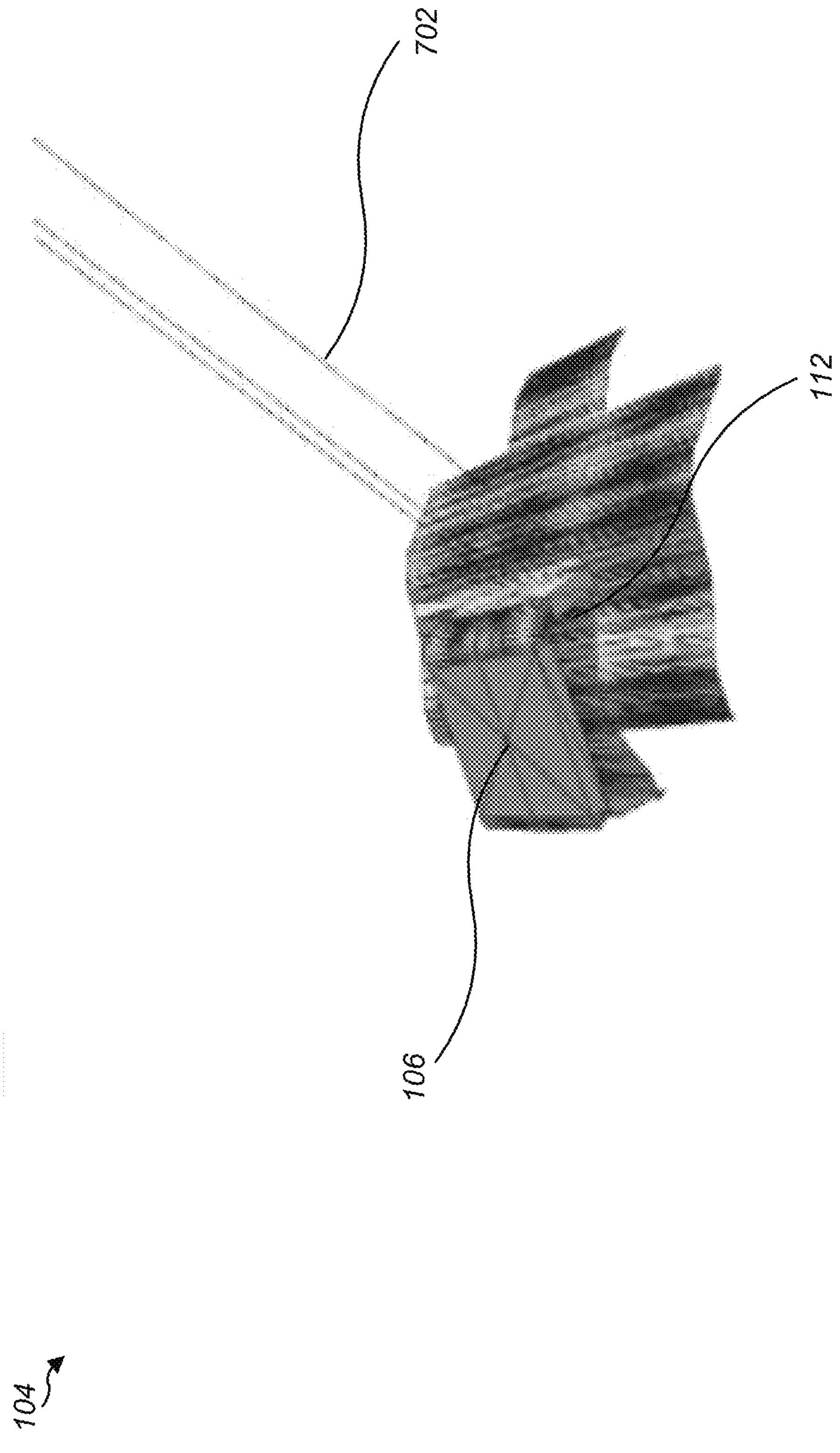
FIG. 7 is a diagram illustrating selection, based on evaluation of the one or more candidate poses, of one or more scan poses according to one or more aspects.

Referring to FIG. 7, FIG. 7 is a diagram illustrating selection, based on evaluation of the one or more candidate poses, of one or more scan poses according to one or more aspects. In particular, FIG. 7 depicts first object 104, second object 106, one or more selected scan poses 702, and seam 112. Controller 152 may select the one or more selected scan poses 702 based on the evaluation criteria described above.

Referring back to FIG. 4, at block 408, for each scan pose of the one or more scan poses, a component of a robotic system initiates a scan operation associated with the identified region and performed by the scan device with the scan pose. For example, controller 152 may send control data 184 that includes scan pose data 186 to robotic device 110. Based on control data 184 and scan pose data 186, robotic device 110 may configure itself to perform the scan operation, using scan device 130, from one or more perspectives corresponding to each scan pose associated with the one or more instances of scan pose data 186. The scan operation may be focused on region 308 of first object 104. Additionally, for the discrete scan operation, the scan device, such as scan device 130, may perform the scan operation from a first scan pose corresponding to a first instance of scan pose data 186 and from a second scan pose corresponding to a second instance of scan pose data 186 but not continuously from a trajectory defined by the first scan pose to the second scan pose.

The disclosed discrete scan operation as described above may enhance an accuracy, a precision, a speed, an efficiency, or a combination thereof with which a scan operation may be performed. By identifying a region, such as region 308, associated with a seam of an object to be scanned, such as first object 104, a targeted scan operation may be performed to generate scan data to facilitate an assembly operation, such a weld operation, at the seam. In this manner, accurate and precise scan data associated with the seam may be generated. Accordingly, in contrast to conventional techniques, in which a totality or approximately a totality of a surface area of an object may be scanned, by identifying a region proximate to a seam, the scan operations described herein avoid the additional time and resources (e.g., processing resources, memory) associated with scanning surfaces of an object at which an assembly operation may not be performed, such as surfaces of an object that are not proximate to a seam. Accordingly, the scan operations described herein additionally enhance an efficiency and a speed with which a scan operation may be performed.

Further, by evaluating a plurality of candidate poses from which to perform a scan operation, scan poses may be selected that generate scan data having high informational density. To illustrate, in conventional techniques, scan operations may be performed indiscriminately, regardless of informational content of scan data generated thereby. As a result, computational resources, such as memory and processing power, may be wasted on scan data not otherwise useful to facilitate performance of an assembly operation. In contrast, the scan operations described herein generate either actual or simulated scan data from a plurality of candidate poses. By evaluating the actual or simulated scan data according to a selection criteria that include an informational density of the scan data, scan data may be generated that has greater utility to facilitate an assembly operation. In this manner, while the scan operations described herein may generate less scan data than a conventional technique, a utility (e.g., a quality) of the resulting scan data may be greater than voluminous scan data generated by conventional techniques.

In some implementations, a controller of the robotic system is configured to determine the object pose of the object. For example, controller 152 may be configured to determine object pose data 183 corresponding to an object pose of first object 104. In particular, representation data 179, received by controller 152, may lack object pose data 186. Accordingly, controller 152 may be configured to determine object pose data 183 corresponding to an object pose of first object 104.

In some implementations, the controller of the robotic system is configured to determine the object pose of the object based on a first scan performed on a segment of the object, the segment associated with the one or more features of the object, the one or more features identified based on a representation of the object. For example, controller 152 may be configured to determine object pose data 183 corresponding to an object pose of first object 104 based on a first scan performed on a segment of first object 104. The segment may be associated with one or more features of first object 104. For instance, the one or more features of first object 104 may include or correspond to second object 106. The one or more features may be identified based on representation data 179.

Figure 8:
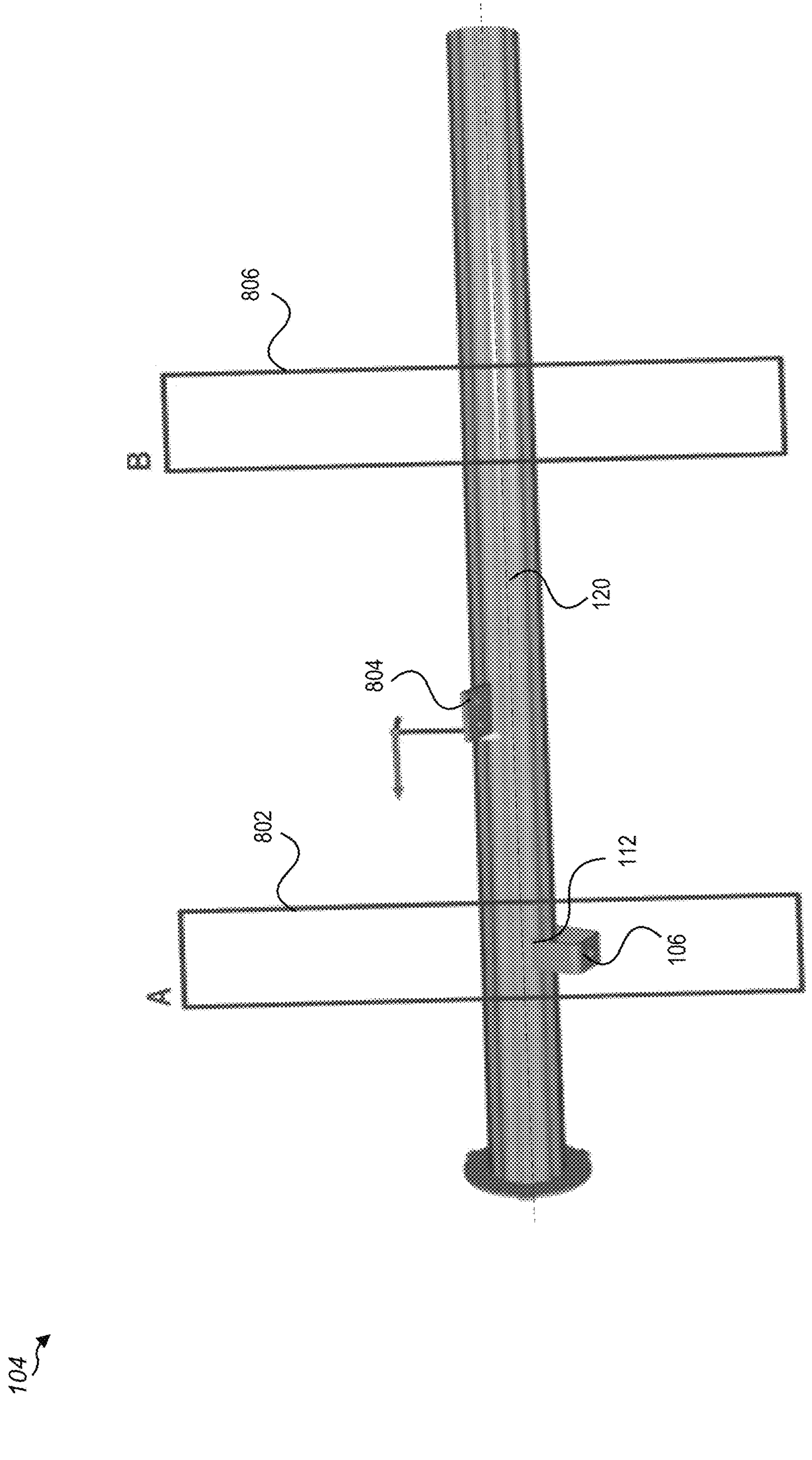
FIG. 8 is a diagram that illustrates an example process whereby an object pose of an object may be determined according to one or more aspects.

Referring to FIG. 8, FIG. 8 is a diagram that illustrates an example process whereby an object pose of an object may be determined according to one or more aspects. In some implementations, a controller of a robotic system may receive representation data corresponding to a representation of the object. For example, controller 152 may be configured to receive representation data 179. In some implementations, the representation data, such as representation data 179, includes a digital model of the object, such as first object 104. The digital model may include a CAD model or CAD file corresponding to the object, such as first object 104. Controller 152 may be configured to parse representation data 179 to obtain 3D point cloud data associated with representation data 179.

In some implementations, representation data 179 corresponding to first object 104, second object 106, and third object 804 may lack object pose data 183 corresponding to a pose of first object 104. Accordingly, in some implementations, the controller of the robotic system is configured to identify one or more features of an object such as that may assist in determining an object pose of the object. For example, controller 152 may be configured to identify second object 106 and third object 804 as features of object 104. In particular, first object 104 may correspond to a utility pole and second object 106 and third object 804 may be brackets conjoined to the utility pole via tack welds.

In some implementations, to identify the one or more features of an object, the controller of the robotic system may process representation data associated with a representation of the object. For example, to identify the one or more features of object 104, controller 152 may be configured to process representation data 179 to identify one or more disambiguating features associated with first object 104 and included in representation data 179. In some implementations, the one or more disambiguating features may include one or more asymmetric features of first object 104. For example, digital data included within representation data 179 that corresponds to second object 106 and third object 804 may constitute disambiguating features of first object 104, since second object 106 and third object 804 each are asymmetrical with respect to axis of symmetry 120.

Accordingly, in some implementations, the controller of the robotic system is configured to determine an axis of symmetry of an object, the one or more features including at least one feature that is asymmetrical relative to the axis of symmetry of the object. For example, controller 152 may be configured to identify that first object 104 includes axis of symmetry 120 and, based on identifying axis of symmetry 120, controller 152, processing representation data 179, may identify that second object 106 and third object 804 are asymmetrical with respect to axis of symmetry 120.

In some implementations, a controller of a robotic system is configured to determine the object pose of the object based on a first scan performed on a segment of the object, the segment associated with the one or more features of the component, the one or more features identified based on a representation of the component. For example, controller 152 may be configured to initiate a first scan to be performed, by scan device 130, at segment 802. Segment 802 is associated with second object 106, which is a feature of first object 104. In contrast, controller 152 may refrain from initiating a first scan on second segment 806, because second segment lacks any disambiguating feature from which an object pose of first object 104 may be determined.

In some implementations, to determine the object pose of the object, the controller of the robotic system is configured to identify, based on the one or more features, the segment of the object at which to initiate the first scan. For example, by identifying, in representation data 179, disambiguating features, such as second object 106 and third object 804, controller 152 may be configured to identify segment 802 at which to initiate the first scan. In some implementations, the controller of the robotic system may identify, based on the one or more features, one or more segments of the object at which to initiate the first scan.

In some implementations, to determine the object pose of the object, the controller of the robotic system is configured to initiate the first scan of the object at the identified segment. For example, controller 152 may send control data 184 to scan device 130 to cause scan device 130 to scan first object 104 at first segment 802. In some implementations, the controller of the robotic system receives, based on the first scan, a two dimensional (2D) image of the identified segment. For example, controller 152 may receive, based on the first scan performed by scan device 130, a 2D image of first segment 802. Controller 152 may be configured to store data corresponding to the 2D image as actual scan data 176 in memory 156.

In some implementations, after determining the object pose of the object, the controller of the robotic system determines a location of the feature, a seam, or both. For example, after determining object pose data 183 corresponding to first object 104, controller 152 may determine a location of second object 106, seam 112 at which second object 106 is conjoined to first object 104, or both. In some implementations, to determine the location of the feature, the seam, or both, the controller of the robotic system determines an approximate location of the feature, the seam, or both based on the first scan, the representation, or a combination thereof. For example, to determine the location of second object 106, seam 112, or both, controller 152 may determine an approximate location of second object 106, seam 112, or both based on actual scan data 176 generated by first scan, by representation data 179, or a combination thereof. To illustrate, representation data 179 may not be accurate or precise with respect to a location of second object 106, seam 112, or both. Accordingly, controller 152 may be configured to combine actual data 176 obtained through initiating performance of first scan and representation data 179 to generate a more accurate and precise model corresponding to first object 104.

In some implementations, the representation of the object may include a first digital representation of the object that includes first three dimensional (3D) point cloud data associated with a computer aided design (CAD) file associated with the object, and a second digital representation of the component that includes second 3D point cloud data associated with the first scan. For example, controller 152 may combine representation data 179 and actual scan data 176 (e.g., actual scan data 176 generated from the first scan) to generate model data 180.

In some implementations, after performing the first scan, the controller of the robotic system is configured to determine a location of the feature, the seam, or a combination thereof. For example, controller 152 may be configured to determine a location of second object 106, seam 112, or a combination thereof. In some implementations, to determine the location of the feature, the seam, or a combination thereof, the controller of the robotic system is configured to align a first coordinate system associated with the first digital representation and a second coordinate system associated with the second digital representation. For example, controller 152 may be configured to align a first coordinate system associated with representation data 179 and a second coordinate system associated with scan data 177 (e.g., actual scan data 176 obtained from the first scan).

In some implementations, to align the first coordinate system and the second coordinate system, the controller of the robotic system performs a coarse alignment and performs a fine alignment. For example, controller 152 may be configured to perform a coarse alignment, such as having a resolution of approximately 1 cm) and may further be configured to perform a fine alignment (e.g., having a resolution of approximately 1 mm).

In some implementations, a controller of a robotic system is configured to identify, based on representation data, one or more potential locations at which to initiate a scan operation. For example, controller 152 may identify, based on representation data 179, potential locations on a surface of an object, such as first object 104, at which to perform a scan operation, such as is explained more fully with reference to FIG. 8 above.

In some implementations, to align the first coordinate system and the second coordinate system, the controller of the robotic system is configured to sample the first digital representation and the second digital representation such that first points associated with the first 3D point cloud data have an approximately equal density to second points associated with the second 3D point cloud data. For example, to align the first coordinate and the second coordinate system, controller 152 may be configured to sample representation data 179 and scan data 177 such that instances of sample representation data 179 have an approximately equal density to instances of scan data 177.

In some implementations, to select the one or more scan poses, the controller of the robotic system is configured to select the one or more scan poses based on a size of an expected area of the region to be scanned by the scan device from the one or more scan poses based on a simulation of the scan operation performed from the one or more candidate poses. For example, controller 152 may be configured to simulate a scan operation from one or more candidate poses 302, 304 corresponding to instances of candidate pose data 185. Controller 152 may further be configured to identify a candidate scan pose 302, 304 that is likely, based on the simulated scan data 178, to image the largest surface area of region 308 of first object 104. Controller 152 may select such candidate scan pose 302, 304 as the scan pose from which to initiate performance of a scan operation.

In some implementations, after performing the scan operation, the controller of the robotic system is configured to generate a model of the object, the model based on a representation of the object, a first scan, the scan operation, or a combination thereof. For example, controller 152 may be configured to generate model data 180 that may be a combination of representation data 179 and scan data 177.

In some implementations, to generate the model, the controller of the robotic system is configured to combine mesh data associated with the representation and point cloud data associated with the first scan, the scan operation, or a combination thereof. For example, controller 152 may be configured to combine mesh data associated with representation data 179 and scan data 177 to produce a more accurate and precise model of first object 104 than might otherwise be possible with representation data 179 or scan data 177 alone.

Figure 14A:
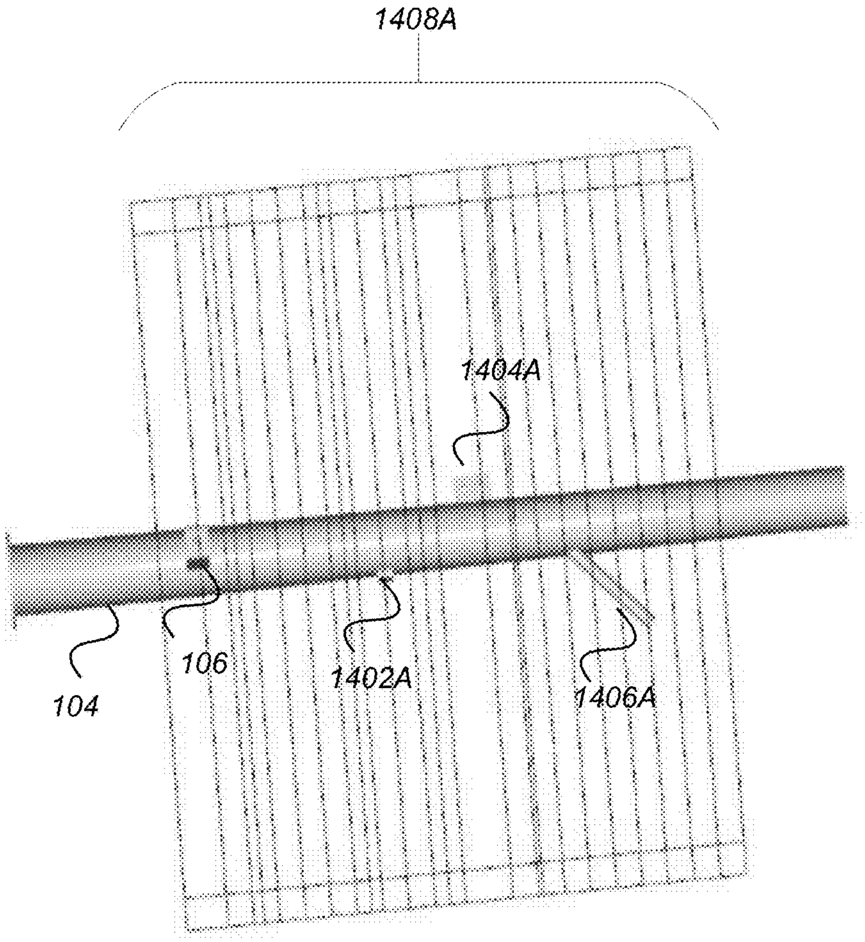
Figure 4B:
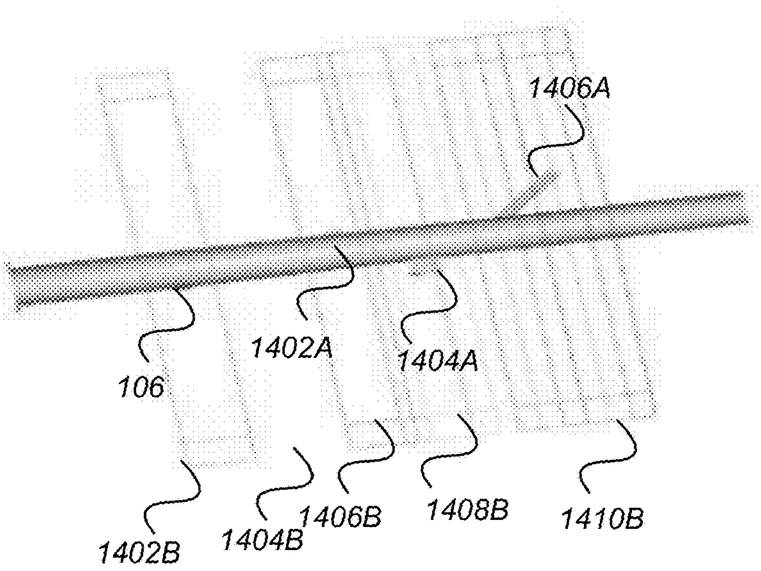

FIGS. 14A-14F depict an example technique to identify, based on representation data, one or more potential locations at which a scan operation may be initiated according to one or more aspects. FIG. 14A depicts first object 104 that includes second object 106 (e.g., a first feature), third object 1402A (e.g., a second feature), fourth object 1404A (e.g., a third feature), and fifth object 1406A (e.g., a fourth feature).

The regions or areas of first object 104 at which second object 106 through fifth object 1406A are conjoined to first object 104 each may include a plurality of seams (not depicted). In some implementations, controller 152 may be configured to identify each of the seams associated with second object 106 through fifth object 1406A based on processing representation data 179 associated with first object 104. In response to identifying each of the seams, controller 152 may be configured to impose a bounding box at a center of each seam. For example, controller 152 may impose a bounding box on 3D point cloud data associated with a center of each seam identified by controller 152. Additionally, controller 152 may remove bounding boxes associated with segments that have greater than a threshold percentage of overlap (e.g., 33.3% overlap) and may perform a uniform sampling operation so that bounding boxes are uniformly allocated to 3D point cloud data associated with the seams. Accordingly, as depicted in FIG. 14A, the remaining bounding boxes 1408A may be uniformly or approximately uniformly allocated. Additionally, controller 152 may evaluate each segment associated with or corresponding to one or more bounding boxes 1408A to identify one or more unique features.

Accordingly, controller 152 may remove the one or more bounding boxes 1408A not associated with one or more unique features. Referring to FIG. 14B, remaining bounding boxes 1402B and 1406B-1410B are associated, respectively, with second object 106 through fifth object 1406A. Remaining bounding box 1404B is associated with a region of first object 104 that lacks disambiguating features.

Figure 14C:
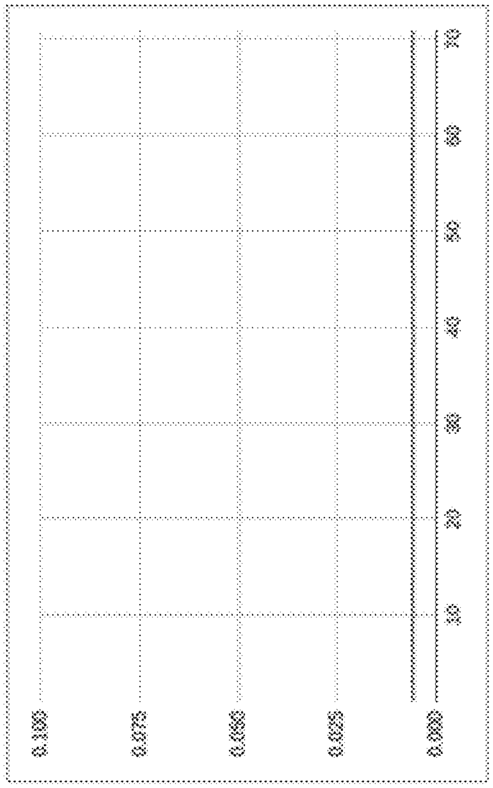
Figure 14D:
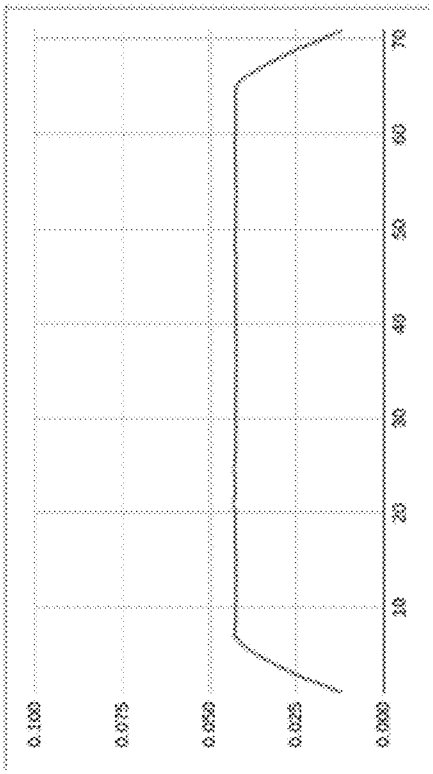
Figure 14E:
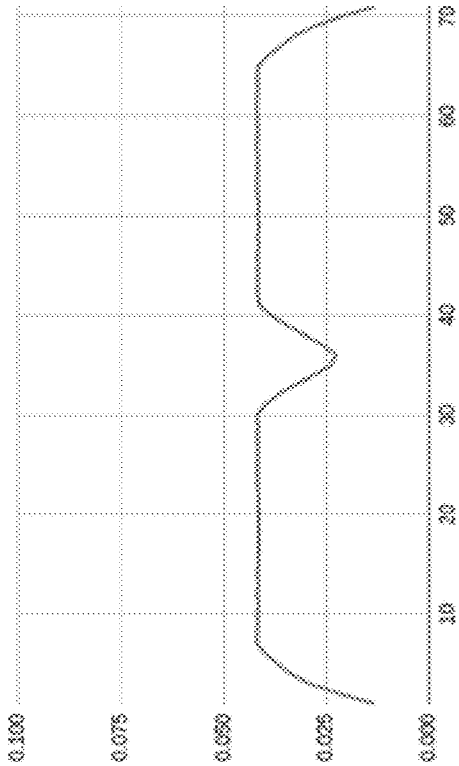
Figure 14F:
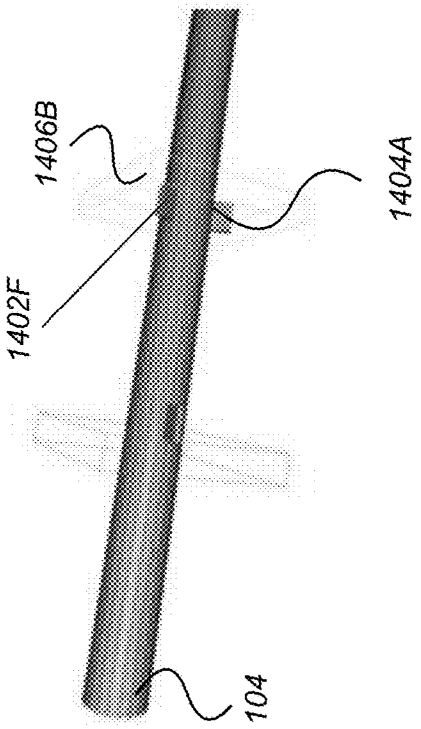

Referring to FIGS. 14C-14E, controller 152 may analyze the asymmetries associated with each feature corresponding to remaining bounding boxes 1402B-1410B to identify the most asymmetrical feature. For example, FIG. 14C depicts a zero asymmetry score for the region of first object 104 associated with remaining bounding box 1404B, since the region of first object 104 corresponding to remaining bounding box 1404B lacks any asymmetrical or disambiguating features. FIG. 14D represents an asymmetry score associated with remaining bounding box 1402B of FIG. 14B. Since second object 106 that is conjoined to first object 104 represents a region of asymmetry, the corresponding asymmetry score associated with remaining bounding box 1402B is high relative to the asymmetry score associated with remaining bounding box 1402B associated with the region of first object 104 that lacks asymmetry. FIG. 14E corresponds to an asymmetry score associated with remaining bounding 1406B depicted in FIG. 14F and associated with fourth object 1404A and sixth object 1402F. Fourth object 1404A and sixth object 1402F may be asymmetrical with respect to an axis of symmetry of first object 104; however, when first object 104 is rotated so that fourth object 1404A and sixth object 1402F are aligned along the axis of symmetry of first object 104, the asymmetry score associated with remaining bounding box 1406B falls as shown in FIG. 14E. Accordingly, by applying the technique described with reference to FIGS. 14A-14F, one or more scan operations may be performed at segments of first object 104 most likely to generate useful or actionable actual scan data 176.

Figure 9:
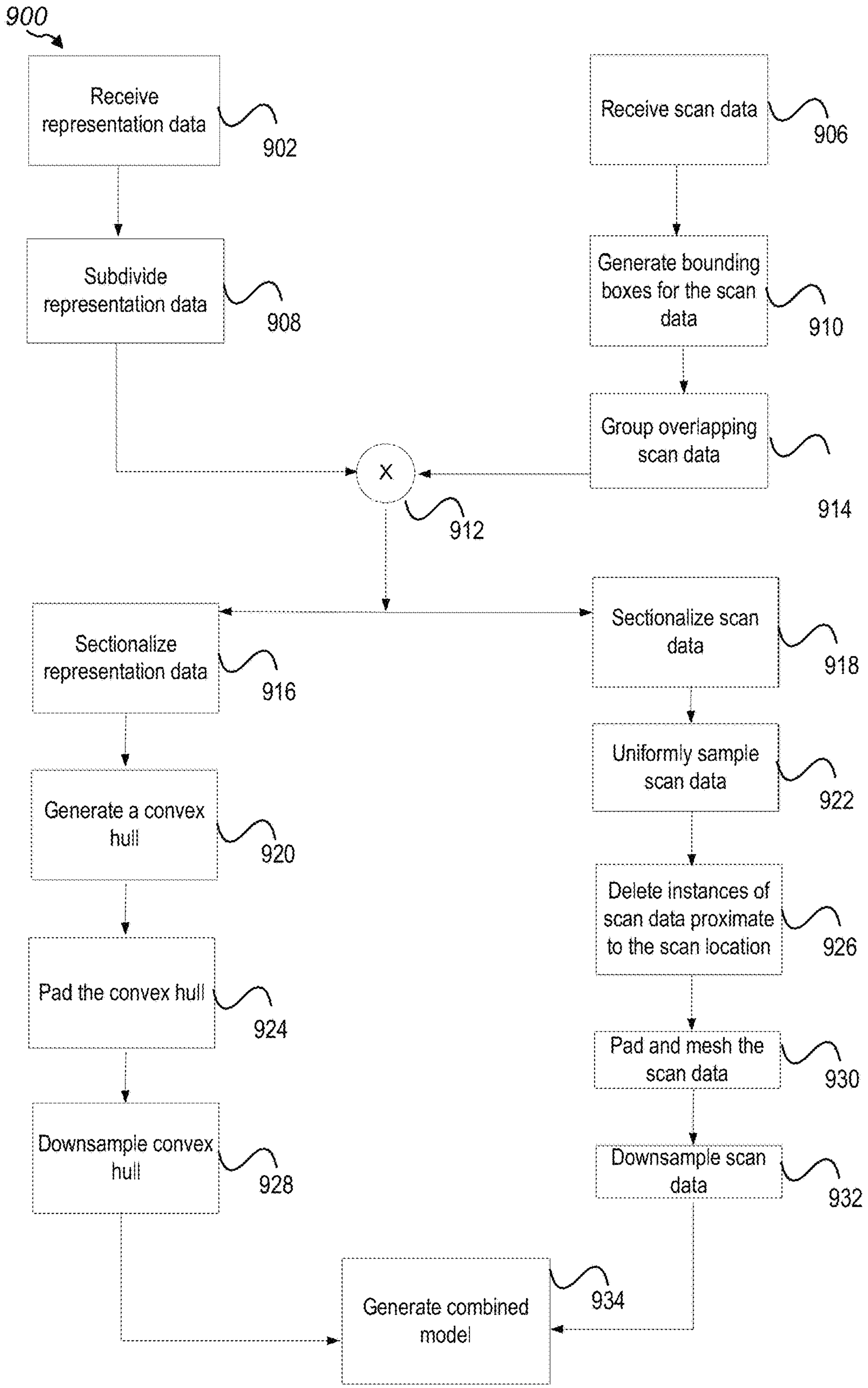
FIG. 9 is a flow diagram that illustrates an example process for combining representation data and scan data to generate a model of object to be scanned according to one or more aspects.

Referring to FIG. 9, FIG. 9 is a flow diagram that illustrates an example process for combining representation data and scan data to generate a model of object to be scanned according to one or more aspects. Operations of process 900 may be performed by a controller of a robotic system, such as controller 152 described with reference to FIGS. 1-3.

At blocks 902 and 906 the controller 152 may receive representation data 179 and scan data 177. It is understood that controller 152 may receive representation data 179 and scan data 177 at different times and not necessarily simultaneously.

At blocks 908, 910, and 914, controller 152 may process representation data 179 and scan data 177, respectively, to combine them at block 912. In particular, at block 909, controller 152 may subdivide representation data 179 into smaller components (e.g., each having less data than the original data file). At block 910, controller 152 may generate bounding boxes for instances of scan data 177. For example, scan data 177 may include actual scan data 176 generated from a plurality of scan operations. Accordingly, at block 910, controller 152 may generate bounding boxes for instances of scan data 177 corresponding to each of the plurality of scan operations. At block 914, controller 152 may group instances of overlapping scan data 177. For example, controller 152 may identify instances of scan data 177 that correspond to overlapping or approximately overlapping segments or regions of an object to be scanned, such as first object 104. The segments or regions may include or correspond to region 308, as an example. At block 912, the processed representation data 179 and processed scan data 177 may be combined.

At blocks 916-928, controller 152 may further process representation data 179, and at blocks 918-930, controller 152 may further process scan data 177. To illustrate, at blocks 916 and 918, controller 152 may sectionalize representation data 179 and scan data 177, respectively. To sectionalize representation data 179 and scan data 177, controller 152 may associate instances of representation data 179, scan data 177, or both with particular features of first object 104. For example, controller 152 may associate instances of representation data 179, scan data 177, or both with second object 106. By associating instances of representation data 179, scan data 177, or both with certain features of first object 104, controller 152 may be configured to generate a higher resolution model that combines representation data 179 and scan data 177 for regions, such as region 308 proximate to a seam, such as seam 112, and may be configured to generate a lower resolution model for regions that are distant from a seam, such as seam 112.

At block 920, controller 152 may generate convex hull. For instance, controller 152 may construct a convex hull (e.g., a convex envelope) based on or from representation data 179. At block 924, controller 152 may pad the convex hull. At block 928, controller 152 may down-sample the convex hull. For example, controller 152 may reduce a resolution of representation data 179 corresponding to the convex hull.

At block 922, controller 152 may uniformly sample scan data 177. At block 926, controller 152 may delete instances of scan data 177 that are proximate to the scan location. For example, controller 152 may delete instances of scan data 177 that are proximate to region 308 at which a scan operation may be performed. At block 930, controller 152 may pad and mesh scan data 177. For example, scan data 177 may include or correspond to 3D point cloud data. Controller 152 may convert the 3D point cloud data to a mesh and may pad the mesh accordingly. At block 932, controller 152 may down-sample scan data 177 to reduce a resolution of scan data 177.

At block 934, controller 152 may combine the down-sampled convex hull and down-sampled scan data to generate a combined model (e.g., that combines representation data 179 and scan data 177). In some implementations, controller 152 may use down-sampled convex hull data to model regions of first object 104 that are distant from a seam, such as seam 112. In contrast, controller 152 may use more precise, more accurate, and/or higher resolution down-sampled scan data to model regions that are proximate to a seam, such as region 308. Since an assembly operation (e.g., a weld operation) is to be performed at regions proximate to a seam, an accurate and precise model of regions that are proximate to seams, such as region 308, may facilitate performance of the assembly operation. However, by using comparatively less accurate and less precise down-sampled convex hull data to model regions of first object 104 that are distant from a seam, computational resources may be conserved. In this manner, by applying process 900, controller 152 is configured to generate a model that includes accurate, precise, and/or high resolution data corresponding to first object 104 for regions of first object at which an assembly operation is to be performed, while conserving computational resources by including comparatively less accurate, less precise, and/or lower resolution data to model regions of first object 104 at which an assembly operation is not likely to be performed.

Figure 10:
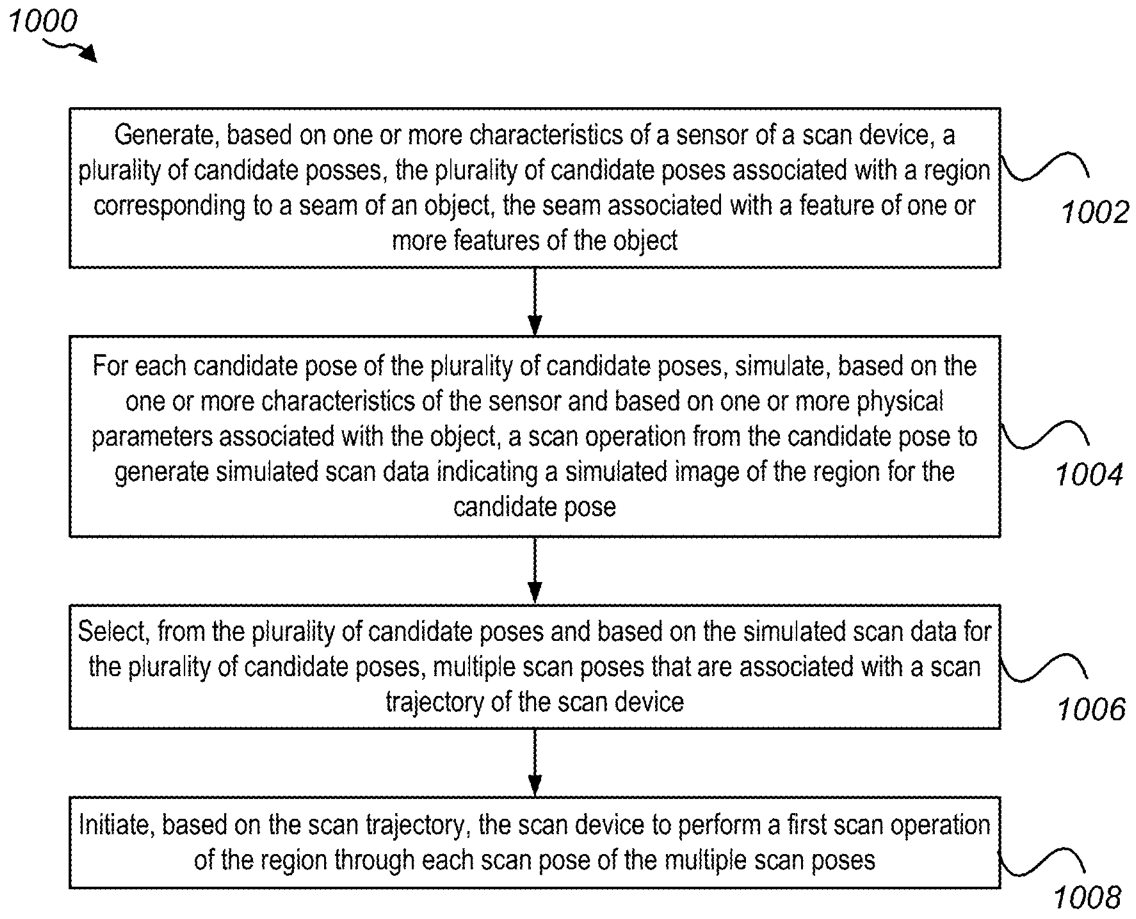
FIG. 10 is flow diagram of an example process that supports a continuous scan operation according to one or more aspects.

Referring to FIG. 10, FIG. 10 is flow diagram of an example process that supports a continuous scan operation according to one or more aspects. Operations of process 1000 may be performed by a controller of a robotic system, such as controller 152 described with reference to FIGS. 1-3.

At block 1002, the controller of the robotic system generates, based on one or more characteristics of a sensor of a scan device, a plurality of candidates poses. The plurality of candidates poses may be associated with a region corresponding to a seam of an object, the seam associated with a feature of one or more features of the object. For example, controller 152 may generate candidate pose data 185 corresponding to a plurality of candidate poses. Controller 152 may generate candidate pose data based on one or more characteristics of sensor 132 of scan device 130. For example, controller 152 may access system information 168 to obtain information about sensor 132 of scan device 130, such as a type of sensor 132, a resolution of sensor 132, or the like to obtain the one or more characteristics of sensor 132. Accordingly, in some implementations, the one or more characteristics may include whether the sensor, such as sensor 132, includes a camera, a radar, a laser, an ultrasound device, or a combination thereof. Candidate pose data 185 corresponding to the plurality of candidate poses may be associated with region 308 corresponding to seam 112 of second object 106 conjoined to first object 104. Accordingly, seam 112 may be associated with second object 106, which may correspond to a feature of first object 104. Implementational details regarding generation of candidate poses corresponding to candidate pose data 185 may be described more fully with reference to FIGS. 15-22.

At block 1004, for each candidate pose of the plurality of candidate poses, the controller of the robotic system simulates, based on the one or more characteristics of the sensor and based on one or more physical parameters associated with the object, a scan operation from the candidate pose to generate simulated scan data indicating a simulated image of the region for the candidate pose. For example, controller 152 of robotic device 110 may simulate, based on one or more characteristics of sensor 132 and based on one or more physical parameters associated with first object 104, a scan operation from the candidate pose to generate simulated scan data 178 indicating a simulated image of region 308 for the candidate pose. To illustrate, controller 152 may be configured to access physical data 181, which may indicate one or more physical parameters associated with first object 104. For example, physical data 181 may indicate a manner in which first object 104 may absorb light, reflect light, or the like. Additionally, or alternatively, physical data 181 may indicate a manner in which first object 104 may absorb sound waves, reflect sound waves, or the like. Controller 152 may be configured to simulate a scan operation to generate simulated scan data 178 in a similar way as explained with reference to the discrete scan process. However, in other implementations, in lieu of or in addition to simulating a scan operation, controller 152 may be configured to perform a scan operation from each candidate pose of the plurality of candidate poses to generate actual scan data 176.

At block 1006, the controller of the robotic system may select, from the plurality of candidate poses and based on the simulated scan data for the plurality of candidate poses, multiple scan poses that are associated with a scan trajectory of the scan device. For example, controller 152 may select, from candidate pose data 185 corresponding to the plurality of candidate poses, multiple scan poses that are associated with a scan trajectory of scan device 130. The multiple scan poses may include or correspond to scan pose data 186. The scan trajectory may include or correspond to a continuous arc from which scan device 130 may be configured to image first object 104.

In some implementations, the controller of the robotic system evaluates the simulated scan data. For example, controller 152 may evaluate simulated scan data 178. To evaluate simulated scan data 178, controller 152 may assign one or more scores to instances of candidate pose data 185 corresponding to one or more candidate poses of the plurality of candidate poses. In some implementations, controller 152 may calculate the one or more scores based on a similarity between simulated scan data 178 and model data 180 associated with region 308. In some implementations, model data 180 includes actual scan data 176 generated from a second scan operation (e.g., performed prior to the first scan operation), representation data 179 associated with a representation of region 308, or a combination thereof.

In some implementations, to assign the one or more scores to the one or more candidate poses, the controller of the robotic system assigns one or more weights to one or more instances of simulated scan data, one or more instances of model data, or a combination thereof. For example, to assign the one or more scores to the one or more instances of candidate pose data 185 that correspond to the one or more candidates poses, controller 152 may be configured to assign one or more weights to one or more instances of simulated scan data 178, one or more instances of model data 180, or a combination thereof.

In some implementations, to assign the one or more weights, the controller of the robotic system determines an information density of the one or more instances of the simulated scan data, the one or more instances of the model data, or a combination thereof. For example, controller 152 may determine an information density of the one or more instances of simulated scan data 178, the one or more instances of model data 180, or a combination thereof. In some implementations, the information density is determined based on a topology indicated by the one or more instances of the scan data, the one or more instances of the model data, or a combination thereof. For instance, controller 152 may assess or determine the information density based on a topology indicated by the one or more instances of simulated scan data 178, the one or more instances of model data 180, or a combination thereof. To illustrate, and referring to FIG. 8, based on simulated scan data 178, model data 180, or both, controller 152 may determine that region 806 has a uniform, non-curved topology. In contrast, based on simulated scan data 178, model data 180, or both, controller 152 may determine that region 802 around seam 112 and second object 106 has a non-planar topology or a contoured, curved topology.

Accordingly, controller 152 may assign a greater weight to simulated scan data 178, model data 180, or both associated with or corresponding to region 802 than to simulated scan data 178, model data 180, or both associated with region 806 based on a determination that simulated scan data 178, model data 180, or both associated with or corresponding to region 802 has a higher information density than simulated scan data 178, model data 180, or both associated with or corresponding to region 806.

In some implementations, the topology indicates a curvature of the region. For example, controller 152 may determine a topology of a region, such as region 802, 806, based on simulated scan data 178, model data 180, or both. The topology of the region indicates the curvature of the region.

In some implementations, the controller of the robotic system computes orientations of normal vectors from a surface of the region based on the one or more instances of the scan data, the one or more instances of the model data, or a combination thereof. For example, controller 152 may compute orientations of normal vectors emanating from a surface of a region, such as region 802, 806, based on the one or more instances of simulated scan data 178, model data 180, or a combination thereof. In some implementations, the orientations indicate the curvature of the region, such as curvature of region 802, 806.

At block 1008, the controller of the robotic system may initiate, based on the scan trajectory, the scan device to perform a first scan operation of the region through each scan pose of the multiple scan poses. For example, controller 152 may be configured to include scan pose data 186 in control data 184 and may send control data 184 to robotic device 110 and to scan device 132. In response to receipt of control data 184 that includes scan pose data 186, robotic device 110 may be configured to maneuver in accordance with one or more of the multiple poses indicated by scan pose data 186 to position scan device 130 in accordance with the one or more of the multiple poses. Additionally, in response to receipt of control data 184, scan device 130 may be configured to perform the first scan operation of region 308 through each scan pose of the multiple scan poses indicated by scan pose data 186. Accordingly, first scan operation may correspond to a continuous scan operation performed through an entire scan trajectory indicated by the multiple poses.

In some implementations, to initiate the first scan operation, the controller of the robotic system decreases a speed of the first scan operation performed from a set of the multiple scan poses, the set including one or more scan poses from which are generated first scan data having higher information density than second scan data generated from other scan poses of the plurality of scan poses. For example, controller 152 may be configured to decrease a speed of the first scan operation performed from a set of the multiple scan poses corresponding to a set of scan pose data 186. The set may include one or more scan poses from which are generated first scan data 177 having higher information density than second scan data 177 generated from other scan poses of the plurality of scan poses.

In some implementations, to select the multiple scan poses, the controller of the robotic system evaluates the scan trajectory from different combinations of the plurality of candidate poses based on modelling potential collisions among one or more components of a welding robot associated with the controller and other components of a workspace in which the welding robot is situated including the object. Further, to select the multiple scan poses, the controller of the robotic system selects the multiple scan poses based on evaluation of the scan trajectory. For example, controller 152, executing kinematic reachability and collision logic 174, may be configured to evaluate one or more of the candidate poses to determine whether, if a scan operation is performed from the one or more candidate poses, one or more components or robotic device 110 may collide with first object 104. Controller 152 may eliminate, from further consideration, candidate poses that represent a risk of collision.

In some implementations, to select from among the one or more candidate poses, the controller of the robotic system receives, prior to initiation of the first scan operation, welding parameters associated with a welding operation to be performed. For example, controller 152 may receive welding parameters associated with a welding operation to be performed. Additionally, in some implementations, the controller of the robotic system selects from among the plurality of candidate poses based on the welding parameters. For instance, controller 152 may select the multiple poses, corresponding to pose data 166, from among candidate pose data 185 corresponding to the plurality of candidate poses, based on the welding parameters.

In some implementations, the controller of the robotic system initiates a second scan operation of the region, the second scan operation based on a second multiple scan poses selected from among the plurality of candidate poses, the second multiple scan poses including one or more scan poses distinct from the multiple scan poses. Additionally, in some implementations, the controller of the robotic system combines first scan data generated by the first scan operation and second scan data generated by the second scan operation. Further, in some implementations, the controller of the robotic system generates a weld trajectory for a weld head of a robotic welding system based on the combined first scan data and the second scan data. In some implementations, the controller of the robotic system initiates performance of the weld operation in accordance with the weld trajectory.

In some implementations, the controller of the robotic system compares scan data generated from the first scan operation and the simulated scan data. Additionally, in some implementations, in response to identification of a number of discrepancies between the scan data and the simulated scan data that are greater than or equal to a threshold value, the controller of the robotic system iteratively performs the simulating, the generating, the selecting, and the initiating until a discrepancy between the scan data and the simulated scan data satisfies the threshold value.

The continuous scan operation as described herein may enhance an accuracy, a precision, a speed, an efficiency, or a combination thereof, with which a scan operation may be performed. To illustrate, by simulating a scan operation from a plurality of candidate poses and by evaluating the simulated scan data to identify one or more poses of the plurality of candidate poses from which to perform a scan operation, resources are conserved, since scan operations are performed from scan poses determined, through simulation, to generate informationally dense data. Accordingly, while the disclosure may generate less scan data than in conventional approaches, the resulting scan data may have a higher informational density and thus may be more useful in performing an assembly operation than data collected from a conventional technique. Additionally, by decreasing a speed with which a scan operation is performed from scan poses determined, through simulation, to generate more informationally dense scan data, higher resolution and more scan data may be obtained from those scan poses, thereby enhancing an accuracy and a precision of the scan data obtained from scans performed from these scan poses. Further, by increasing a speed with which a scan operation is performed from scan poses determined, through simulation, to generate less informationally dense scan data, an efficiency of a scan operation is enhanced while not degrading overall performance.

In some implementations, to simulate the scan operation, the controller of the robotic system simulates, for each candidate pose of the plurality of candidates poses, transmission of a simulated signal to a surface of the object corresponding to the region. For example, controller 152 may simulate, for each candidate pose of the plurality of candidates poses corresponding to candidate pose data 185, transmission of a simulated signal to a surface of first object 104 corresponding to region 308. Additionally, to simulate the scan operation, the controller of the robotic system may simulate receipt of a simulated reflected signal from the surface. For example, controller 152 may simulate receipt of a simulated reflected signal from the surface of first object corresponding to region 308.

In some implementations, the simulated transmitted signal corresponds to a first signal capable of being transmitted by the sensor, and the simulated reflected signal corresponding to a second signal reflected by the surface in response to receipt, by the surface, of the first signal. For example, the simulated transmitted signal may corresponding to a simulated transmitted radar signal if sensor 132 is a radar sensor, and the simulated reflected signal may correspond to a simulated radar signal reflected from the surface in response to receipt, by the surface, of the simulated transmitted radar signal.

In some implementations, to simulate the scan operation, the controller of the robotic system traces a simulated light ray from a first location corresponding to the candidate pose to one or more second locations of the region. For example, controller 152 may trace a simulated light ray from a first location corresponding to a candidate pose associated with candidate pose data 185 (e.g., a position or location of a simulated scan device 130) to one or more second locations of region 308.

Further, to simulate the scan operation, the controller of the robotic system determines at least one characteristic of a simulated reflection of the simulated light ray, the simulated reflection of which is modeled from the one or more second locations. For example, controller 152 is configured to determine at least one characteristic of the simulated reflected of the simulated light ray. Additionally, controller 152 is configured to model the simulated reflection from the one or more second locations, such as may correspond to region 308. In some implementations, the at least one characteristic includes a color of the simulated reflection, an intensity of the simulated reflection, or a combination thereof. Additionally, in some implementations, the at least one characteristic is determined based on the one or more physical parameters associated with the object. For example, controller 152 may determine the at least one characteristic based on physical parameters corresponding to physical data 181 and associated with first object 104.

In some implementations, the one or more physical parameters include a texture of a surface of the region, a color of the surface of the region, a reflectivity of the surface of the region, or a combination thereof. For example, physical data 181 may include information about physical parameters associated with first object 104, such as a texture of a surface of region 308, a color of the surface of region 308, a reflectivity of the surface of region 308, or a combination thereof.

In some implementations, the one or more physical parameters are determined based on a second scan operation, representation data corresponding to a representation of the region, or both. For example, controller 152 may be configured to perform a second scan operation prior to the first scan operation. Based on actual scan data 176 obtained from the second scan operation, representation data 179, or a combination thereof, controller 152 may be configured to determine the one or more physical parameters associated with first object 104.

In some implementations, the representation of the region includes a digital representation of the region stored in a non-transitory computer-readable memory. For example, region 308 of first object 104 may be included in representation data 179 stored in memory 156.

In some implementations, the controller of the robotic system identifies the region based on analyzing model data associated with the object. For example, controller 152 may identify region 308 based on processing and analyzing model data 180 associated with first object 104. In some implementations, controller 152 may identify region 308 based solely on processing and analyzing representation data 179 associated with first object 104 and not also processing or analyzing scan data 177 associated with first object 104. A technique whereby the controller of the robotic system identifies the region of the object is explained in more detail with reference to FIG. 11, which is a diagram that depicts identification of the region of the object based on a representation of the object according to one or more aspects.

Figure 11:
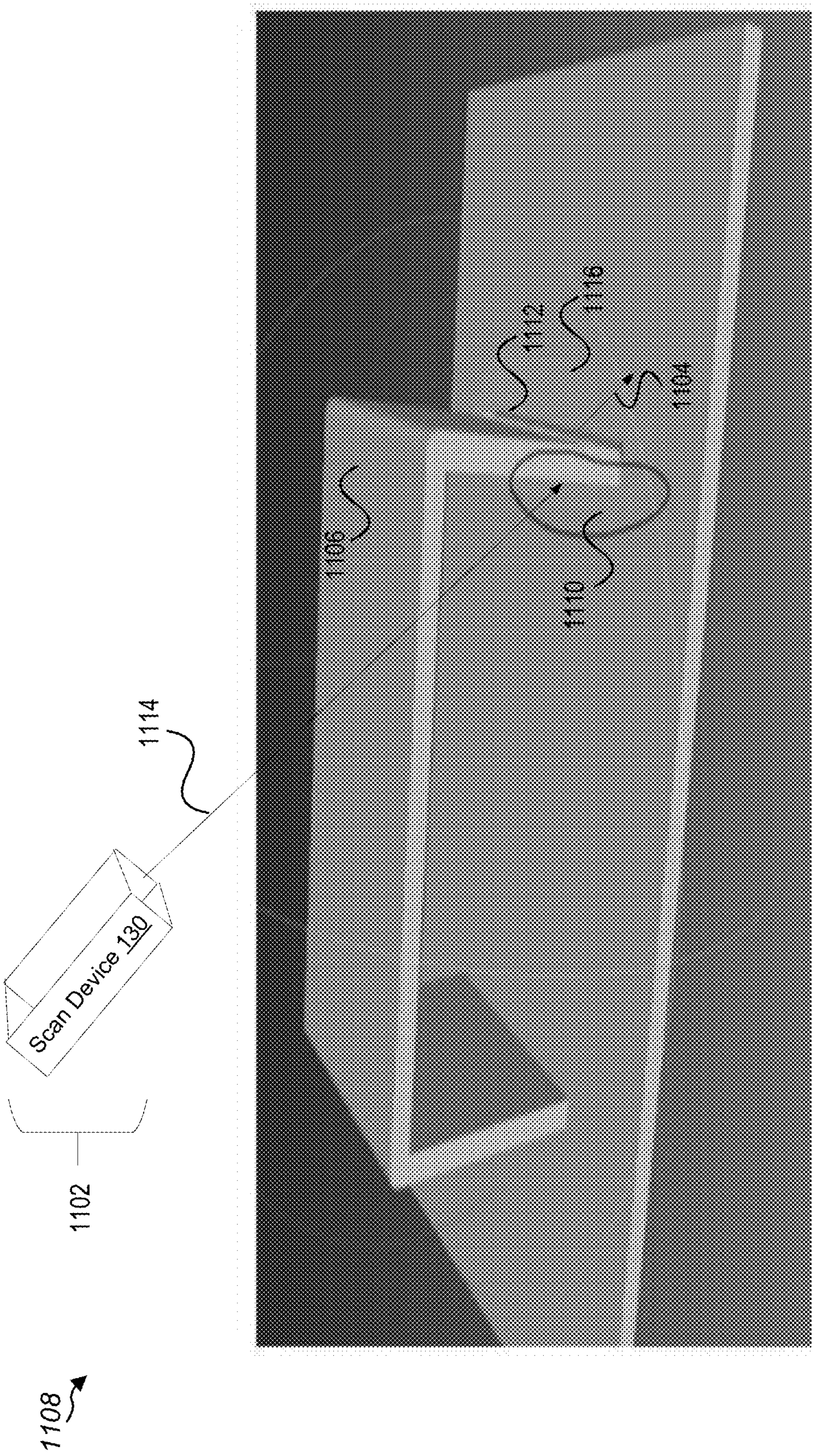
FIG. 11 is a diagram that depicts identification of the region of the object based on a representation of the object according to one or more aspects.

Referring to FIG. 11, region 1108, which corresponds to region 308, is depicted. Controller 152 may process model data 180. Based on processing model data 180, controller 152 may be configured to identify instances of model data 180 that include or correspond to region 1108. For instance, model data 180 may include or correspond to 3D point cloud data obtained from a CAD file of first object 104. Based on processing the 3D point cloud data, controller 152 may identify the set of 3D point cloud data that includes or corresponds to region 1108, ignoring all other 3D point cloud data.

In some implementations, to identify the region, the controller of the robotic system performs a comparison based on one or more instances of the model data and a threshold value. For example, controller 152 may be configured to identify instances of model data 180 that are within a certain threshold distance 1104 or radius from seam 1112. To illustrate, controller 152 may retrieve a threshold value from threshold data 182. The threshold value may correspond to a distance 1104 from seam 1112 (e.g., an estimated distance estimated based on model data 180). Controller 152 may compare a distance of each instance of model data 180 (e.g., each point of 3D point cloud data) against the threshold value (e.g., associated with distance 1104) and may only analyze or consider instances of model data 180 (e.g., points of 3D point cloud data) that satisfy the threshold value. Such instances of model data 180 are depicted at 1116. In some implementations, the controller of the robotic system may remove first instances of the one or more instances of the model data that fail to satisfy the threshold value. For example, controller 152 may be configured to delete or expunge instances of model data 180 that exceed the threshold value associated with threshold distance 1104. In some implementations, the threshold value represents a distance from a randomly selected point on a representation of the region to the seam, a distance from a simulated welding head to the region, a distance from a simulated scan device to the region, a volume corresponding to a bounding box imposed on the one or more instances of the model data, or a combination thereof.

Having filtered model data 180 to identify instances of model data 180 that correspond to region 1108 and that are proximate to seam 1112, controller 152 may be configured to further filter the remaining model data 180 to identify instances of model data 180 that can physically be imaged by scan device 130. For example, and referring to FIG. 11, second instances of model data 1110 cannot be scanned, because they are obscured by second object 1106, which corresponds to second object 106. Accordingly, in some implementations, the controller of the robotic system determines whether remaining instances of the model data are estimated to be visible to the scan device based on simulating the scan operation from one or more of the plurality of scan poses.

For example, controller 152 may simulate the scan operation from one or more scan poses, such as scan pose 1102. To illustrate, controller 152 may be configured to trace virtual ray 1114 from a position of scan device 130 (e.g., a simulated scan device) to instances of model data 180 representing surface element 1110 (e.g., 3D point cloud data corresponding to surface element 1110). However, controller 152 may determine that virtual ray 1114 intersects one or more instances of model data (e.g., 3D point cloud data) corresponding to second object 1106. Accordingly, in some implements, the controller of the robotic system may remove second instances of the model data estimated or simulated to be obscured based on simulating the scan operation. Hence, controller 152 may be configured to remove second instances of model data 180 simulated to be obscured based on the ray tracing operation performed through simulating the scan operation. In some implementations, to determine whether remaining instances of the model data are estimated or simulated to be visible to the scan device, the controller of the robotic system is configured to identify a subset of the remaining instances of the model data that correspond to one or more surfaces of the region that are obscured from a field of view of the sensor based on a simulation of the scan device, and the controller is configured to perform the simulation.

Figure 12:
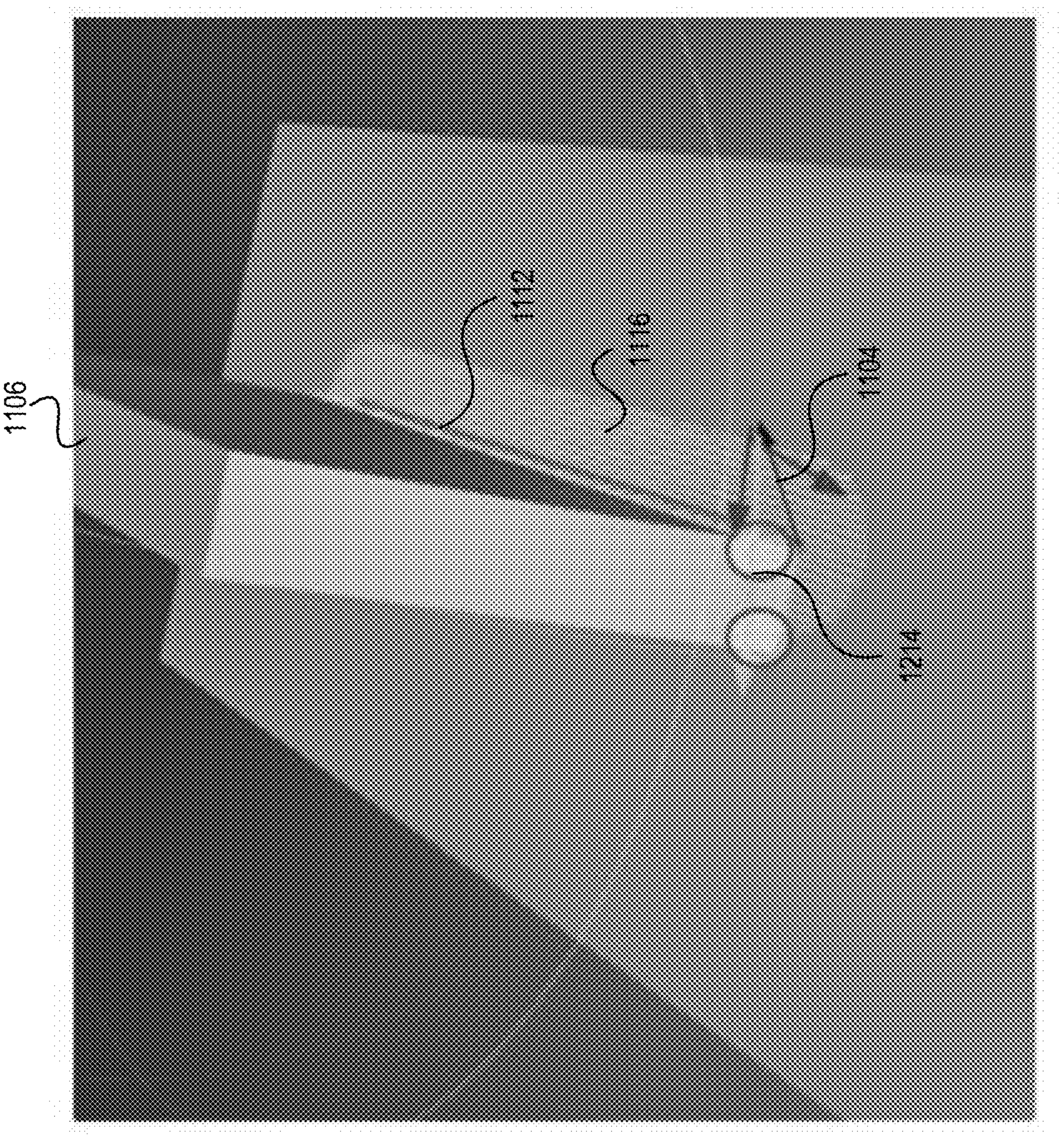
FIG. 12 is a diagram that depicts a technique for identifying instances of model data that are scannable according to one or more aspects.

FIG. 12 is a diagram that depicts a technique for identifying instances of model data that are scannable according to one or more aspects. In particular, FIG. 12 depicts instances of model data 180 that correspond to a component of second object 1106, instances of model data 180 that correspond to seam 1112, and instances of model data 180 that are within a threshold distance 1104 of seam 1112. In some implementations, after performing the process described with reference to FIG. 11, controller 152 may be configured to perform another ray tracing operation with virtual ray 1214 to identify instances of model data 180 that are not physically scannable. Based on the foregoing procedure, controller 152 may be configured to identify one or more instances of model data 180 along seam 1112 from which a scan operation may be performed.

Figure 13:
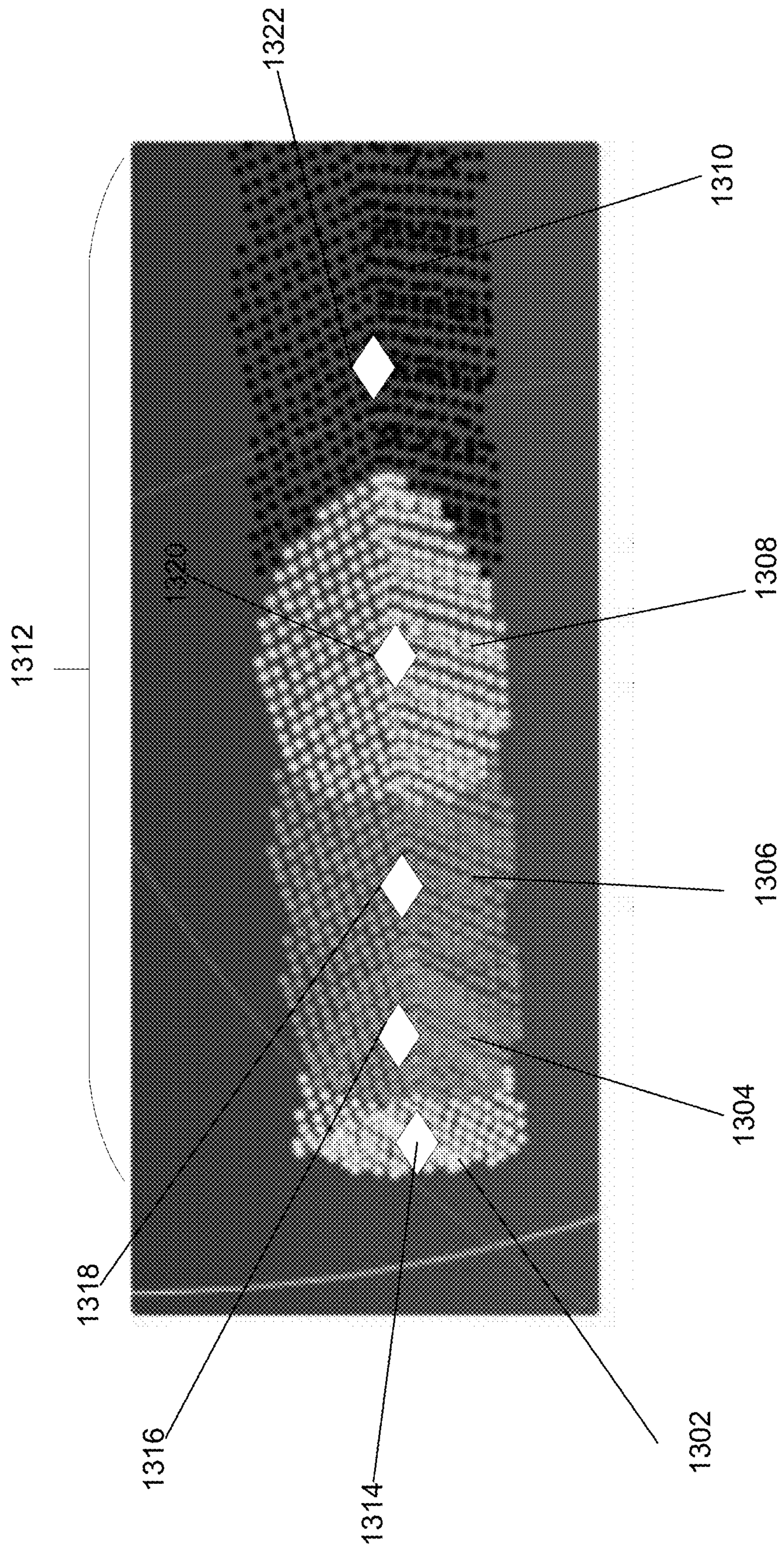
FIG. 13 is a diagram that depicts a seam localization operation according to one or more aspects.

FIG. 13 is a diagram that depicts a seam localization operation according to one or more aspects. FIG. 13 depicts sets 1302-1310 of points (e.g., corresponding to scan data 177, representation data 179, or both) proximate, respectively, to weldable waypoints 1314-1322 and associated with seam 1312, which corresponds to seam 112. In some implementations, controller 152 partitions instances of data corresponding to scan data 177, representation data 179, or both into subsets 1302-1310, each of which represents instances of scan data 177, representation data 179, or both corresponding to nearest neighbors of weldable waypoints 1302-1322, respectively. By partitioning the instances of scan data 177, representation data 179, or both into subsets 1302-1310, adequate data capture is performed around seam 1312, thereby preventing or mitigating scenarios in which certain sections of seam 1312 have less information captured about them than other sections of seam 1312.

Figure 15:
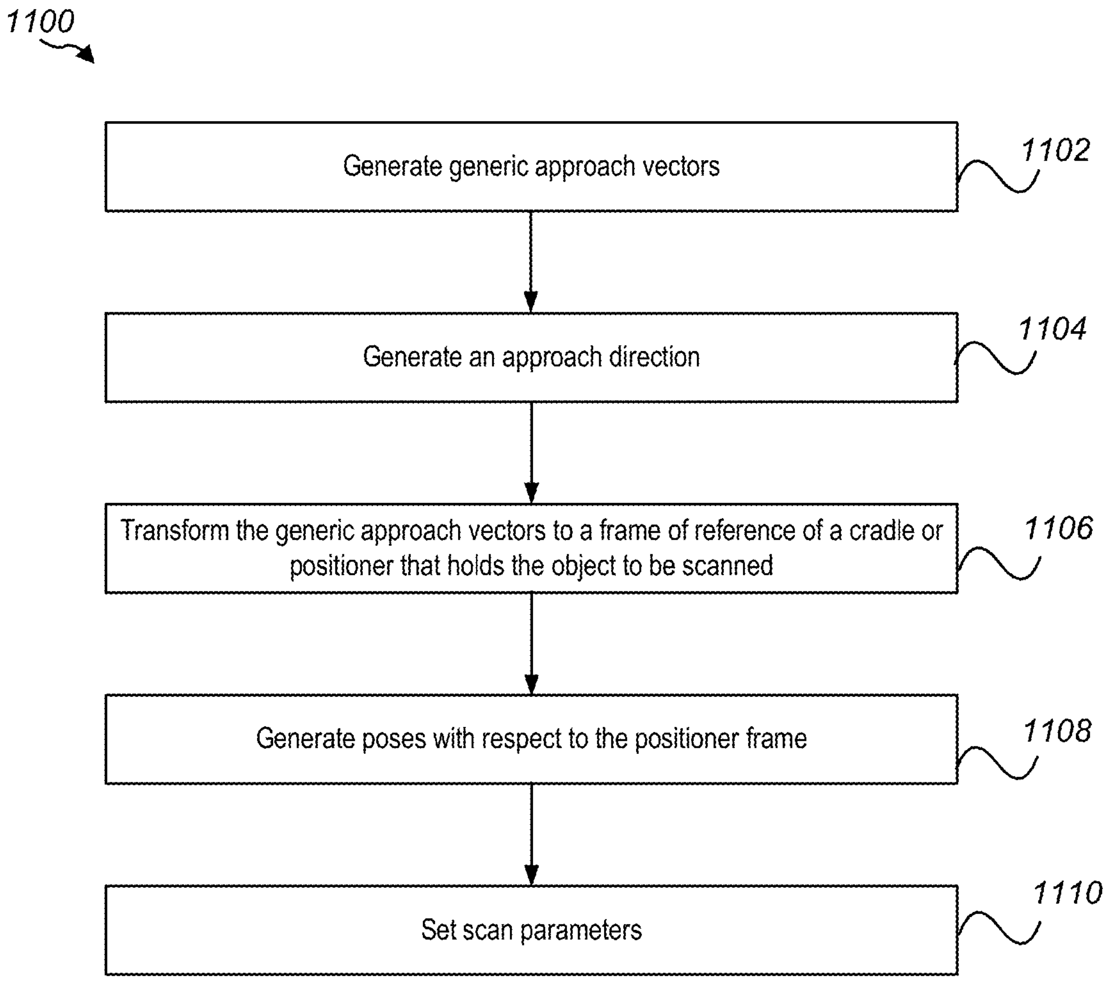
FIG. 15 is a flow diagram illustrating an example process for generating candidate poses according to one or more aspects.

FIG. 15 is a flow diagram illustrating an example process for generating candidate poses according to one or more aspects. In particular, controller 152 may generate candidate pose data 185 corresponding to one or more candidate poses via process 1500. Process 1500 is explained with reference to FIGS. 16-22, which are diagrams that illustrate features of process 1500 in one or more aspects.

Figure 16:
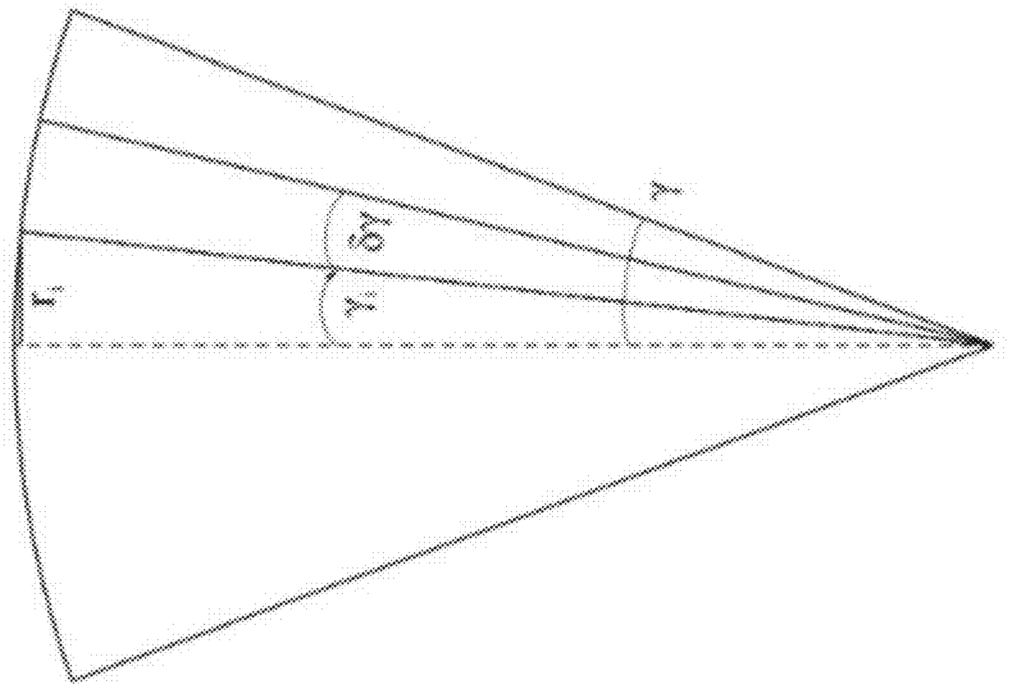
FIG. 16 is diagram depicting features of the process to compute the one or more generic approach vectors.

At block 1502, a controller of the robotic system generates one or more generic approach vectors. A generic approach vector may include or correspond to a vector along which an arm of robotic device 110 approaches points on a seam, such as seam 112. For instance, controller 152 may compute one or more generic approach vectors. Referring to FIG. 16, which is a diagram depicting features of process 1500 to compute the one or more generic approach vectors according to one or more aspects, controller 152 may be configured to sample a cone angle $\gamma$ by instantiating a uniformly spaced vector of $\gamma$ using cone angle resolution $\delta\gamma$ as the increment between elements of $\gamma$. Additionally, controller 152 may be configured to compute the radius $r_i$ of the spherical cap of angle $\gamma_i$, which is $r_i=\sin(\gamma_i)$ assuming that distance 1602 is unitary (e.g., equal to 1). Further, controller 152 may be configured to compute a quantity of approach vectors at n through the following equation:

$$r_i = \frac{2\pi ri}{s}.$$

Controller 152 may be further configured to round n, to the nearest positive integer if $r_i$ is not a positive integer. Additionally, controller 152 may be configured to compute the angle between the approach vectors at $r_i$ via application of the following equation:

$$\delta\psi_i = 2\pi/ni.$$

Figure 17:
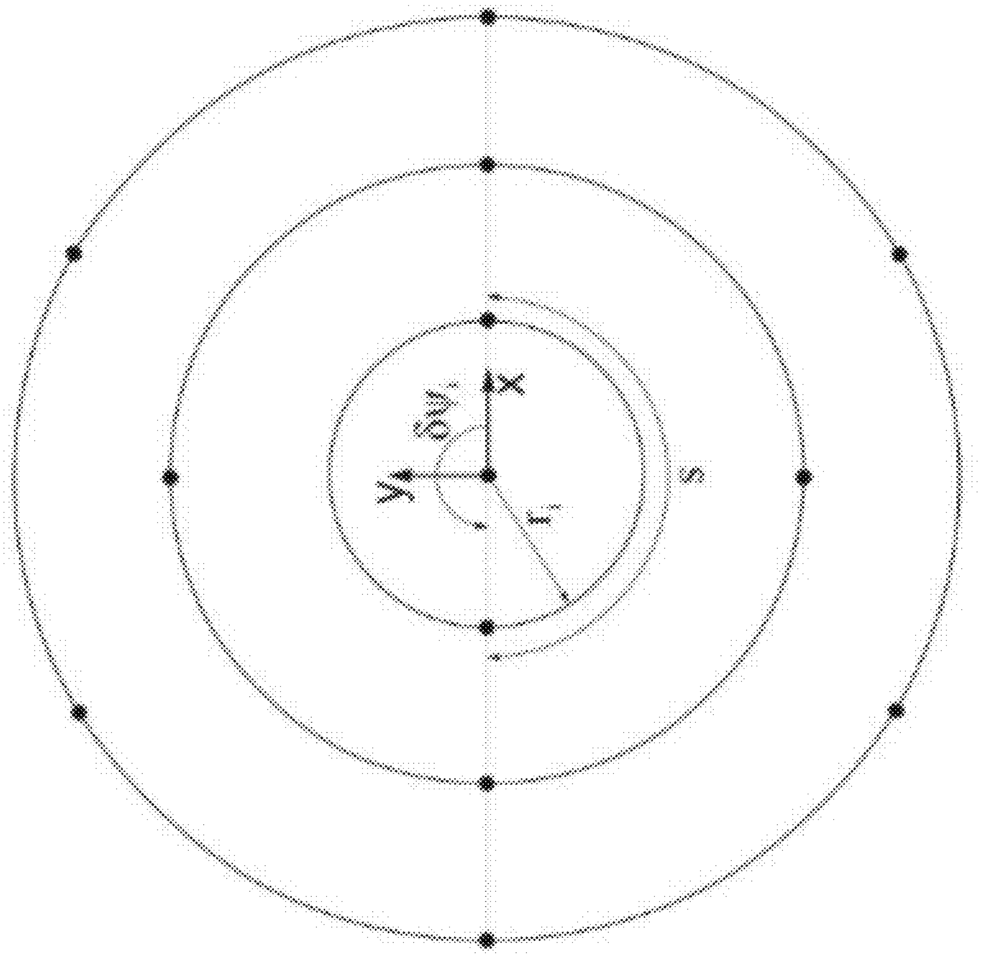
FIG. 17 is a diagram depicting a technique to compute the one or more generic approach vectors according to one or more aspects.

Referring to FIG. 17, which is a diagram depicting a technique to compute the one or more generic approach vectors according to one or more aspects, controller 152 may further be configured to compute the angle $\psi_{ij}$ of approach vector j at circle i with respect to the x axis by sampling $2\pi$ with resolution $\delta\psi_i$. Additionally, controller 152 may be configured to compute the direction of generic approach vector $v_{ij}$ via the following equation:

$$vij = \left[-\sin\left(\Upsilon_{i)}\cos\left(\psi_{ij}\right), -\sin\left(\Upsilon_{i)}\cos\left(\psi_{ij}\right), -\sqrt{1-\sin^2}(\gamma i)\right].$$

Figure 18:
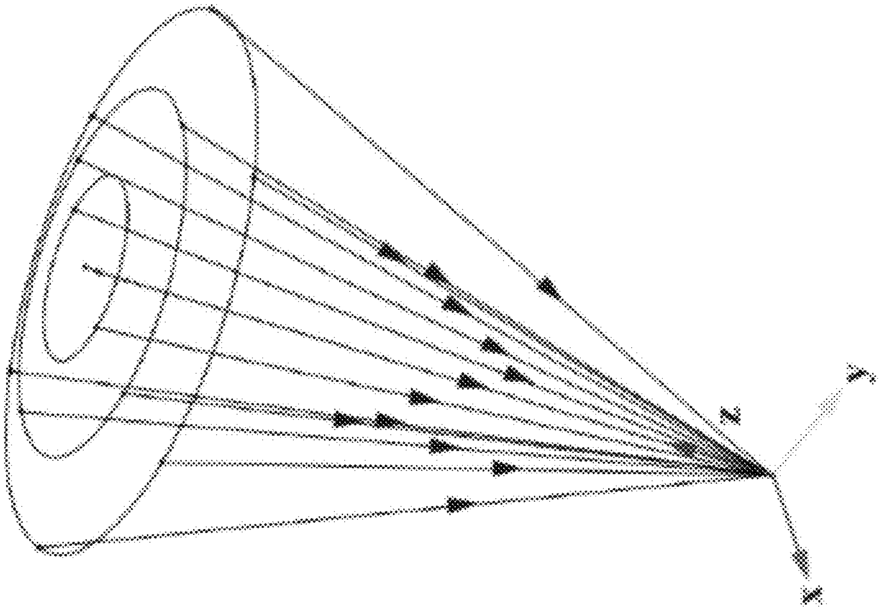
FIG. 18 is a diagram that depicts a plurality of generic approach vectors according to one or more aspects.

FIG. 18 is a diagram that depicts a plurality of generic approach vectors 1802 as may be generated using process 1500 according to one or more aspects.

Figure 19:
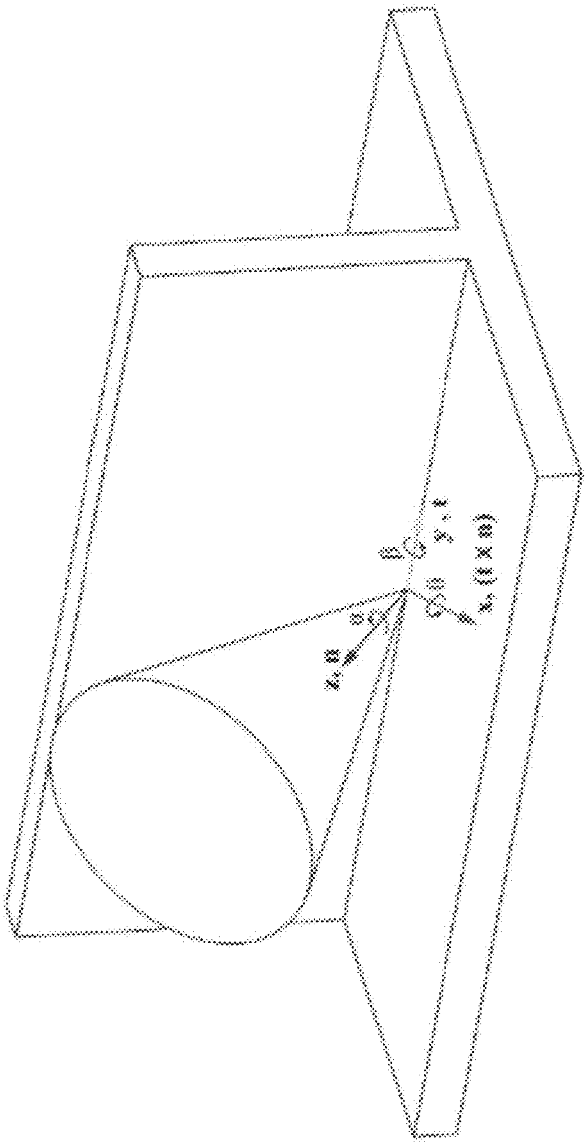
FIG. 19 is a diagram depicting determination of an approach direction according to one or more aspects.

Returning back to FIG. 15, having generated generic approach vectors, at block 1504, a controller of the robotic system generates an approach direction. Referring to FIG. 19, which is a diagram depicting determination of an approach direction according to one or more aspects, controller 152 may be configured to generate the approach direction which is opposite to normal vector n. Since the normal vector n is affected by the cone nominal roll angle $\alpha$, cone nominal pitch angle $\beta$, and cone nominal yaw angle $\theta$, controller 152 may compute a rotation matrix based on the foregoing angles. To compute the rotation matrix, controller 152 may apply three successive rotations around the fixed coordinate frame O(x, y, z) or O(t×n, t, n). Accordingly, the three rotations, implemented by controller 152, are as follows: rotate the frame O about the (t×n) axis by $\theta$ resulting in an O' frame. Additionally, controller 152 may be configured to perform a rotation of $\beta$ around the t axis, resulting in an O" frame. Further, controller 152 may be configured to perform a rotation of $\alpha$ about n axis resulting in an O"" frame. Controller 152 may generate the rotation matrix R($\theta$, $\beta$, $\alpha$) by multiplying the foregoing three rotation matrices as follows: R($\theta$, $\beta$, $\alpha$)=R(n, a)R(t, $\beta$)R (t×n, $\theta$). Controller 152 may be configured to generate the approach direction $\alpha$ via the following equation: a=R($\theta$, $\beta$, $\alpha$)(-n)

Figure 20:
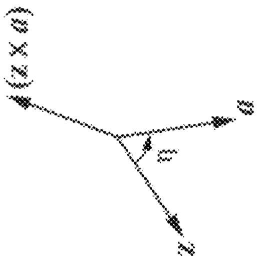
FIG. 20 is a diagram that depicts a process to transform generic approach vectors to the frame of reference of a cradle or a positioner of the object according to one or more aspects.

Referring back to FIG. 15, at block 1506, the controller of the robotic system, such as controller 152, transforms the generic approach vectors to a frame of reference of a cradle or positioner that holds the object to be scanned, such as might hold or position first object 104. Referring to FIG. 20, which is a diagram that depicts a process to transform generic approach vectors to the frame of reference of the cradle according to one or more aspects, the generic approach vectors v are along the z axis. Accordingly, the generic approach vectors are to be aligned along the approach direction a. To align the generic approach vectors along the approach direction a, controller 152 may be configured to determine the angle n between the two vectors z and a and may further be configured to rotate the vector z about the vector z×a by the angle $\eta$. Accordingly, controller 152 may determine the generic approach vectors v aligned with a through the following equation: $v^{pos}$=R(z×a, $\eta$)v, where R is the rotation matrix of z×a rotated around angle n and $v^{pos}$ are the generic approach vectors transformed to the cradle or positioner that holds the object to be scanned.

Figure 21:
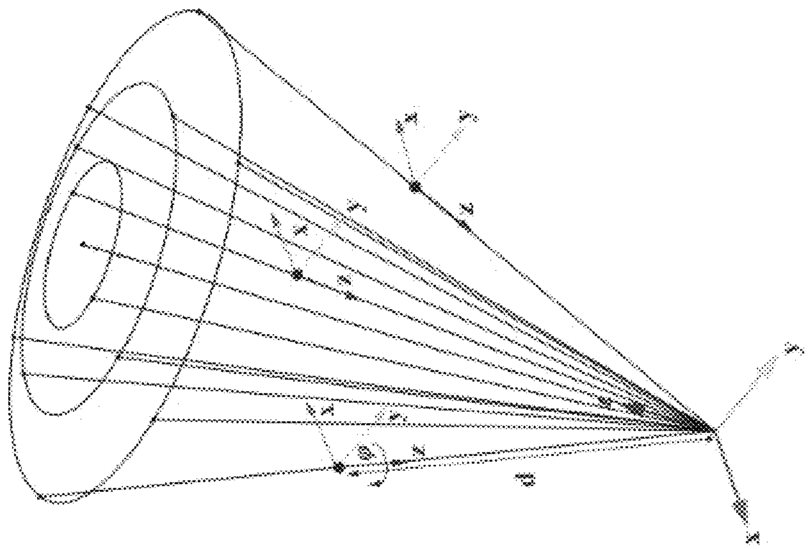
FIG. 21 is a diagram that depicts a process for generating candidate poses of a scan device with respect to a reference frame of the cradle or positioner according to one or more aspects.

Referring back to FIG. 15, at block 1508, the controller of the robotic system generates candidate poses of a scan device with respect to a reference frame of the cradle or positioner that holds the object to be scanned. For example, controller 152 generates candidate pose data 186 corresponding to scan device 130 (or a simulation of scan device 130) with respect to a reference frame of the cradle or positioner that holds first object 104. Referring to FIG. 21, which depicts a process for generating candidate poses of a scan device with respect to a reference frame of the cradle or positioner according to one or more aspects, each instance of candidate pose data 186 may include or correspond to a 4×4 matrix composed of rotation matrix $R_{eff}$ and position vector $P_{eff}$. Accordingly, controller 152 may determine rotation matrix $R_{eff}$ through the following equation: $R_{eff}=[R_1, R_2, R_3]$. Additionally, or alternatively, controller 152 may set the third column vector $R_3$, representing the z direction of scan device 130 with respect to the frame of the cradle or positioner, to the negative direction as follows: $R_3=-v^{pos}$. In some implementations, controller 152 may set the second column vector $R_2$ to be parallel to or to be antiparallel to the tangent t assuming that a roll angle of scan device 130 is zero. In particular, if the projection of the tangent on the position vector from the cradle or positioner to a base of robotic device 110 is positive, then controller 152 may set the second column vector $R_2$ to a positive value, denoting that the column vector $R_2$ is parallel to the tangent; otherwise, controller 152 may set the column vector $R_2$ to a negative value, denoting that the column vector $R_2$ is antiparallel to the tangent. Accordingly, controller 152 may set a value of column vector $R_2$ in accordance with the following equation: $R_2=\text{sgn}\ t$, where sgn=1 or −1. In some such implementations, controller 152 may determine first column vector $R_1$, representing the x direction of scan device 130 with respect to a frame of reference of the positioner, in accordance with the following equation: $R_1=R_2\times R_3$.

As explained above, controller 152 may determine the rotation matrix $R_{eff}$ based on an assumption that a roll angle of scan device 130 is zero. To incorporate the roll angle φ along the z axis of a position of scan device 130, controller 152 may generate roll angles of scan device 130 in the range of $[\varphi_{nom}-\delta\varphi, \varphi_{nom}+\delta\varphi]$ where $\varphi_{nom}$ and $\delta\varphi$ represent the nominal roll angle of scan device 130 and a tolerance thereof, respectively, using a resolution of scan device 130 roll angle denoted $\varphi_{res}$. Further, controller 152 may update the rotation matrix, $R_{eff}$, associated with scan device 130 so that the rotation matrix, $R_{eff}$, incorporates the roll angle q along the z axis of a position of scan device 130 through application of the following equation: $Reff=R(R3, \text{sgn}\varphi)R_{eff}$.

Figure 22:
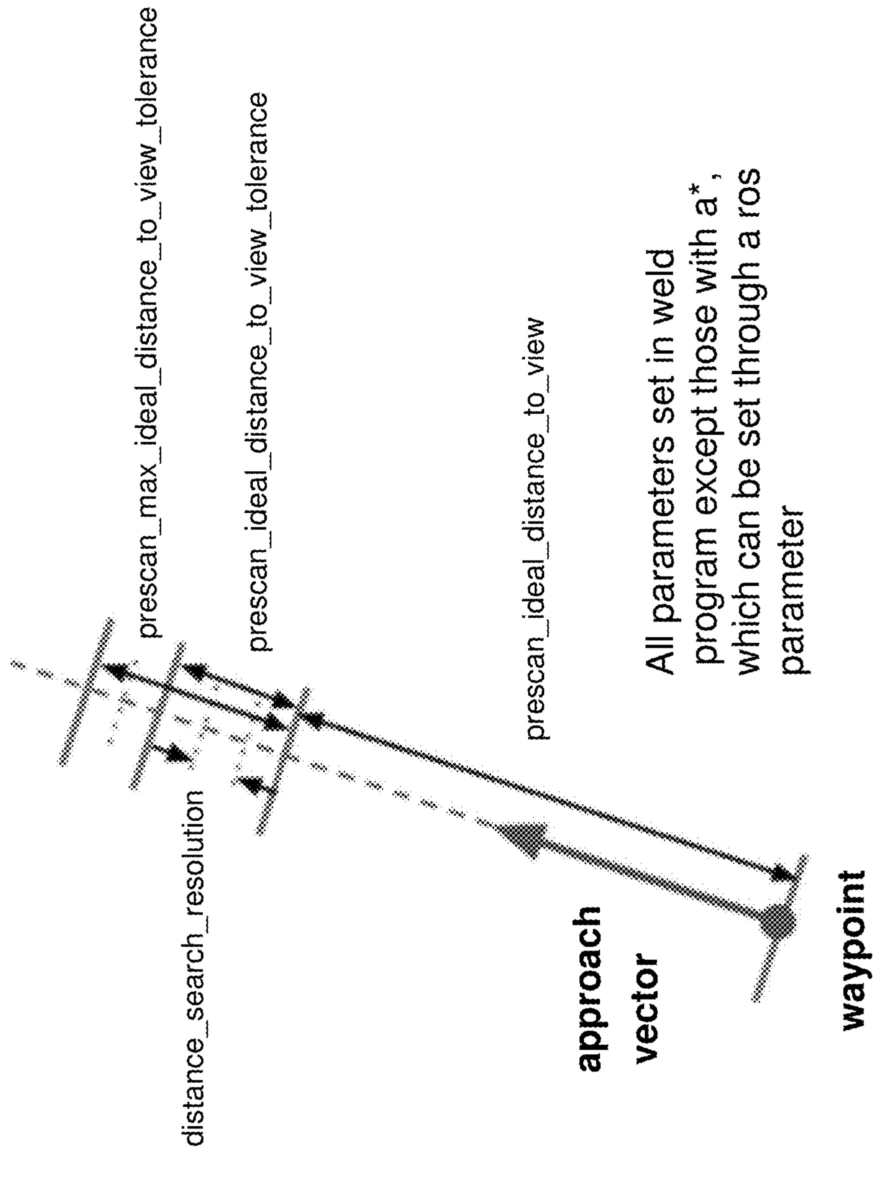
FIG. 22 is a diagram that depicts a process for determining an ideal distance of a scan device to a waypoint according one or more aspects.

Referring to FIG. 22, which depicts a process for determining an ideal distance of scan device 130 (or a simulation thereof) to a waypoint according one or more aspects, controller 152 may determine $P_{eff}$, a position of scan device 130 with respect to a frame of reference of the cradle or positioner that holds first object 104. In particular, controller 152 may determine $P_{eff}$ for different values of an ideal distance from a position of the scan device 130 to a waypoint on seam 112 along vector $R_3$. Additionally, or alternatively, controller 152 may generate the ideal distance values, d, in the range of $[d_{nom}, d_{nom}+\delta d]$ where $d_{nom}$ and $\delta d$ represent the nominal ideal distance value and corresponding tolerance thereof, respectively, using ideal distance to view resolution of $d_{res}$. Accordingly, controller 152 may generate $P_{eff}$ through the following equation: $P_{eff}=P_{wpt}-dR_3$, where $P_{wpt}$ denotes a position of the waypoint on seam 112 with respect to a frame of the positioner.

It is noted that one or more blocks (or operations) described with reference to FIG. 2, 4, 9, 10, or 15 may be combined with one or more blocks (or operations) described with reference to another of the figures. For example, one or more blocks (or operations) of FIG. 2 may be combined with one or more blocks (or operations) of FIG. 4, 9, 10, or 15. As another example, one or more blocks associated with FIG. 4 may be combined with one or more blocks associated with FIG. 9, 10, or 15. As another example, one or more blocks associated with FIG. 9 may be combined with one or more blocks (or operations) associated with FIG. 10 or 15. Additionally, or alternatively, one or more operations described above with reference to FIG. 1 or 3 may be combined with one or more operations described with reference to FIG. 2, 4, 9, 10, or 15.

While various implementations have been described above, it should be understood that they have been presented by way of example only, and not limitation. Although various implementations have been described as having particular features and/or combinations of components, other implementations are possible having a combination of any features and/or components from any of the examples where appropriate as well as additional features and/or components. For example, although not described in detail above, in some implementations, methods of determining a shape of a portion of a part may include a calibration phase during which distortion of the detector(s), the lens(es) on the detector(s), the distortion in the combination of detector(s) and lens(es), and/or the relative position of the camera(s) to a test surface or fixture onto which a pattern(s) is projected are determined.

Certain features that are described in this specification in the context of separate implementations also can be implemented in combination in a single implementation. Conversely, various features that are described in the context of a single implementation also can be implemented in multiple implementations separately or in any suitable subcombination. Where methods described above indicate certain events occurring in certain order, the ordering of certain events may be modified. Additionally, certain of the events may be performed concurrently in a parallel process when possible, as well as performed sequentially as described above.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Additionally, in some implementations, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

Those of skill in the art would understand that information, message, and signals may be represented using any of a variety of different technologies and techniques. For example, data, instructions, commands, information, and signals that may be referenced throughout the above description may be represented by voltages, currents, electromagnetic waves, magnetic fields or particles, optical fields or particles, or any combination thereof.

Components, the functional blocks, and the modules described herein with the figures include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. The various illustrative logics, logical blocks, modules, circuits and algorithm processes described in connection with the implementations disclosed herein may be implemented as electronic hardware, computer software, or combinations of both. In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Additionally, the operations of a method or algorithm may reside as one or any combination or set of codes and instructions on a machine readable medium and computer-readable medium, which may be incorporated into a computer program product.

Some implementations described herein relate to methods or processing events. It should be understood that such methods or processing events can be computer-implemented. That is, where a method or other events are described herein, it should be understood that they may be performed by a compute device having a processor and a memory. Methods described herein can be performed locally, for example, at a compute device physically co-located with a robot or local computer/controller associated with the robot and/or remotely, such as on a server and/or in the "cloud."

Memory of a compute device is also referred to as a non-transitory computer-readable medium, which can include instructions or computer code for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules, Read-Only Memory (ROM), Random-Access Memory (RAM) and/or the like. One or more processors can be communicatively coupled to the memory and operable to execute the code stored on the non-transitory processor-readable medium. Examples of processors include general purpose processors (e.g., CPUs), Graphical Processing Units, Field Programmable Gate Arrays (FPGAs), Application Specific Integrated Circuits (ASICs), Digital Signal Processor (DSPs), Programmable Logic Devices (PLDs), and the like. Examples of computer code include, but are not limited to, micro-code or micro-instructions, machine instructions, such as produced by a compiler, code used to produce a web service, and files containing higher-level instructions that are executed by a computer using an interpreter. To illustrate, examples may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. Unless stated otherwise, the word or as used herein is an inclusive or and is interchangeable with "and/or," such that when "or" is used in a list of two or more items, means that any one of the listed items can be employed by itself, or any combination of two or more of the listed items can be employed. To illustrate, A, B, or C includes: A alone, B alone, C alone, a combination of A and B, a combination of A and C, a combination of B and C, or a combination of A, B, and C. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing"). As a result, an apparatus that "comprises," "has," "includes," or "contains" one or more elements possesses those one or more elements, but is not limited to possessing only those one or more elements. Likewise, a method that "comprises," "has," "includes," or "contains" one or more steps possesses those one or more steps, but is not limited to possessing only those one or more steps.

Any implementation of any of the systems, methods, and article of manufacture can consist of or consist essentially of—rather than comprise/have/include—any of the described steps, elements, or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

The claims are not intended to include, and should not be interpreted to include, means-plus- or step-plus-function limitations, unless such a limitation is explicitly recited in a given claim using the phrase(s) "means for" or "step for," respectively.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure and following claims are not intended to be limited to the examples and designs described herein but is to be accorded the widest scope consistent with the principles and novel features disclosed herein.

What is claimed is:

1. An assembly robotic system configured to scan an object to be welded, the assembly robotic system comprising:

a controller that includes one or more processors and one or more memories coupled to the one or more processors, the controller configured to:

identify, based on an object pose of the object, a region associated with a seam of the object, the seam associated with a feature of one or more features of the object;

generate, based on the identified region, one or more candidate poses associated with a scan device, the scan device configured to perform a scan operation in association with the identified region;

select, based on an evaluation of the one or more candidate poses, one or more scan poses; and for each scan pose of the one or more scan poses, initiate the scan operation associated with the identified region and performed by the scan device with the scan pose.

2. The assembly robotic system of claim 1, wherein the controller is further configured to:

determine the object pose of the object based on a first scan performed on a segment of the object, the segment associated with the one or more features of the object, the one or more features identified based on a representation of the object.

3. The assembly robotic system of claim 2, wherein the controller is further configured to:

determine a location of the feature, the seam, or both after the controller determines the object pose of the object;

wherein, to determine the location, the controller is configured to determine an approximate location of the feature, the seam, or both based on the first scan, the representation, or a combination thereof.

4. The assembly robotic system of claim 2, wherein, to determine the object pose of the object, the controller is configured to:

identify, based on the one or more features, the segment of the object at which to initiate the first scan; and initiate the first scan of the object at the identified segment, and wherein the representation of the object includes a digital model of the object, the digital model including a computer aided design (CAD) model of the object.

5. The assembly robotic system of claim 2, wherein the representation of the object includes:

a first digital representation of the object that includes first three dimensional (3D) point cloud data associated with a computer aided design (CAD) file associated with the object, and a second digital representation of the object that includes second 3D point cloud data associated with the first scan.

6. The assembly robotic system of claim 5, wherein the controller is further configured to:

determine a location of the feature, the seam, or a combination thereof, after the controller performs the first scan; and wherein, to determine the location, the controller is configured to align a first coordinate system associated with the first digital representation and a second coordinate system associated with the second digital representation.

7. The assembly robotic system of claim 6, wherein, to align the first coordinate system and the second coordinate system, the controller is configured to:

perform a coarse alignment; and perform a fine alignment.

8. The assembly robotic system of claim 6, wherein, to align the first coordinate system and the second coordinate system, the controller is configured to:

sample the first digital representation and the second digital representation such that first points associated with the first 3D point cloud data have an approximately equal density to second points associated with the second 3D point cloud data.

9. The assembly robotic system of claim 1, wherein, to select the one or more scan poses, the controller is configured to select the one or more scan poses based on a size of an expected area of the region to be scanned by the scan device from the one or more scan poses based on a simulation of the scan operation performed from the one or more candidate poses.

10. The assembly robotic system of claim 1, wherein the controller is configured to:

receive a representation of the object, wherein the representation includes a digital model of the object, and wherein the digital model includes a computer aided design (CAD) model of the object; and identify the one or more features based on the representation of the object.

11. A method, performed by a controller, for scanning an object to be welded, the method comprising:

identifying, based on an object pose of the object, a region associated with a seam of the object, the seam associated with a feature of one or more features of the object;

generating, based on the identified region, one or more candidate poses associated with a scan device, the scan device configured to perform a scan operation in association with the identified region;

selecting, based on an evaluation of the one or more candidate poses, one or more scan poses; and for each scan pose of the one or more scan poses, initiating the scan operation associated with the identified region and performed by the scan device with the scan pose.

12. The method of claim 11, wherein the one or more features include one or more disambiguating features, and wherein the one or more disambiguating features include one or more asymmetric features of the object.

13. The method of claim 11, further comprising:

determining the object pose of the object based on a first scan performed on a segment of the object, the segment associated with the one or more features of the object, the one or more features identified based on a representation of the object.

14. The method of claim 13, further comprising:

after determining the object pose of the object, determining a location of the feature, the seam, or both, wherein determining the location includes determining an approximate location of the feature, the seam, or both based on the first scan, the representation, or a combination thereof.

15. The method of claim 13, wherein determining the object pose of the object includes:

identifying, based on the one or more features, the segment of the object at which to initiate the first scan; and initiating the first scan of the object at the identified segment, and wherein the representation of the object includes a digital model of the object, the digital model including a computer aided design (CAD) model of the object.

16. The method of claim 11, further comprising:

identifying the one or more features, wherein identifying the one or more features includes processing three dimensional (3D) point cloud data associated with a representation of the object to identify one or more asymmetries of the object.

17. A non-transitory computer-readable medium storing instructions that, when executed by one or more processors of a controller cause the controller to:

identify, based on an object pose of the object, a region associated with a seam of the object, the seam associated with a feature of one or more features of the object;

generate, based on the identified region, one or more candidate poses associated with a scan device, the scan device configured to perform a scan operation in association with the identified region;

select, based on an evaluation of the one or more candidate poses, one or more scan poses; and for each scan pose of the one or more scan poses, initiate the scan operation associated with the identified region and performed by the scan device with the scan pose.

18. The non-transitory computer-readable medium of claim 17, wherein the instructions that, when executed by one or more processors of the controller, further cause the controller to:

receive a representation of the object, wherein the representation of the object includes:

a first digital representation of the object that includes first three dimensional (3D) point cloud data associated with a computer aided design (CAD) file associated with the object, and a second digital representation of the object that includes second 3D point cloud data associated with a first scan.

19. The non-transitory computer-readable medium of claim 17, wherein the instructions that, when executed by the one or more processors of the controller, further cause the controller to:

receive, based on a first scan, a two dimensional (2D) image of an identified segment.

20. The non-transitory computer-readable medium of claim 17, wherein the instructions that, when executed by the one or more processors of the controller, further cause the controller to:

determine an axis of symmetry of the object, and wherein the one or more features include at least one feature that is asymmetrical relative to the axis of symmetry of the object.

21. The non-transitory computer-readable medium of claim 17, wherein the instructions that, when executed by the one or more processors of the controller, further cause the controller to:

generate, after performance of the scan operation, a model of the object, the model based on:

a representation of the object, and a first scan, the scan operation, or a combination thereof, wherein, to generate the model, the instructions that, when executed by the one or more processors of the controller, cause the controller to combine:

mesh data associated with the representation, and point cloud data associated with the first scan, the scan operation, or the combination thereof.

* * * * *